(12) United States Patent
Iwai et al.

(10) Patent No.: US 8,048,607 B2
(45) Date of Patent: Nov. 1, 2011

(54) COMPOUND HAVING POLYMETHINE-CHAIN STRUCTURE, IMAGE FORMING MATERIAL, PLANOGRAPHIC PRINTING PLATE PRECURSOR, AND IMAGE FORMING METHOD USING THE SAME, METHOD OF MAKING PLANOGRAPHIC PRINTING PLATE, AND PLANOGRAPHIC PRINTING METHOD

(75) Inventors: Yu Iwai, Shizuoka-ken (JP); Kazuto Kunita, Shizuoka-ken (JP)

(73) Assignee: Fujifilm Corporation, Tokyo (JP)

( * ) Notice: Subject to any disclaimer, the term of this patent is extended or adjusted under 35 U.S.C. 154(b) by 530 days.

(21) Appl. No.: 11/715,350

(22) Filed: Mar. 8, 2007

(65) Prior Publication Data

US 2007/0212643 A1    Sep. 13, 2007

(30) Foreign Application Priority Data

Mar. 9, 2006  (JP) .................................. 2006-064752
Mar. 27, 2006  (JP) .................................. 2006-086575

(51) Int. Cl.
*G03C 1/00* (2006.01)
*G03F 7/26* (2006.01)
(52) U.S. Cl. ..................... 430/270.1; 430/302; 430/944; 430/945
(58) Field of Classification Search ............... 430/270.1, 430/302, 583, 584, 587, 588, 589, 590, 591, 430/944, 945, 522; 540/1; 548/400; 544/64
See application file for complete search history.

(56) References Cited

U.S. PATENT DOCUMENTS

| 4,626,496 | A | 12/1986 | Sato | |
|---|---|---|---|---|
| 5,837,586 | A * | 11/1998 | Perron | 430/285.1 |
| 7,632,945 | B2 * | 12/2009 | Shinpo et al. | 544/64 |
| 2005/0039620 | A1 * | 2/2005 | Kakino et al. | 101/450.1 |
| 2006/0207454 | A1 * | 9/2006 | Goto | 101/395 |

FOREIGN PATENT DOCUMENTS

| DE | 3521915 A1 | 12/1985 |
|---|---|---|
| EP | 0438123 A2 | 7/1991 |
| EP | 438123 A2 * | 7/1991 |
| EP | 1006116 A1 | 6/2000 |
| EP | 1 223 196 A2 | 7/2002 |
| EP | 1223196 A2 * | 7/2002 |
| EP | 1767353 A2 | 3/2007 |
| JP | 62-132689 A | 6/1987 |
| JP | 7-32739 A | 2/1995 |
| JP | 11-277927 A | 10/1999 |
| JP | 2000-335129 A | 12/2000 |
| JP | 2003-191657 A | 7/2003 |
| JP | 2003-307843 A | 10/2003 |
| WO | WO-2006/136537 A1 | 12/2006 |

OTHER PUBLICATIONS

Lepkowicz et al., "Femtosecond-to-nanosecond nonlinear spectroscopy of polymethine molecules", Journal of Optical Society of America, B/vol. 22, No. 12, Dec. 2005, pp. 2664-2685.*
Voropai et al., Journal of Applied Spectroscopy, Mar.-Apr. 1995, vol. 62, No. 2, pp. 369-377 (XP009089117).
Database Beilstein, Beilstein Institute for Organic Chemistry, Frankfurt-Main, DE (XP002451205) Database-Accession No. 3840334 (BRN) & Ogata, Maruyama: Rikagaku Kenkyusho Iho, vol. 19, No. 1940, pp. 1475-1476.
Office Action in European Application No. 07004890.5 mailed Apr. 11, 2011.

* cited by examiner

*Primary Examiner* — Cynthia Kelly
*Assistant Examiner* — Connie P Johnson
(74) *Attorney, Agent, or Firm* — Birch, Stewart, Kolasch & Birch, LLP

(57) ABSTRACT

A compound having, in its molecule, a polymethine chain structure containing a partial structure represented by the following formula (1-1), and an image forming material containing the same. In the formula (1-1), $R^1$, $R^2$, $R^3$, $R^4$, and X each independently represent a hydrogen atom, a halogen atom, or a monovalent organic group. The image forming material is useful as the image recording layer of a planographic printing plate precursor.

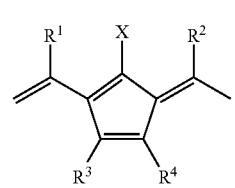

Formula (1-1)

10 Claims, No Drawings

COMPOUND HAVING POLYMETHINE-CHAIN STRUCTURE, IMAGE FORMING MATERIAL, PLANOGRAPHIC PRINTING PLATE PRECURSOR, AND IMAGE FORMING METHOD USING THE SAME, METHOD OF MAKING PLANOGRAPHIC PRINTING PLATE, AND PLANOGRAPHIC PRINTING METHOD

CROSS-REFERENCE TO RELATED APPLICATION

This application claims priority under 35 USC 119 from Japanese patent Application Nos. 2006-64752 and 2006-86575, the disclosures of which are incorporated by reference herein.

BACKGROUND OF THE INVENTION

1. Field of the Invention

The present invention relates to a compound having a specific methine-chain structure giving a printed-out image superior in visibility that allows easy differentiation of laser-irradiated and non-irradiated regions, and an image forming material and an image forming method using the same. The invention also relates to an image recording layer of a planographic printing plate precursor using the image forming material, more preferably a planographic printing plate precursor allowing so-called direct plate making in which a plate is directly made by scanning with a laser at a wavelength of 300 to 1,200 nm based on digital signal from computer or the like, a planographic printing plate precursor that can be developed in the printing step directly without being processed in a wet development step, a method of making the same, and a planographic printing method using the same.

2. Description of Related Art

Various compositions and methods for forming an image on a substrate and thus marking the substrate have been used in various industries. As a few examples of such industries, papermaking industry, packaging industry, painting industry, medical industry, dental industry, electronic industry, fiber industry, airplane/ship/automobile industries, and visual art industry can be mentioned.

Such image formation or marking is used typically for identification of articles, e.g., for identification of the name or logo of the manufacturer, serial number or lot number, or structural type, or alternatively, for positioning during the production of semiconductor wafers and vehicles such as airplanes, ships, and on-shore vehicles.

Marking is also used in reinforced product, photoresist, solder mask, printing plate, and other photopolymer products. Laser marking is attracting attention recently as a high speed and efficient marking method, and has already been put into practice in some industries. Many laser-marking techniques include irradiating a required region of a substrate with laser radiation to modify or remove the irradiated region, or irradiating a coated substrate with laser radiation and removing the irradiated coating layer to produce contrast between the irradiated region (marked region) and the non-irradiated region (background).

Although laser marking on articles such as semiconductor chip is a rapid and economical means of marking, the latest laser-marking technique of obtaining a desired mark by surface combustion has relevant disadvantages. For example, the mark formed by surface combustion caused by laser is visible only at selected incident angles with respect to the light source. In addition, staining of the mark with oil or other contaminants on the article surface may blur or obfuscate the laser mark. Further, since the laser causes actual combustion on the article surface, in the marking of a bare die, the combustion may damage any structure beneath the surface or damage the internal circuit because of increase in the internal die temperature above its tolerance limit.

Digitalization technology of processing, storing, and outputting image information electronically in and out of computer has been widely spreading recently as an image forming means on the planographic printing plate precursor, and various new image-outputting systems compatible with the digitalization technology have been put into practical use. Computer to plate (CTP) technology of producing a planographic printing plate directly without use of a lith film by making a highly converged radiation ray such as laser radiation carry such digitalized image information and scan-irradiating the planographic printing plate precursor with the ray is attracting attention in the above situation. Accordingly, it is one of important technical issues to obtain a planographic printing plate precursor suitable for such technology.

When making a printing plate from a conventional planographic printing plate precursor, it is necessary to remove undesired portions of the image recording layer through dissolution in a developer or the like after exposure. However there has recently been a demand for elimination or simplification of such an additional wet processing. Under the circumstance, a so-called on-press development method has been proposed as a simplified platemaking method. In the on press development method, an image recording layer allowing removal of undesired portions of the image recording layer of the planographic printing plate precursor in the normal printing step is used, and the undesirable portions of image recording layer are removed on-press after exposure.

However, in general, an on-press developable or no processing (no development) planographic printing plate precursor, which does not accompany pre-printing development, does not have an image on the printing plate when the printing plate is mounted on the printing machine. Therefore, there is a problem in that the plate cannot be identified. In particular, it is quite important in multicolor printing whether resister marks for registration marked on the plate precursor are detectable or not. Accordingly, the use of such an on-press developable or no processing (no development) planographic printing plate precursor requires a means that enables the image to be confirmed after exposure or heating (a printing-out agent).

A printing plate containing, as printing-out agents, a compound that generates acid, base, or radical upon application of light or heat and a compound that changes its color in interaction with the generated acid, base or radical has been proposed (see, for example, Japanese Patent Application Laid-Open (JP-A) No. 11-277927). Moreover, it has been proposed to use the color change of a thermodegradable compound as a printing-out agent for the direct-recording planographic printing plate precursor having a thermosensitive layer (see, for example, JP-A No. 2000-335129). It has further been proposed to use a thermal decomposable colorant having a heat decomposition temperature of 250° C. or lower as a printing-out agent (see, for example, JP-A No. 2003-191657). However, these methods still have a problem in that the visibility in the exposed region is insufficient.

SUMMARY OF THE INVENTION

After intensive studies, the inventors have found that it is possible to obtain a printed-out image superior in visibility by using a compound having a specific structure, or a compound that generates a cation radical and changes its hue and/or brightness when exposed to laser radiation, and have completed the present invention. The invention provides a compound having polymethine-chain structure, an image forming material, a planographic printing plate precursor, and an image forming method using the same, a method of making planographic printing plate, and a planographic printing method <1> A compound having, in its molecule, a polymethine chain structure including a partial structure represented by the following Formula (1-1):

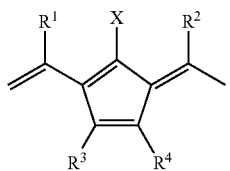

Formula (1-1)

In Formula (1-1), $R^1$, $R^2$, $R^3$, $R^4$, and X each independently represent a hydrogen atom, a halogen atom, a hydroxyl group, an amino group, a nitro group, a mercapto group, a sulfonic acid group, a phosphoric acid group, or a monovalent organic group.

<2> A compound described in <1>, wherein the partial structure represented by Formula (1-1) is a partial structure represented by the following Formula (1-2), and the polymethine chain including the partial structure connects plural heterocyclic rings.

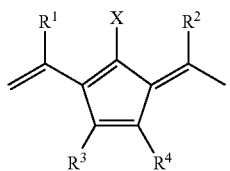

Formula (1-2)

In Formula (1-2), $R^1$ and $R^2$ each independently represent a hydrogen atom or a hydrocarbon group. $R^3$ and $R^4$ each independently represent a hydrogen atom, a hydrocarbon group, a halogen atom, an alkoxy group, an aryloxy group, an amino group, a carbonyl group, or a silyl group; and $R^3$ and $R^4$ may bond to each other to form a ring.

X represents a hydrogen, a halogen atom, —N(Aryl)$_2$, —X$^2$-L$^1$, a chain or cyclic hydrocarbon group, a heterocyclic group, or a group represented by the following Formula (2). In the Formula, Aryl represents an aryl group; $X^2$ represents an oxygen, nitrogen, or sulfur atom; and $L^1$ represents a hydrocarbon group, a heteroatom-containing aromatic ring, or a heteroatom-containing hydrocarbon group. The heteroatom refers to an atom selected from N, S, O, halogen atoms, or Se.

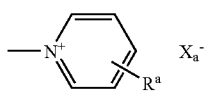

Formula (2)

$X_a^-$ represents a counter ion which is present when neutralization of the electric charge is necessary; and $R^a$ represents a substituent selected from a hydrogen atom, an alkyl group, an aryl group, an amino group, or a halogen atom.

<3> A compound described in <1> or <2>, wherein the compound is represented by the following Formula (3) or (4):

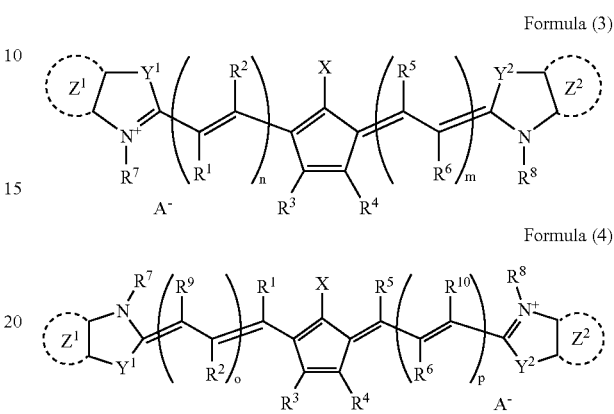

Formula (3)

Formula (4)

In Formulae (3) and (4), $R^1$, $R^2$, $R^5$, $R^6$, $R^9$, and $R^{10}$ each independently represent a hydrogen atom or a hydrocarbon group. $R^3$ and $R^4$ each independently represent a hydrogen atom, a hydrocarbon group, a halogen atom, an alkoxy group, an aryloxy group, an amino group, a carbonyl group, or a silyl group; and $R^3$ and $R^4$ may bond to each other to form a ring.

X represents a hydrogen atom, a halogen atom, —N(Aryl)$_2$, —X$^2$-L$^1$, a chain or cyclic hydrocarbon group, a heterocyclic group or a group represented by the following Formula (2). In the Formula, Aryl represents an aryl group; $X^2$ represents an oxygen, nitrogen, or sulfur atom; and $L^1$ represents a hydrocarbon group, a heteroatom-containing aromatic ring, or a heteroatom-containing hydrocarbon group. The heteroatom refers to an atom selected from N, S, O, halogen atoms, or Se.

Formula (2)

$X_a^-$ represents a counter ion which is present when neutralization of the electric charge is necessary; and $R^a$ represents a substituent selected from a hydrogen atom, an alkyl group, an aryl group, an amino group, or a halogen atom.

$Y^1$ and $Y^2$ may be the same as or different from each other, and each independently represent N—$R^{11}$, S, or a dialkylmethylene group. $R^{11}$ represents a hydrogen atom or a hydrocarbon group that may have a substituent. $R^7$ and $R^8$ each independently represent a hydrocarbon group.

$Z^1$ and $Z^2$ each independently represent an aromatic or heteroaromatic ring that may have a substituent.

$A^-$ represents a counter ion that is present when neutralization of the electric charge is necessary. Each of m, n, o, and p denotes an integer from 0 or greater.

<4> An image forming material including the compound described in any one of <1> to <3>.

<5> An image forming material including a support and an image recording layer provided on the support, the image recording layer including a precursor of the compound described in any one of <1> to <3> and an oxidizing agent.

<6> An image forming material including a support and an image recording layer provided on the support, the image recording layer including a precursor of a cation radical molecule and an electron accepting compound.
<7> An image forming material described in <6>, wherein the compound has a structure in which a polymethine ring connects two heterocylic rings.
<8> An image forming material described in <6>, wherein the cation radical molecule is a compound represented by the following formula (1):

Formula (1)

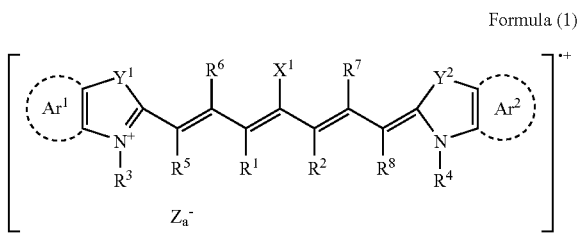

In the formula (1), $X^1$ represents a hydrogen atom, a halogen atom, $-N(Aryl)_2$, $-X^2-L^1$, a hydrocarbon group that may have a substituent, a hydrocarbon ring that may have a substituent, a heterocyclic ring that may have a substituent, or a group represented by formula (2) below. Aryl represents an aryl group that may have a substituent, $X^2$ represents an oxygen atom, a nitrogen atom, or a sulfur atom, $L^1$ represents a hydrocarbon group, an aromatic ring containing a heteroatom, or a hydrocarbon group containing a heteroatom. The heteroatom refers to N, S, O, a halogen atom, or Se.

Formula (2)

$X_a^-$ represents a counter ion which is present when neutralization of the electric charge is necessary; and $R^a$ represents a substituent selected from a hydrogen atom, an alkyl group, an aryl group, a substituted or unsubstituted amino group, or a halogen atom.
$R^1$ and $R^2$ each independently represent a hydrocarbon group that may have a substituent; and $R^1$ and $R^2$ may bond to each other to form a ring. $Ar^1$ and $Ar^2$ each independently represent an aromatic hydrocarbon group that may have a substituent. $Y^1$ and $Y^2$ each independently represent a sulfur atom or a dialkylmethylene group having 12 or fewer carbon atoms. $R^3$ and $R^4$ each independently represent a hydrocarbon group that may have a substituent. $R^5$, $R^6$, $R^7$ and $R^8$ each independently represent a hydrogen atom or a hydrocarbon group having 12 or fewer carbon atoms. $Z_a^-$ represents a halide, perchlorate, tetrafluoroborate, hexafluorophosphate, or sulfonate ion. However, when the compound represented by Formula (1) has an anionic substituent in its structure and does not require neutralization of the electric charge, $Z_a^-$ is unnecessary.
<9> An image forming material described in any one of <6> to <8>, wherein the image recording layer further includes a radical polymerization initiator, polymerizable compound, a binder, and a microcapsule or microgel.
<10> An image forming material described in any one of <4> to <9>, wherein, when exposed to laser radiation, the hue and/or brightness of an exposed region is changed.
<11> An image forming method including exposing the image forming material described in any one of <4> to <10> to laser radiation to change the hue and/or brightness of the exposed region.
<12> A planographic printing plate precursor including the image forming material described in any one of <4> to <10>.
<13> A planographic printing plate precursor described in <12>, wherein, when the planographic printing plate precursor is imagewise exposed to laser radiation and then used in printing with supplied printing ink and dampening water, the portion of the image recording layer not exposed to the laser radiation is removed.
<14> A method of making a planographic printing plate, the method including imagewise exposing the planographic printing plate precursor described in <12> to laser radiation, wherein the compound described in any one of <1> to <3> is formed in the region that is exposed to the laser radiation.
<15> A planographic printing method including imagewise exposing the planographic printing plate precursor described in <12> to laser radiation, supplying printing ink and dampening water to remove the portion of the image recording layer that was not exposed to the laser radiation, and conduct printing using the obtained planographic printing plate.

The compound according to the invention including, in a molecule thereof, a polymethine chain structure including the partial structure represented by Formula (1-1) is a novel compound. The compound shows superior coloring property when exposed to laser radiation, and thus can be used favorably as a coloring compound. Accordingly, as described above, when the compound is used in an image forming recording layer of a planographic printing plate precursor, the formed image acquires superior visibility and the formed image can be easily confirmed before development. Thus, in particular, the compound may be used favorably in the recording layer of a planographic printing plate precursor capable of on-press development.

In the invention, the scope of the "image forming material including a compound having, in a molecule thereof, a polymethine chain structure that includes the partial structure represented by Formula (1-1)" include both an "image forming material including the compound having, in a molecule thereof, a polymethine chain structure including the partial structure represented by Formula (1-1) that was added before laser exposure" and an "image forming material including the compound having, in a molecule thereof, a polymethine chain structure including the partial structure represented by Formula (1-1) that was formed from a precursor thereof by laser exposure".

The organic group in the invention means a functional group that includes at least one carbon atom.

Although the action mechanism of the image forming material of the invention (first embodiment) is still unclear, it is considered that the radicals generated by light, heat, or both cause reaction of the compound having a partial structure represented by Formula (1-1), resulting in change of the hue or brightness of the compound itself.

The "cation radical molecule" used in <6> (second embodiment of the image forming material) according to the invention refers to a compound generated as a result of electron transfer from a precursor of a cation radical molecule excited by laser radiation to an electron accepting compound, and is not necessarily monovalent. The mechanism of the electron transfer may be electron transfer from the singlet or triplet excited state of the cation radical molecule precursor.

The term "electron accepting compound" used herein refers to a compound receiving an electron transferred from the cation radical molecule precursor excited by laser radiation, and the mechanism of the electron transfer may electron transfer from the singlet or triplet excited state of the cation radical molecule precursor of more efficient electron transfer, the reduction potential of the electron accepting compound is preferably more positive than the oxidation potential of the cation radical molecule precursor in the excited state.

As for the action mechanism of the image forming method according to the second embodiment of the invention, it is considered that the cation radical molecule precursor used in the image forming method according to the invention is excited when exposed to laser radiation, and an electron is transferred to the electron accepting compound, whereby a cation radical molecule is generated. The change in color and/or brightness caused by the conversion to the cation radical molecule may result in formation of an image superior in visibility in the region that was exposed to the laser radiation.

The image forming material in the invention represents a material capable of recording an image by laser exposure, and is preferably a planographic printing plate precursor from the viewpoint of the efficiency in forming a printed-out image superior in visibility. The image forming material is more preferably such a planographic printing plate precursor that the unexposed portion is removed to form a printing plate during printing step after image recording with laser exposure without requiring wet developing process. Such a planographic printing plate enables formation of an image superior in visibility in the region that was exposed to laser radiation.

In the invention, the "development step" means a step of removing the image recording layer of the planographic printing plate precursor in the region that was not exposed to infrared laser radiation and exposing the hydrophilic surface by bringing liquid (normally an alkaline developing solution) into contact therewith in an apparatus other than printing machine (normally an automatic processor), and the "on-press development" means a method or step of removing the image recording layer of the planographic printing plate precursor in the region that was not exposed to infrared laser to expose the hydrophilic surface by bringing liquid (normally printing ink and/or dampening water) into contact therewith in a printing machine, unless otherwise specified.

DESCRIPTION OF THE PRESENT INVENTION

Hereinafter, the present invention will be described in detail.

An image forming material in first embodiment of the invention will be described first.

[Image Forming Material]

The image forming material in the first embodiment includes a compound having a polymethine chain structure in its molecule. The polymethine chain structure includes a partial structure represented by the following Formula (1-1) (hereinafter, referred to as a compound having a specific structure). In general, the image forming material includes a support and an image recording layer provided on the support, the image recording layer including the compound having a specific structure. When imagewise exposed to laser radiation, the image recording layer, including the compound, significantly changes the hue or color density in the exposed region, thereby giving a printed-out image superior in visibility.

From the viewpoint of the efficiency in forming a printed-out image superior in visibility, the image forming material according to the invention is preferably used as the image recording layer of a planographic printing plate precursor. In particular, the effects of the invention are remarkable when the image forming material is used in a planographic printing plate precursor capable of on-press development, which is developed on-press during the printing step without undergoing any wet developing step after image recording.

The planographic printing plate precursor according to the invention is not particularly limited as long as it includes the compound having the specific structure of the invention in the image recording layer, and may be any planographic printing plate precursor capable of forming an image by exposure to laser radiation. The planographic printing plate precursor is particularly preferably a planographic printing plate precursor that can be used for printing in the printing step without being subjected to a wet development step after image recording as described above. Examples of the planographic printing plate precursor include (1) planographic printing plate precursors capable of on-press development and (2) no processing (no development) planographic printing plate precursor described below. The planographic printing plate precursor according to the invention is paricularly preferably a planographic printing plate precursor (1) or (2).

(1) Planographic Printing Plate Precursor Capable of On-Press Development:

A planographic printing plate precursor having an image recording layer that changes its solubility or dispersibility in damping water and/or ink upon exposure to radiation, or changes, upon exposure to radiation, its adhesiveness to a neighboring layer having different affinity to damping water or ink, the planographic printing plate precursor being capable of being developed on-press by supplying damping water and/or ink onto the printing surface after image exposure.

(2) No Processing (No Development) Planographic Printing Plate Precursor:

A planographic printing plate precursor having an image recording layer that changes its affinity to damping water or ink upon exposure to radiation, the planograhpic printing plate precursor being capable of being used for printing without removing the image recording layer after image exposure.

[Planographic Printing Plate Precursor]

A preferable example of the planographic printing plate precursor used in the invention has an image recording layer provided on a support, is capable of recording by infrared irradiation, and can be used for printing when the printing plate precursor is mounted on a printing machine without being subjected to a developing treatment after image recording or when image recording is conducted on the printing plate precursor after the printing plate precursor is mounted on the printing machine. The image recording layer includes, in addition to the compound (A) having a specific structure, a radical polymerization initiator (B), a photoabsorbing material (C), a polymerizable compound (D), a binder polymer (E), and a microgel or microcapsule (F).

Hereinafter, the constituent elements, components, and others in the invention will be described in detail.

(Image Recording Layer)

Hereinafter, the components contained in the image recording layer of the planographic printing plate precursor will be described one by one.

<(A) Compound Having, in a Molecule Thereof, a Polymethine Chain Structure Including the Partial Structure Represented by Formula (1-1) (Compound Having a Specific Structure)>

The image recording layer according to the invention may include a compound having, in its molecule, a polymethine chain structure including the partial structure represented by the following Formula (1-1). The compound is a novel compound exhibiting a superior coloring property upon laser exposure, and can be used favorably as a coloring compound.

It is possible to obtain superior visibility by using this novel compound having superior coloring property in the image recording layer of the planographic printing plate precursor, in which image is to be formed.

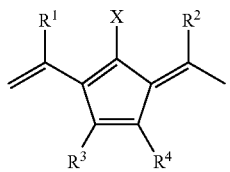

Formula (1-1)

In Formula (1-1), $R^1$, $R^2$, $R^3$ and $R^4$ each independently represent a hydrogen atom, a halogen atom, a hydroxy group, an amino group, a nitro group, a mercapto group, a sulfonic acid group, a phosphoric acid group, or a monovalent organic group.

In a preferable embodiment, in view of visibility, $R^1$ and $R^2$ each independently represent a hydrogen atom or a hydrocarbon group that may have a substituent. Specific examples of the hydrocarbon group include alkyl groups having 1 to 12 carbon atoms or an aryl group having 6 to 12 carbon atoms. Each of $R^1$ and $R^2$ is more preferably a hydrogen atom. In a preferable embodiment, $R^3$ and $R^4$ each independently represent a hydrogen atom, a hydrocarbon group, a halogen atom, an alkoxy group, an aryloxy group, an amino group, a carbonyl group, or a silyl group. $R^3$ and $R^4$ may bond to each other to form a ring. In view of visibility, $R^3$ and $R^4$ are each preferably an alkyl group.

X represents a hydrogen atom, a halogen atom, or an organic group. In view of visibility, X represents preferably a hydrogen atom, a halogen atom, —N(Aryl)$_2$, $X^2$-$L^1$, a hydrocarbon group, a heterocyclic ring, or a substituent represented by the following Formula (2). In the Formula, Aryl represents an aryl group that may have a substituent; $X^2$ represents an oxygen, nitrogen, or sulfur atom; and $L^1$ represents a hydrocarbon group having 1 to 12 carbon atoms, a heteroatom-containing aromatic ring, or a heteroatom-containing hydrocarbon group having 1 to 12 carbon atoms. The heteroatom represents N, S, O, a halogen atom, or Se. X is most preferably —N(Aryl)$_2$ from the viewpoint of visibility.

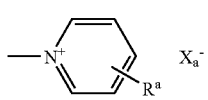

Formula (2)

$X_a^-$ represents a counter ion that is present when neutralization of the electric charge is required. $R^a$ represents a substituent selected from a hydrogen atom, an alkyl group, an aryl group, a substituted or unsubstituted amino group, or a halogen atom.

The substituent may itself have another substituent. Examples of substituents that may be introduced to the substituents described above (such as hydrocarbon groups and heterocyclic groups) include alkyl groups having 1 to 12 carbon atoms, aryl groups having 6 to 12 carbon atoms, halogen atoms, alkoxy groups having 1 to 12 carbon atoms, aryloxy groups having 1 to 12 carbon atoms, a hydroxy group, an amino group, a carbonyl group, a carboxy group, a sulfonyl group, and a silyl group.

The compound having such a preferable functional group will be referred to as a partial structure represented by the following Formula (1-2).

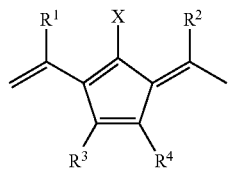

Formula (1-2)

The image recording layer may include the compound having a specific structure as a result of (i) addition of the compound thereto before exposure to laser radiation or (ii) generation of the compound in the image recording layer by exposure to laser radiation. The method of generating such a specific structure by laser exposure is not particularly limited. In a preferable embodiment, the compound having a partial structure represented by Formula (1-1) is generated by exposing an image recording layer including a precursor of the compound having a partial structure represented by Formula (1-1) and an oxidizing agent to laser radiation.

Specifically, the precursor of the compound having a partial structure represented by Formula (1-1) is, for example, a compound having a partial structure represented by the following Formula (1-3) on a polymethine chain. The oxidizing agent used in the method is not particularly limited as long as it can generate the compound having a partial structure represented by Formula (1-1). Specific examples thereof include radical polymerization initiators capable of generating a radical when decomposed and commonly known dehydrogenating agents. The dehydrogenation route is not particularly limited, and may be any one of various known routes.

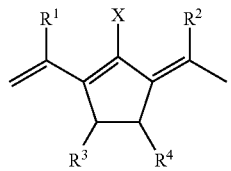

Formula (1-3)

In Formula (1-3), $R^1$, $R^2$, $R^3$, $R^4$, and X each independently represent a hydrogen atom, a halogen atom, a hydroxy group, an amino group, a nitro group, a mercapto group, a sulfonic acid group, a phosphoric acid group, or a monovalent organic group. $R^1$, $R^2$, $R^3$, $R^4$, and X have the same definitions as in Formula (1-1), and preferable examples thereof are also the same.

In the method of generating a compound having a partial structure represented by Formula (1-1) in the image recording layer by laser exposure, the radical polymerization initiator used in combination with the compound having a partial structure represented by Formula (1-3) may be any one of the radical polymerization initiators described below in detail in the section of <polymerization initiator (C)>. Among them, iodonium salts and triazine compounds are preferable, and iodonium salts are particularly preferable, from the viewpoint of visibility.

Preferable examples of the dehydrogenating agent used in the method of generating a compound having a partial structure represented by Formula (1-1) from its precursor in the image recording layer by laser exposure include quinone, trityl cation, sulfur, bromine, N-bromosuccinimide, N-chlorosuccinimide, sulfuryl chloride, hydrogen peroxide, and hypervalent iodine compounds such as iodosobenzene.

When quinone or trityl cation is used for dehydrogenation, the dehydrogenating agent used is hydrogenated directly (hydride ion transfer). For example, when bromine, N-bromosuccinimide, N-chlorosuccinimide or sulfuryl chloride is used, the precursor is halogenated, followed by elimination of hydrogen halide. When hydrogen peroxide or iodosobenzene is used, the precursor is S-oxidated and then dehydrated, for example. When sulfur is used, the precursor is thiolated followed by elimination of hydrogen sulfide.

In view of visibility, the dehydrogenating agent is particularly preferably quinone or trityl cation. Among the dehydrogenating agents, 2,3,5,6-tetrachloro-1,4-benzoquinone (chloranil) or 2,3-dichloro-5,6-dicyano-1,4-benzoquinone, and trityl cations having a strong-acid counter anion are particularly preferable.

The oxidizing agent generating a compound having a specific structure from its precursor is most preferably an iodonium salt, from the viewpoint of visibility.

Preferable examples of the compounds having a specific structure used in the invention include the compounds represented by the following Formulae (3) or (4).

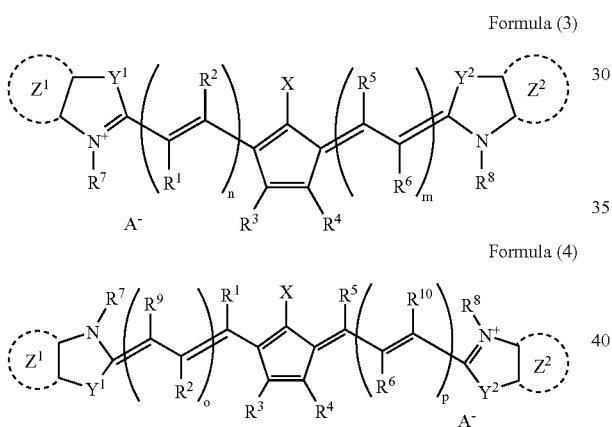

Formula (3)

Formula (4)

In Formulae (3) and (4), $R^1$, $R^2$, $R^5$, $R^6$, $R^9$, and $R^{10}$ each independently represent a hydrogen atom or a hydrocarbon group. $R^3$ and $R^4$ each independently represent a hydrogen atom, a hydrocarbon group, a halogen atom, an alkoxy group, an aryloxy group, an amino group, a carbonyl group, or a silyl group. $R^3$ and $R^4$ may bond to each other to form a ring. In Formulae (3) and (4), $R^1$, $R^2$, $R^5$, $R^6$, $R^9$, and $R^{10}$ each have the same definition as that of $R^1$ and $R^2$ in Formula (1-1), and preferable examples thereof are also the same. In addition, $R^3$ and $R^4$ respectively have the same definition as $R^3$ and $R^4$ in Formula (1-1), and preferable examples thereof are also the same.

X represents a hydrogen atom, a halogen atom, —N(Aryl)$_2$, —$X^2$-$L^1$, a chain or cyclic hydrocarbon group, a heterocyclic group or a group represented by the following Formula (2). In the Formula, Aryl represents an aryl group; $X^2$ represents an oxygen, nitrogen, or sulfur atom; and $L^1$ represents a hydrocarbon group, a heteroatom-containing aromatic ring, or a heteroatom-containing hydrocarbon group. The heteroatom is an atom selected from N, S, O, halogen atoms, and Se. Preferable examples of X are the same as in Formula (1-1).

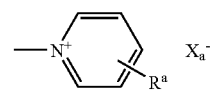

Formula (2)

$X_a^-$ represents a counter ion that is present when neutralization of the electric charge is necessary. $R^a$ represents a substituent selected from a hydrogen atom, an alkyl group, an aryl group, an amino group, or a halogen atom.

Specifically, preferable examples of the hydrocarbon ring that may have a substituent include, but are not limited to, the followings:

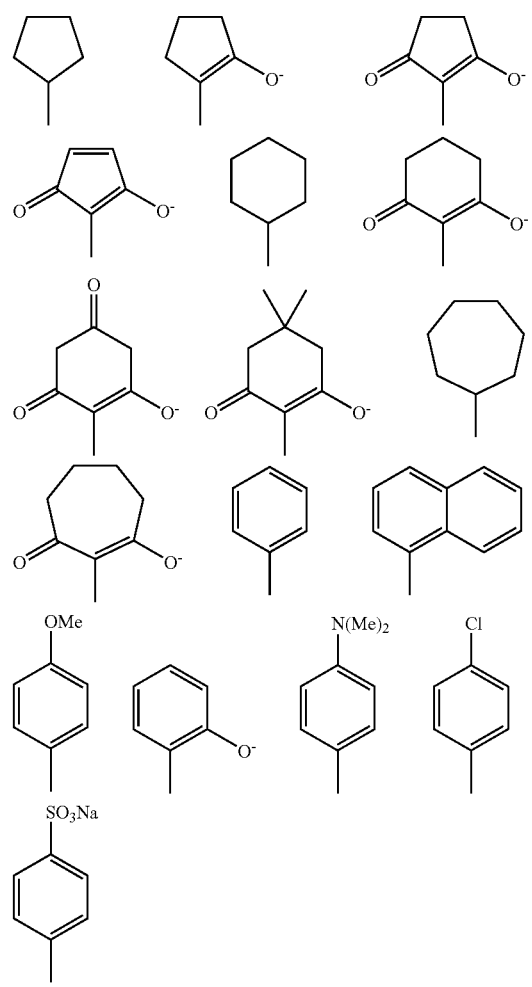

Specifically, preferable examples of the heterocyclic rings that may have a substituent, include, but are not limited to, the followings:

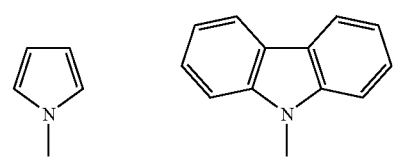

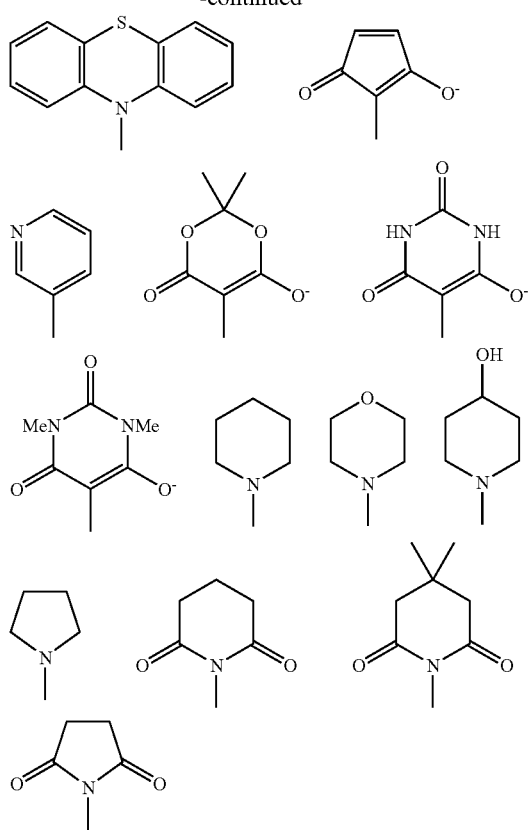

X is preferably —N(Aryl)$_2$ from the viewpoint of visibility.

Y$^1$ and Y$^2$ may be the same as or different from each other, and each independently represent N—R$^{11}$, S, O or a dialkylmethylene group. R$^{11}$ represents a hydrogen atom or a hydrocarbon group that may have a substituent, preferably a dialkylmethylene group from the viewpoint of visibility. In view of visibility, the substituent represented by R$^7$ or R$^8$ is preferably an alkyl group having 1 to 12 carbon atoms or an ether group having 1 to 12 carbon atoms.

Z$^1$ and Z$^2$ each independently represent an aromatic or heteroaromatic ring. Z$^1$ and Z$^2$ may represent, for example, a benzene, naphthalene, or pyridine ring, and a benzene ring is more preferable. The aromatic or heteroaromatic ring may have a substituent additionally, and preferable examples of the introducible substituents include alkyl groups having 1 to 12 carbon atoms, alkoxy groups having 1 to 12 carbon atoms, an amino group, and halogen atoms.

A$^-$ represents a counter ion that is present when neutralization of the electric charge is required. The counter ion is not particularly limited, and is preferably a halide, perchlorate, tetrafluoroborate, hexafluorophosphate, or sulfonate ion, particularly preferably a tetrafluoroborate or hexafluorophosphate ion, from the viewpoint of visibility.

m, n, o, and p each independently denote an integer from 0 or greater, and is preferably from 0 to 2 in view of visibility. In particular, the compound represented by Formula (3) in which n and m are both 0 is most preferred.

Examples of the compounds having a methine-chain structure including the partial structure represented by Formula (1-1) or (1-2) preferably used in the invention, more specifically the compounds represented by Formula (3) or (4), include, but are not limited to, the following compounds [exemplary compounds (A-1) to (A-50)].

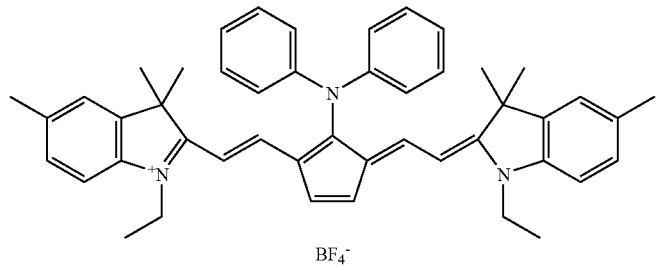

(A-1)

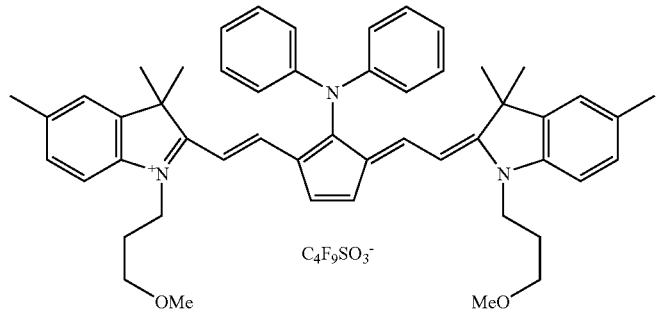

(A-2)

-continued
(A-3)
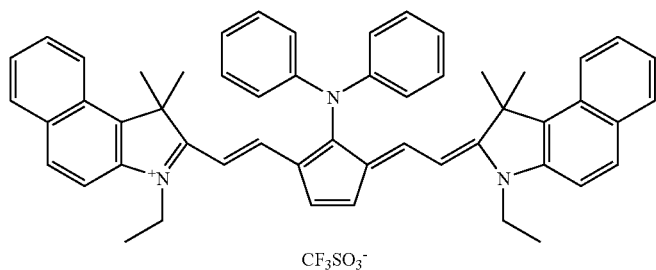
(A-4)
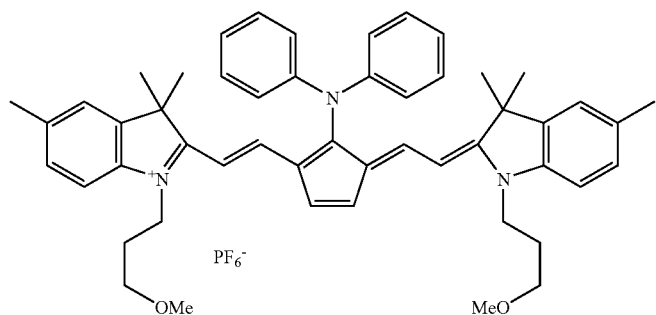
(A-5)
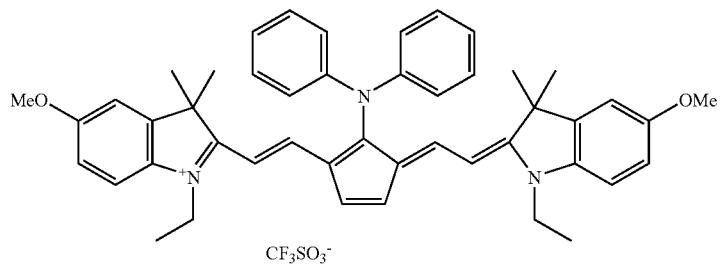
(A-6)
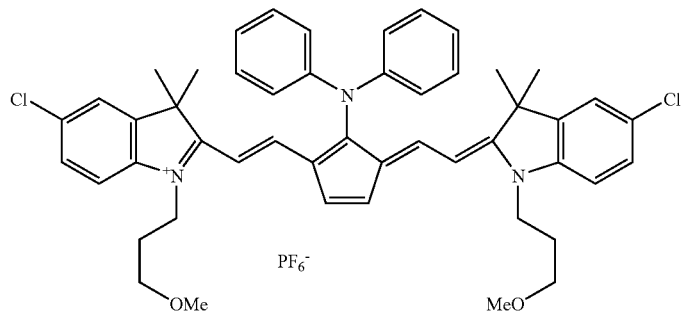
(A-7)
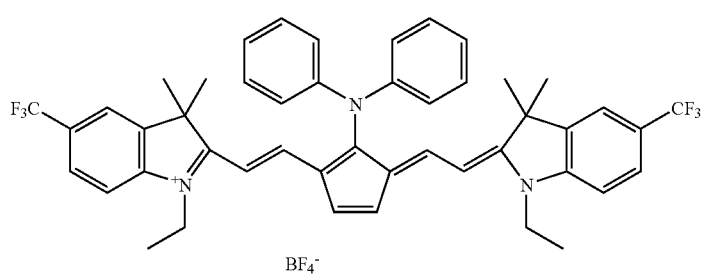

-continued
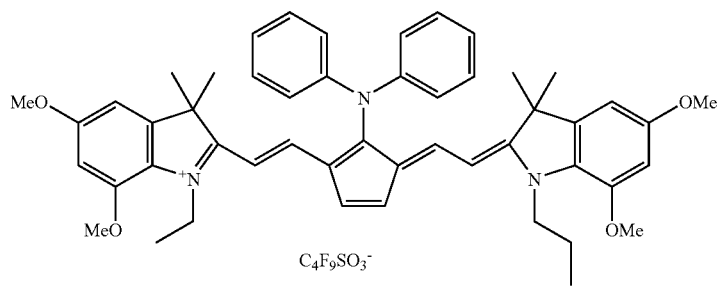
(A-8)
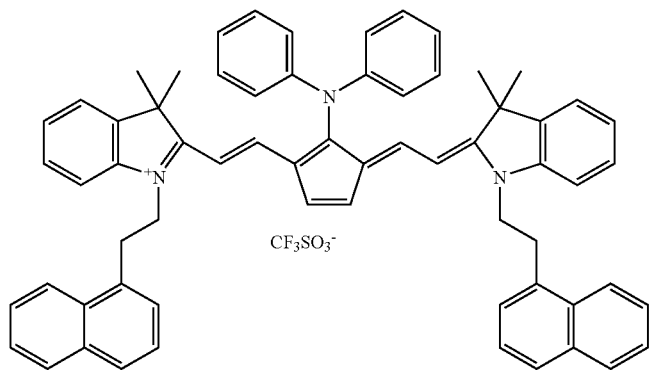
(A-9)
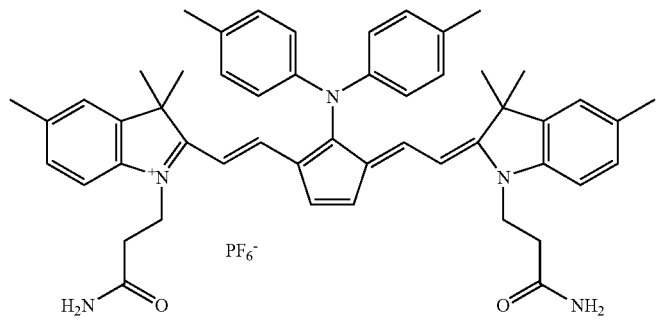
(A-10)
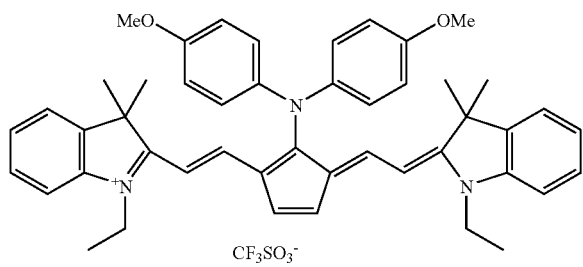
(A-11)
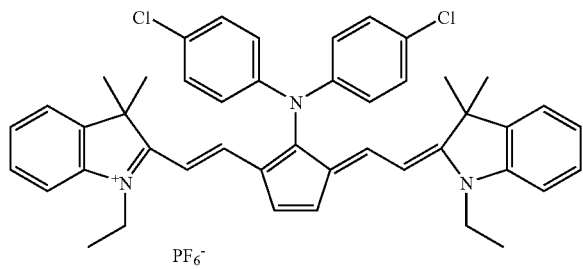
(A-12)

-continued
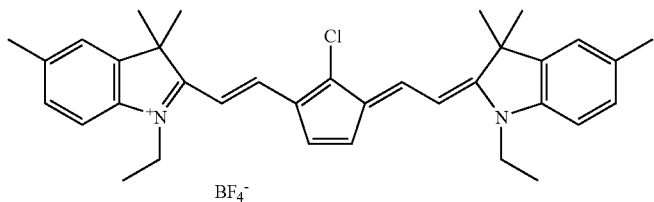
(A-13)
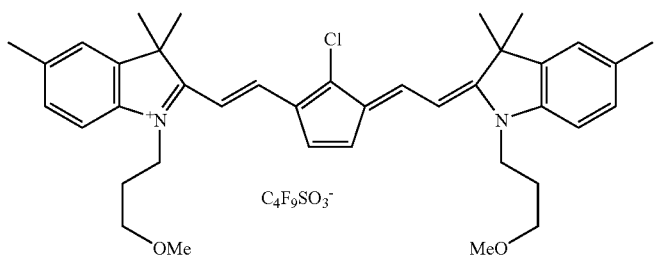
(A-14)
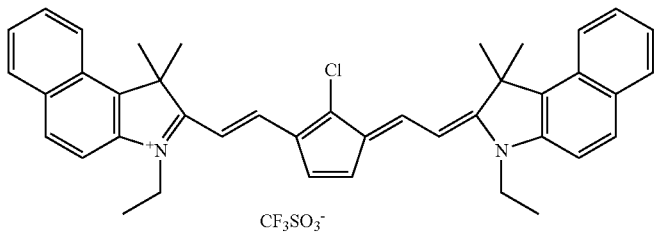
(A-15)
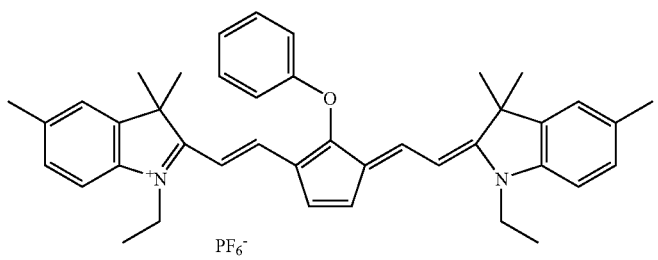
(A-16)
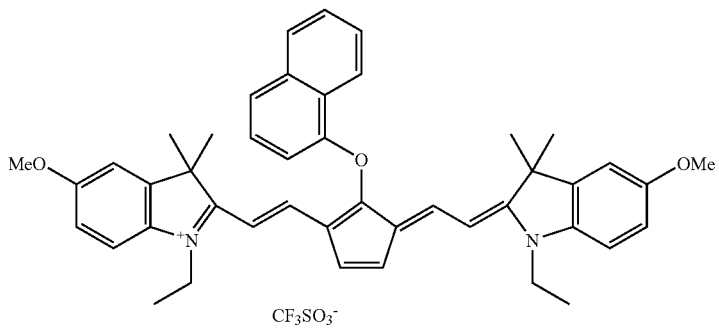
(A-17)
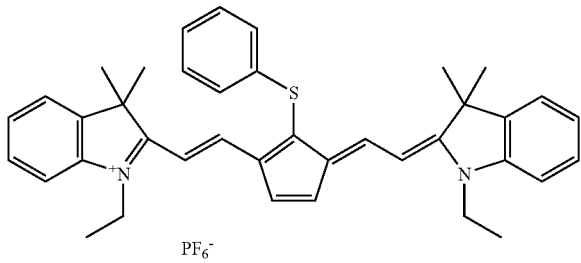
(A-18)

-continued
(A-19)
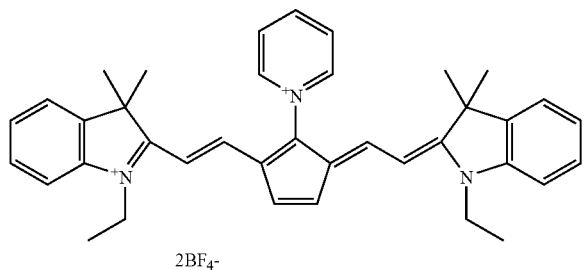
2BF4-
(A-20)
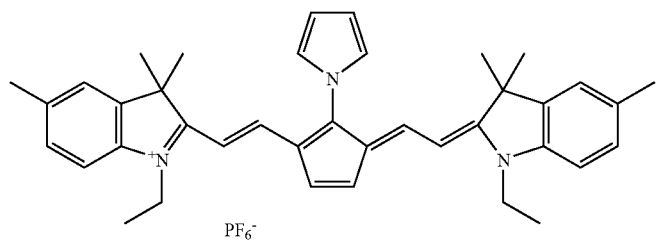
PF6-
(A-21)
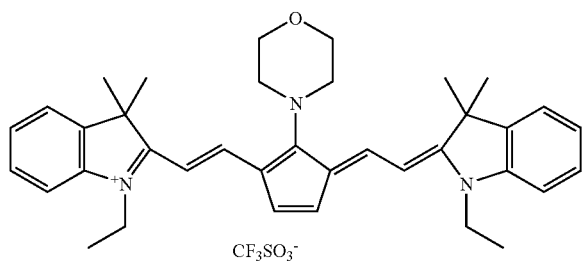
CF3SO3-
(A-22)
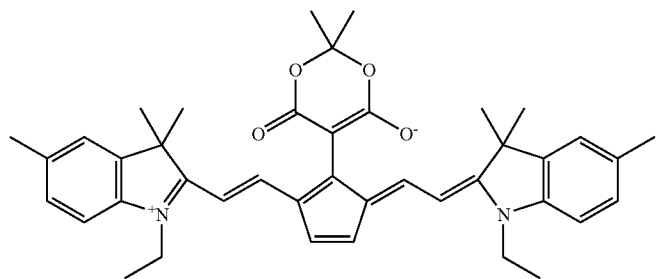
(A-23)
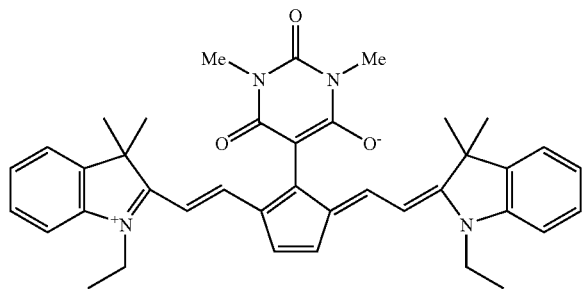

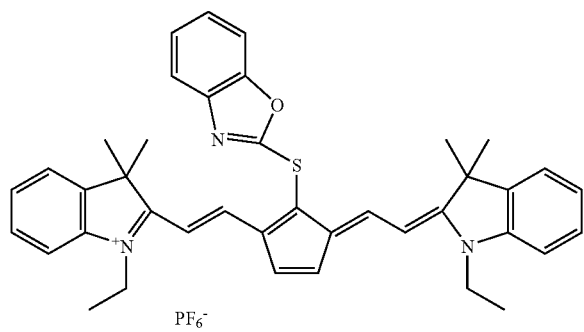
(A-24)
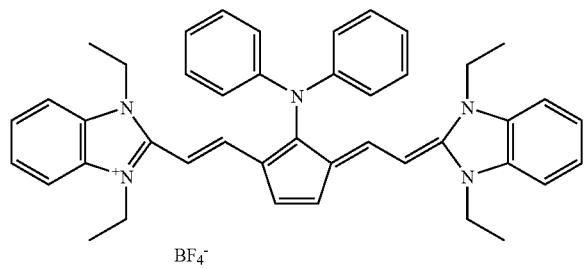
(A-25)
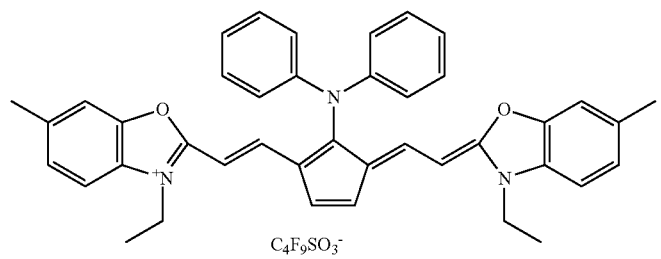
(A-26)
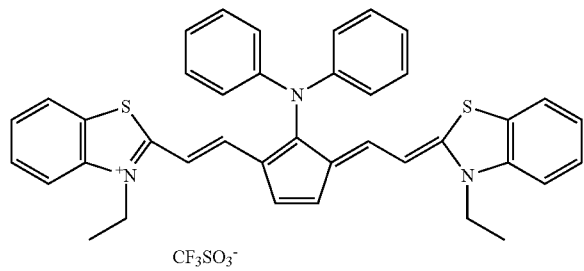
(A-27)
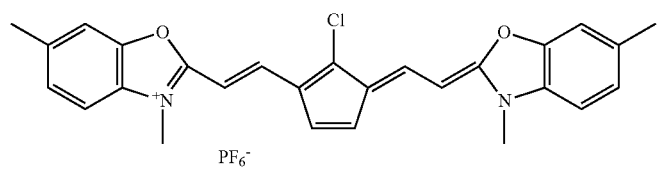
(A-28)
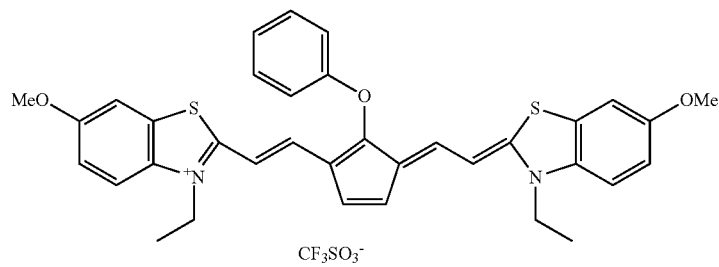
(A-29)

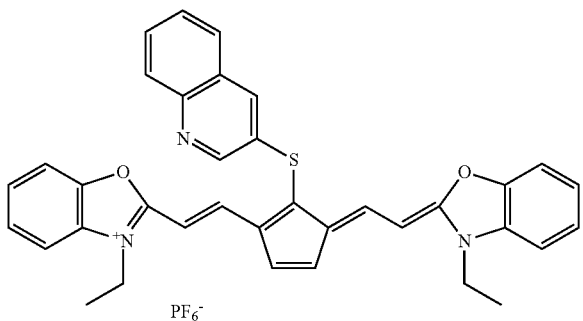
(A-30)
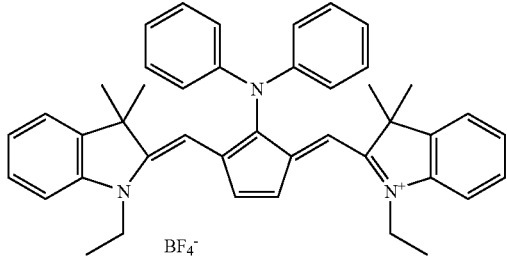
(A-31)
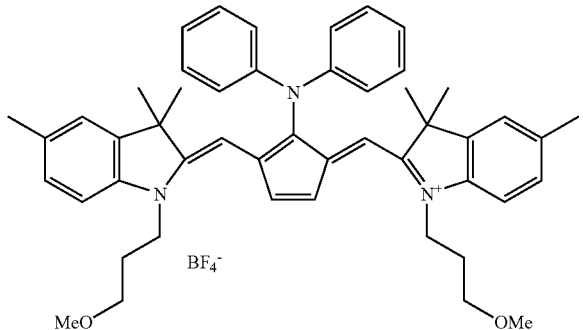
(A-32)
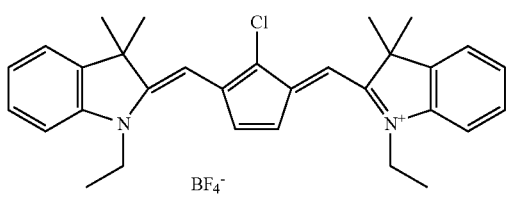
(A-33)
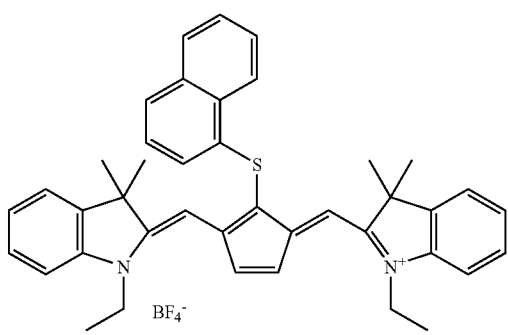
(A-34)
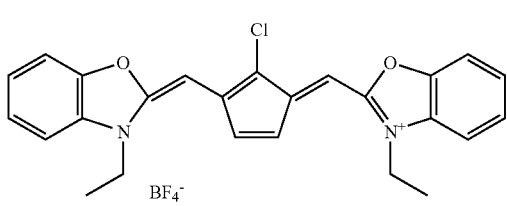
(A-35)

-continued
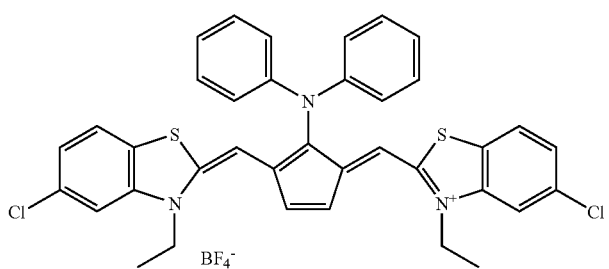
(A-36)
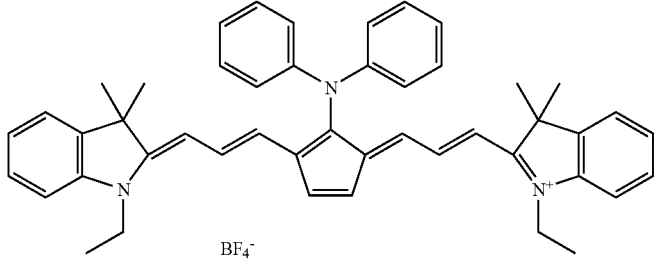
(A-37)
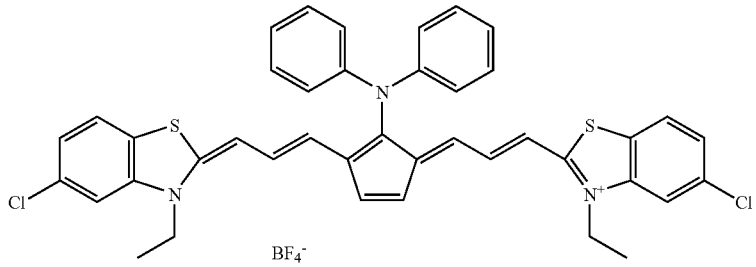
(A-38)
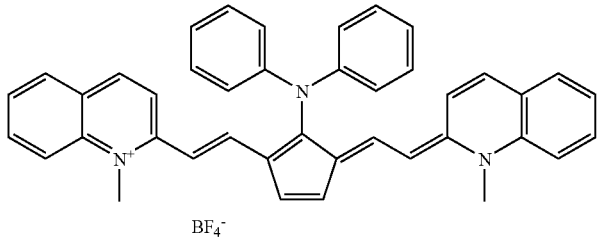
(A-39)
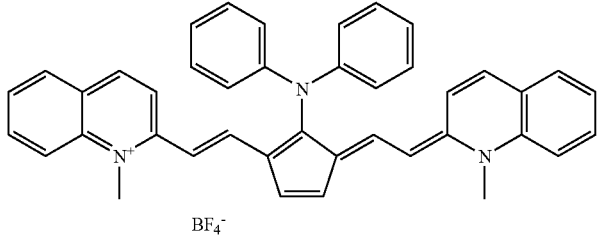
(A-40)
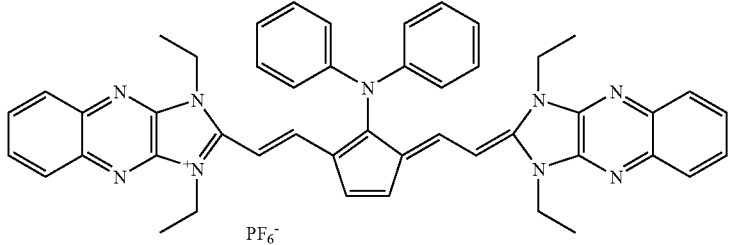
(A-41)

-continued
(A-42)
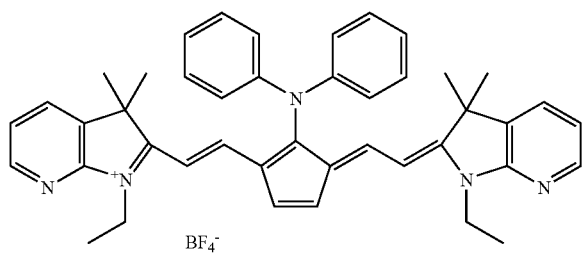
(A-43)
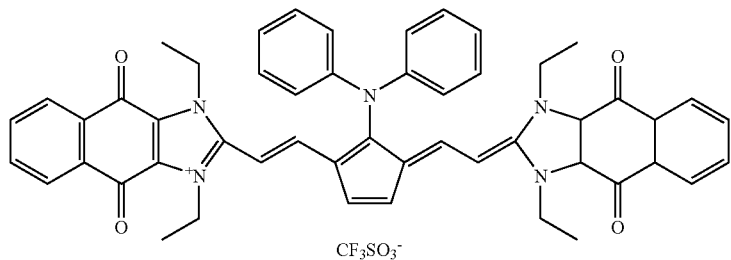
(A-44)
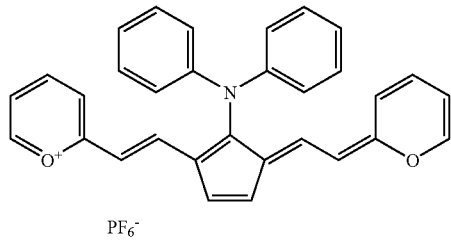
(A-45)
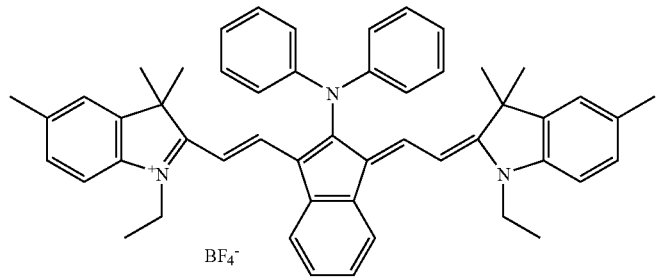
(A-46)
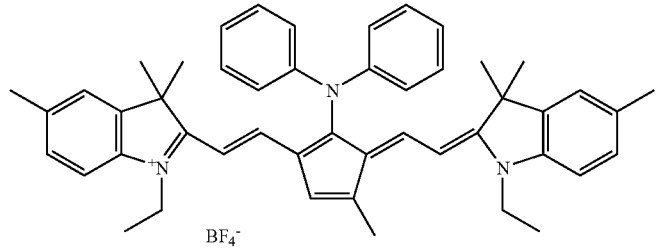
(A-47)
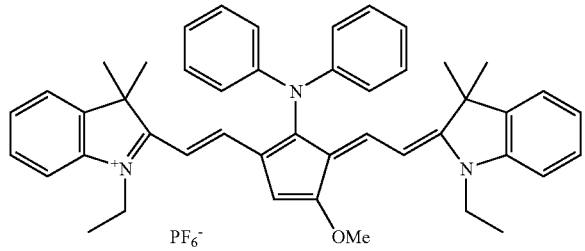

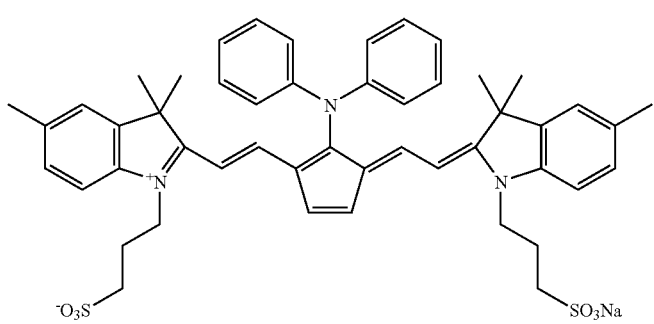
(A-48)

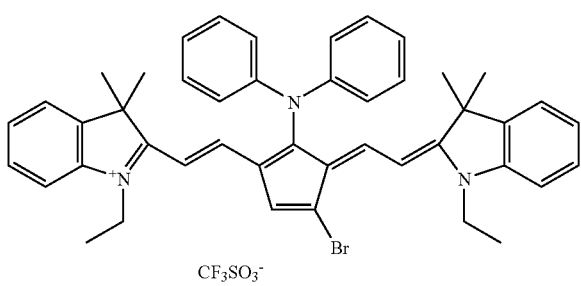
(A-49)

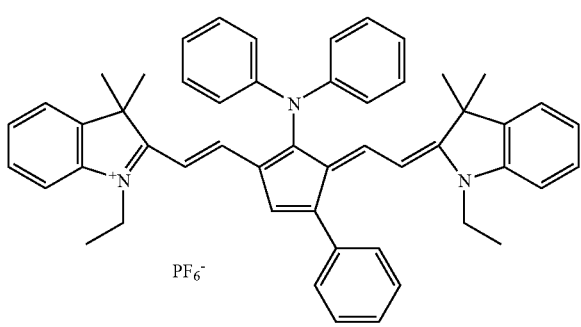
(A-50)

Such compounds can be prepared, for example, according to the methods described in Experimental Chemistry Course, 4th Ed., 23 Organic Synthesis V, Oxidation Reaction (1996, Maruzen Co., Ltd.) or a scheme similar to those described in detail in the Preparative Examples below. It is thus possible to prepare various compounds having a specific structure by appropriately selecting the raw materials and the synthetic condition in the schemes described below.

The compound (A) having a specific structure may be added in an amount of 0.1 to 30 wt %, preferably 0.5 to 20 wt %, and particularly preferably 0.5 to 10 wt %, with respect to the total solid content in the image recording layer. Favorable visibility is obtained in the range above. On the other hand, when the compound is generated in the image recording layer by using its precursor, the addition amount of the precursor is adjusted such that the amount of the generated compound falls in the range above. Only one compound (A) may be used, or a combination of two or more compounds (A) may be used.

In the following, the image forming material in a second embodiment is described. The image forming material in this embodiment includes a support and an image recording layer provided on the support. The image recording layer includes a precursor of a cation radical molecule and an electron accepting compound.

In a planographic printing plate precursor having a recording layer including the image forming material of this embodiment, the image recording layer provided on the support includes (A-1) a precursor of a cation radical molecule and (B-2) an electron accepting compound, as well as (C) a photoabsorbing material, (D) polymerizable compound, (E) a binder polymer and (F) a microgel or microcapsule. In the following, the precursor (A-1) for a cation radical molecule and the electron accepting compound (A-2), which are used in the image forming material in this embodiment, are described.

<(A-1) Precursor of Cation Radical Molecule, and Cation Radical Molecule>

The image recording layer according to the invention may include a precursor of a cation radical molecule that generates a cation radical molecule through electron transfer and changes its color and/or brightness when exposed to laser radiation. The cation radical molecule precursor is not particularly limited as long as it generates a cation radical molecule through electron transfer and changes its color and/or brightness when exposed to laser radiation. The cation radical molecule precursor is preferably a compound having a structure in which two heterocyclic rings are bound to each other via a polymethine chain (compound having a polymethine chain connected to heterocyclic rings at both terminals). The cation radical molecule formed as a result of electron transfer caused by laser exposure is most preferably a compound represented by the following Formula (1).

Formula (1)

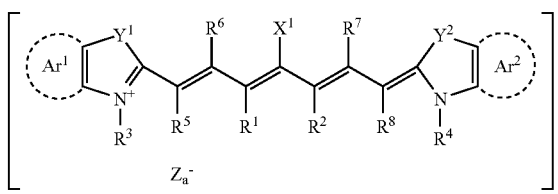

In Formula (1), $X^1$ represents a hydrogen atom, a halogen atom, —N(Aryl)$_2$, —$X^2$-$L^1$, a hydrocarbon group that may have a substituent, a hydrocarbon ring that may have a substituent, a heterocyclic ring that may have a substituent or a group represented by the following Formula (2). In the Formula, Aryl represents an aryl group that may have a substituent; $X^2$ represents an oxygen, nitrogen, or sulfur atom; and $L^1$ represents a hydrocarbon group, a heteroatom-containing aromatic ring, or a heteroatom-containing hydrocarbon group. The heteroatom represents N, S, O, a halogen atom, or Se.

Formula (2)

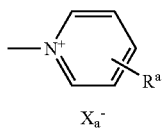

$X_a^-$ represents a counter ion that is present when neutralization of the electric charge is required. $R^a$ represents a substituent selected from a hydrogen atom, an alkyl group, an aryl group, a substituted and unsubstituted amino group, or a halogen atom.

$R^1$ and $R^2$ each independently represent a hydrocarbon group that may have a substituent; and $R^1$ and $R^2$ may bond to each other to form a ring. $Ar^1$ and $Ar^2$ each independently represent an aromatic hydrocarbon group that may have a substituent. $Y^1$ and $Y^2$ each independently represent a sulfur atom or a dialkylmethylene group having 12 or fewer carbon atoms. $R^3$ and $R^4$ each independently represent a hydrocarbon group that may have a substituent. $R^5$, $R^6$, $R^7$ and $R^8$ each independently represent a hydrogen atom or a hydrocarbon group having 12 or fewer carbon atoms. $Z_a^-$ represents a halide, perchlorate, borate, hexafluorophosphate, or sulfonate ion. In view of the stability of the cation radical molecule, $Z_a^-$ represents preferably a tetrafluoroborate ion, a hexafluorophosphate ion, a tetrakis(pentafluorophenyl)borate ion, a tetrakis[3,5-bis(trifluoromethyl)phenyl]borate ion, or a perfluoroalkylsulfonimide. However, when the compound represented by Formula (1) has an anionic substituent in its structure and does not need neutralization of the electric charge, $Z_a^-$ may be omitted.

More preferable examples of the compounds having a specific structure among precursors of cation radical molecules usable in the invention include the compounds represented by the following Formulae (3-2) or (4-2).

Formula (3-2)

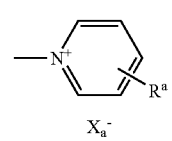

Formula (4-2)

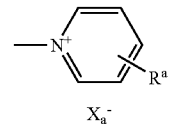

In Formulae (3-2) and (4-2), $R^1$, $R^2$, $R^5$, $R^6$, $R^9$, and $R^{10}$ each independently represent a hydrogen atom or a hydrocarbon group having 1 to 12 carbon atoms that may have a substituent. $R^3$ and $R^4$ each independently represent a hydrogen atom, a hydrocarbon group having 1 to 12 carbon atoms that may have a substituent, a halogen atom, an alkoxy group having 1 to 12 carbon atoms, an aryloxy group having 1 to 12 carbon atoms, an amino group, a carbonyl group, or a silyl group. $R^3$ and $R^4$ may bond to each other to form a ring. $R^7$ and $R^8$ each independently represent a hydrocarbon group having 1 to 12 carbon atoms that may have a substituent. In view of the stability of the cation radical molecule, $R^7$ and $R^8$ are each preferably a hydrocarbon group having an aromatic ring that may have a substituent. Specifically, a phnylethyl group, a carbazolylethyl group, a naphthylethyl group, and an anthracenyl group are preferable, and a naphthylethyl group and a carbazolylethyl group are most preferable. X represents a hydrogen atom, a halogen atom, —N(Aryl)$_2$, $X^2$-$L^1$, a hydrocarbon group that may have a substituent, a hydrocarbon ring that may have a substituent, a heterocyclic ring that may have a substituent or a group represented by the following Formula (2). In the Formula, Aryl represents an aryl group having 6 to 12 carbon atoms that may have a substituent; $X^2$ represents an oxygen, nitrogen, or sulfur atom; and $L^1$ represents a hydrocarbon group having 1 to 12 carbon atoms, a heteroatom-containing aromatic ring, or a heteroatom-containing hydrocarbon group having 1 to 12 carbon atoms. The heteroatom represents N, S, O, a halogen atom, or Se.

X is preferably —N(Aryl)$_2$ from the viewpoint of visibility.

Formula (2)

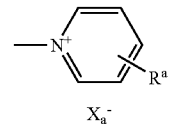

$X_a^-$ represents a counter ion that is present when neutralization of the electric charge is necessary. $R^a$ represents a substituent selected from a hydrogen atom, an alkyl group having 1 to 12 carbon atoms, an aryl group having 6 to 12 carbon atoms, a substituted or unsubstituted amino group, or a halogen atom.

Specifically, preferable examples of the hydrocarbon ring that may have a substituent include, but are not limited to, the followings:

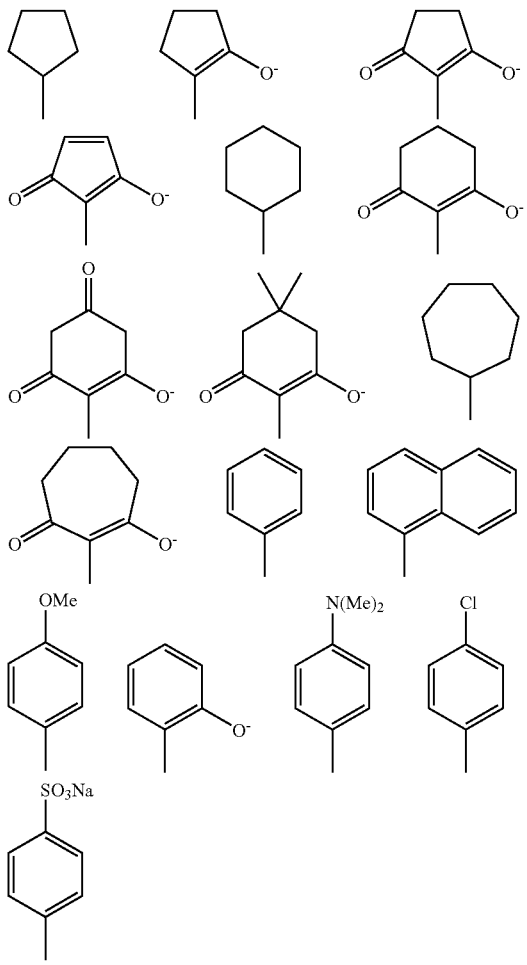

Specifically, preferable examples of the heterocyclic ring that may have a substituent include, but are not limited to, the following rings.

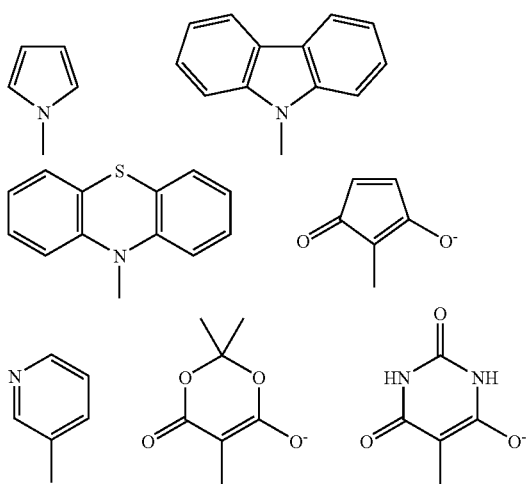

-continued

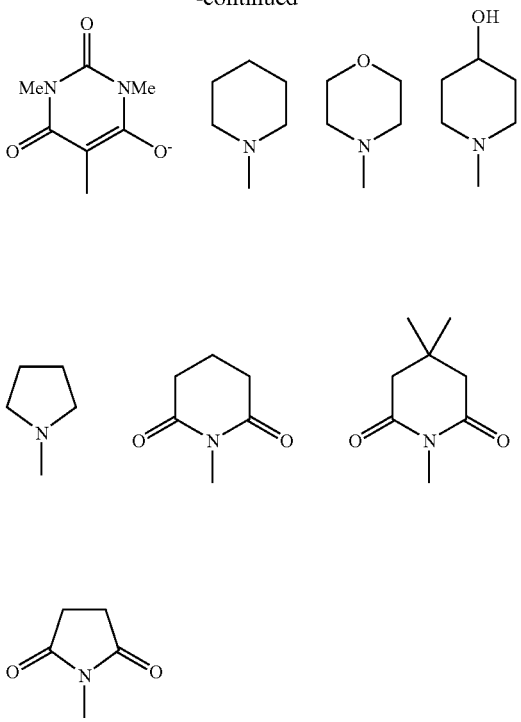

$Y^1$ and $Y^2$ may be the same as or different from each other, and each independently represent N, S, O or a dialkylmethylene group. A dialkylmethylene group is preferable from the viewpoint of visibility.

$Z^1$ and $Z^2$ each independently represent an aromatic or heteroaromatic ring that may have a substituent. $A^-$ represents a counter ion that is present when neutralization of the electric charge is necessary. The counter ion is not particularly limited, and is preferably a halide, perchlorate, tetrafluoroborate, hexafluorophosphate, or sulfonate ion, particularly preferably a tetrafluoroborate or hexafluorophosphate ion from the viewpoint of visibility. In view of the stability of the cation radical molecule, $A^-$ is preferably a tetrafluoroborate ion, a hexafluorophosphate ion, a tetrakis(pentafluorophenyl)borate ion, a tetrakis[3,5-bis(trifluoromethyl)phenyl]borate ion, or a perfluoroalkylsulfonimide.

m, n, o, and p each independently denote an integer from 0 or greater, and is preferably from 0 to 2 from the viewpoint of visibility. In the most preferable embodiment in view of visibility, the compound is represented by formula (3-2) in which n and m are both 0.

When these groups have substituents, examples of introducible substituents include alkyl groups having 1 to 12 carbon atoms, aryl groups having 6 to 12 carbon atoms, halogen atoms, alkoxy groups having 1 to 12 carbon atoms, aryloxy groups having 1 to 12 carbon atoms, a hydroxy group, an amino group, a carbonyl group, a carboxy group, a sulfonyl group, and a silyl group.

Specific examples of the precursor of a compound represented by Formula (1) preferably used in the invention include, but are not limited to, the following compounds [exemplary compound (A-1-1) to (A-1-58)]. Further, specific examples of the cation radical molecule that can be used preferably in the invention include the compounds generated from the exemplary compounds (A-1-1) to (A-1-58) through electron transfer caused by exposure to laser radiation.

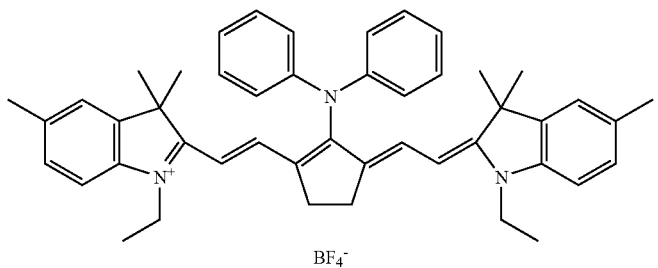
(A-1-1)
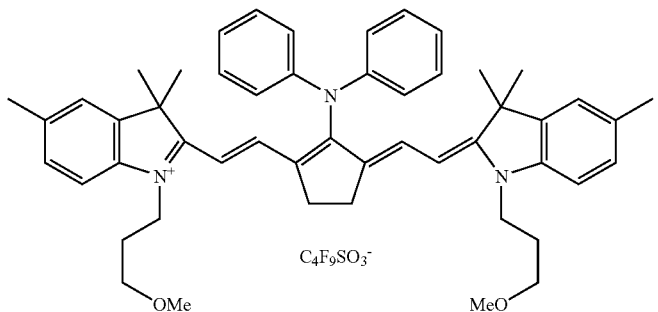
(A-1-2)
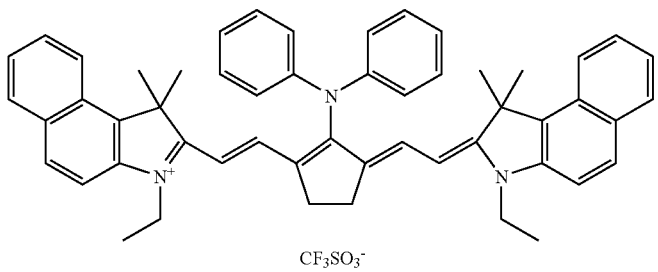
(A-1-3)
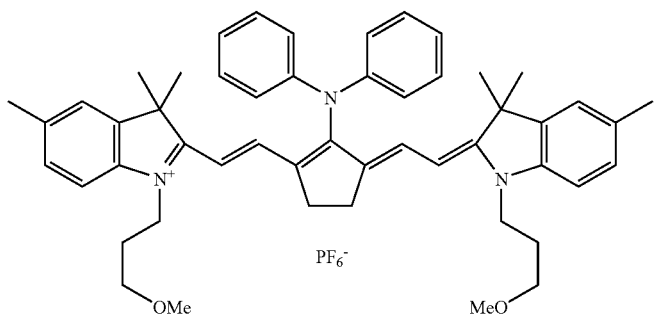
(A-1-4)
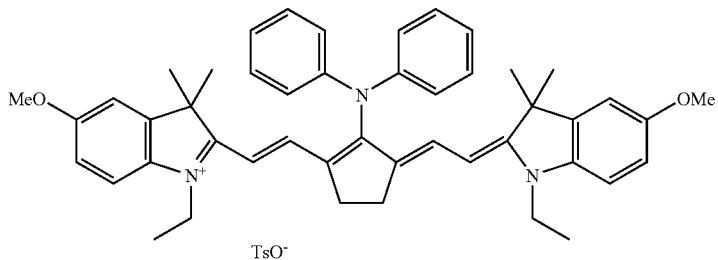
(A-1-5)

-continued
(A-1-6)
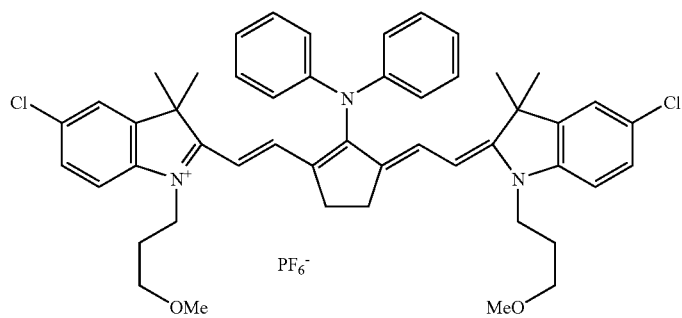
(A-1-7)
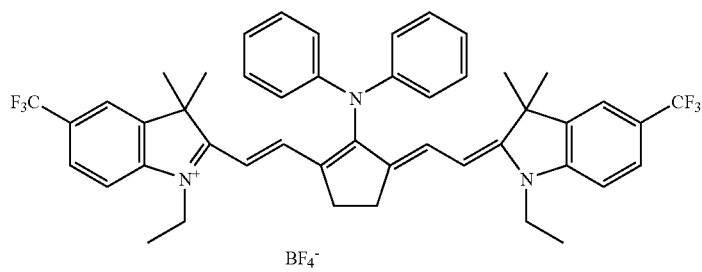
(A-1-8)
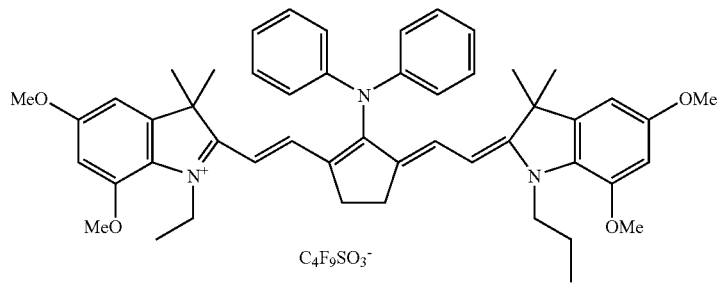
(A-1-9)
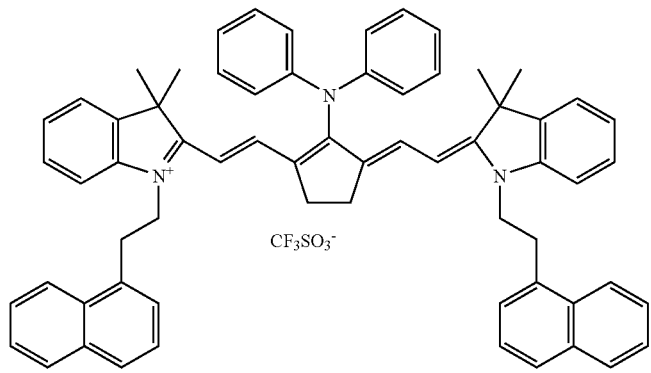
(A-1-10)
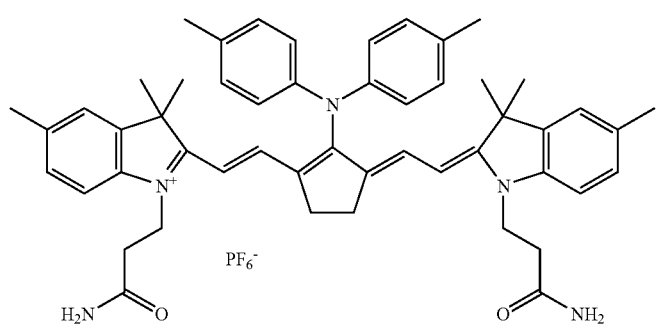

(A-1-11)
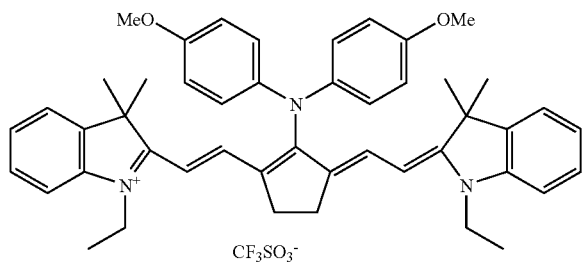
(A-1-12)
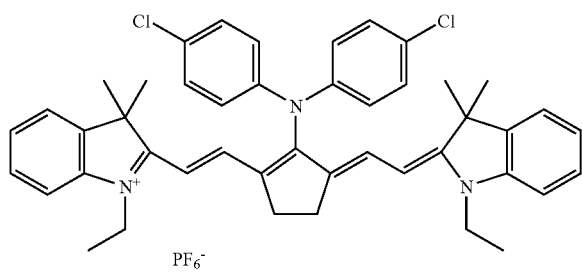
(A-1-13)
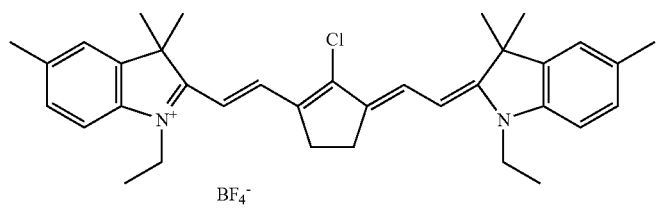
(A-1-14)
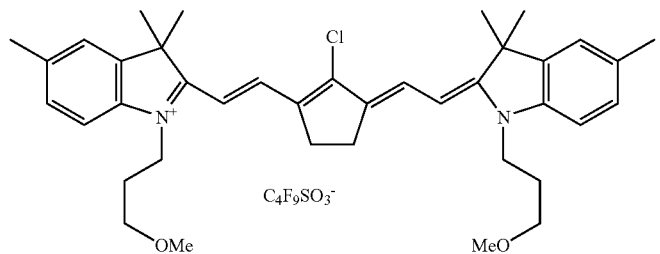
(A-1-15)
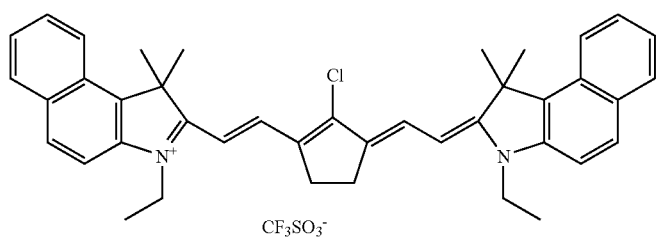
(A-1-16)
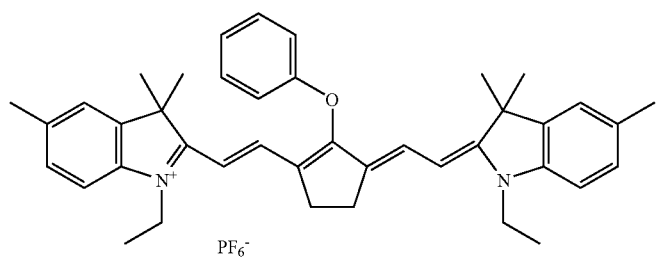

(A-1-17)
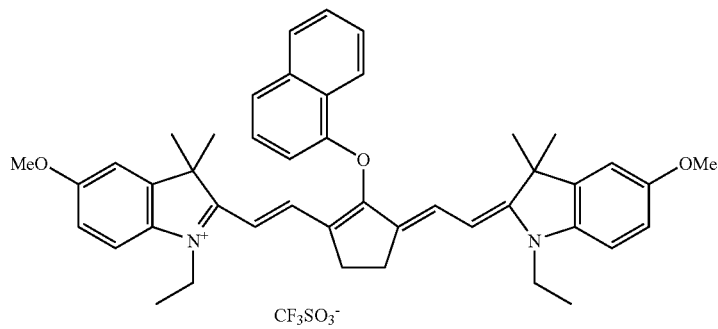
(A-1-18)
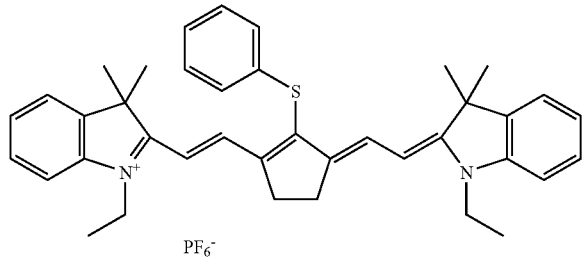
(A-1-19)
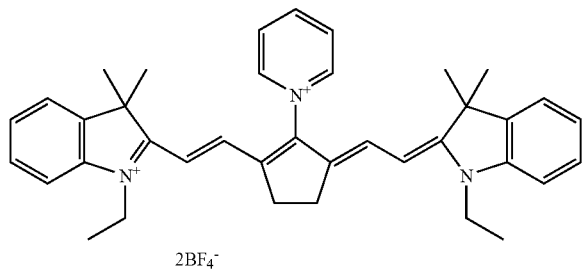
(A-1-20)
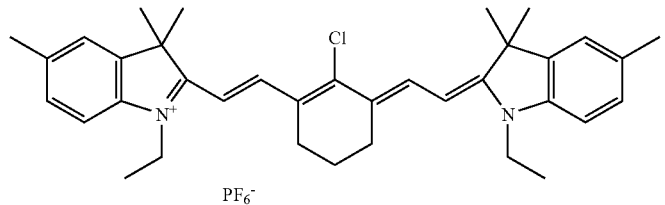
(A-1-21)
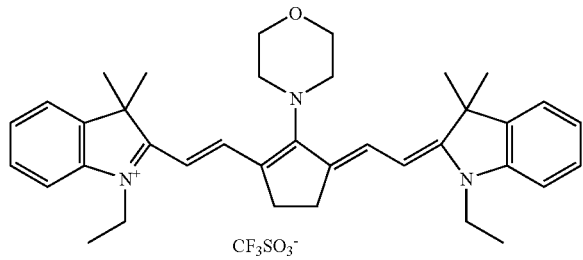
(A-1-22)
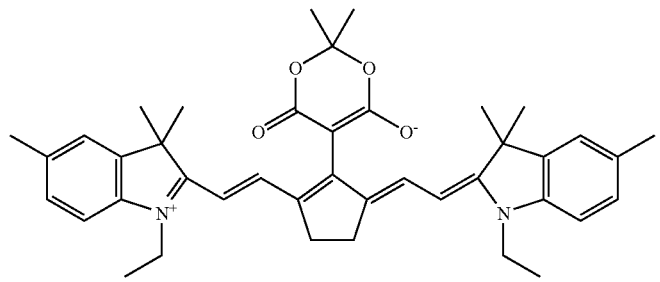

(A-1-23)
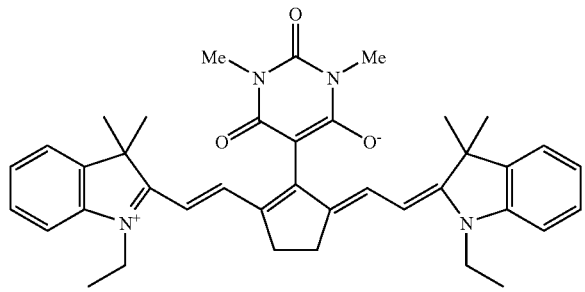
(A-1-24)
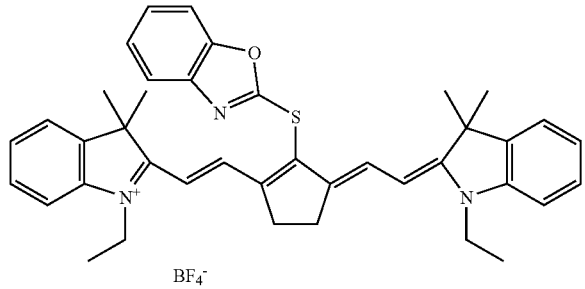
(A-1-25)
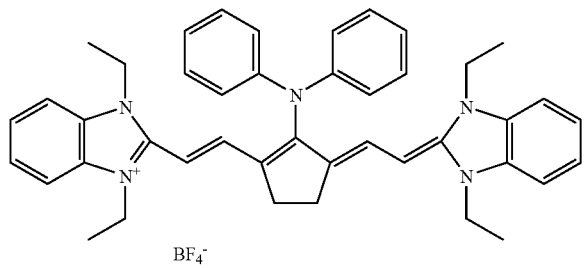
(A-1-26)
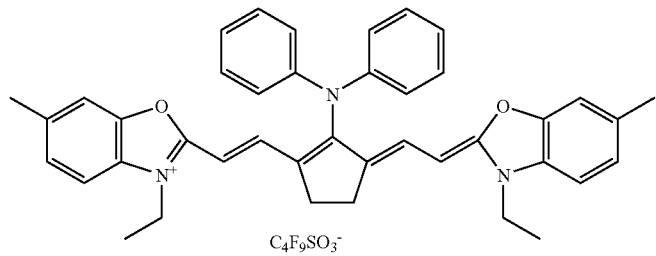
(A-1-27)
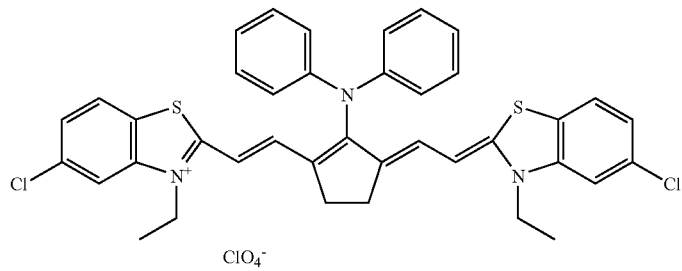
(A-1-28)
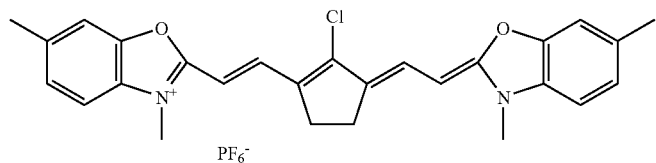

(A-1-29)
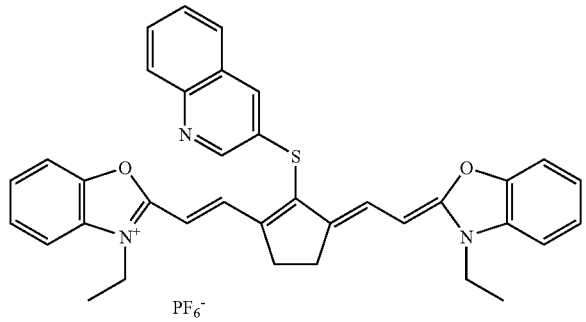
(A-1-30)
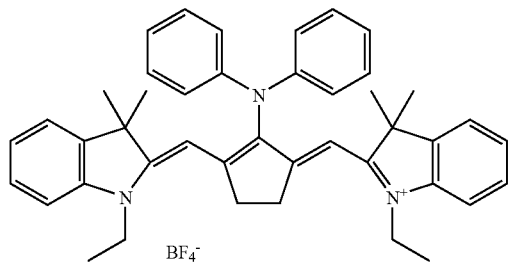
(A-1-31)
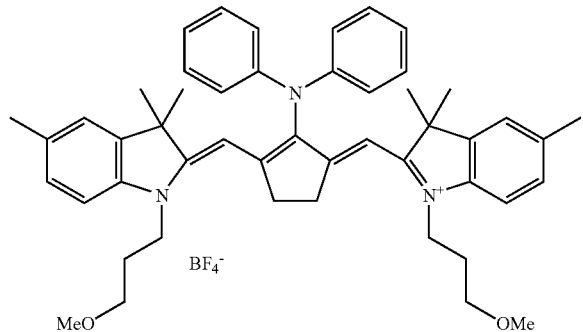
(A-1-32)
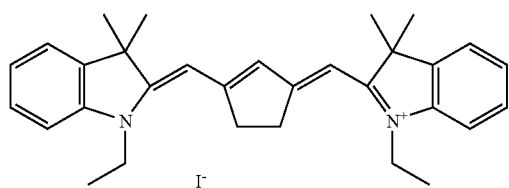
(A-1-33)
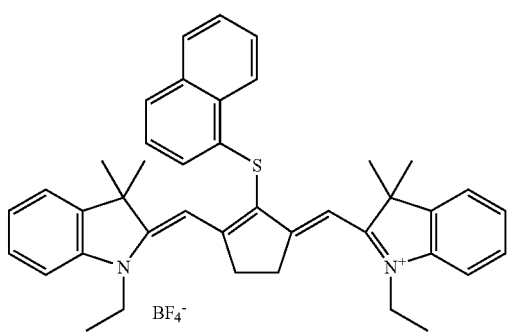
(A-1-34)

(A-1-35)
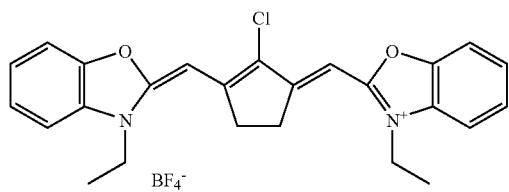
(A-1-36)
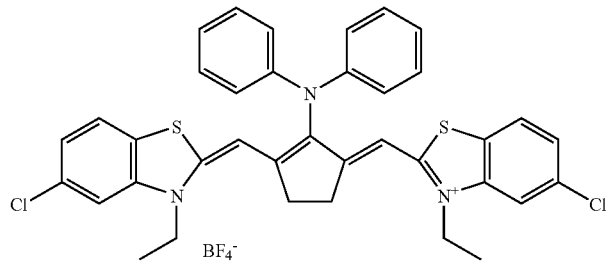
(A-1-37)
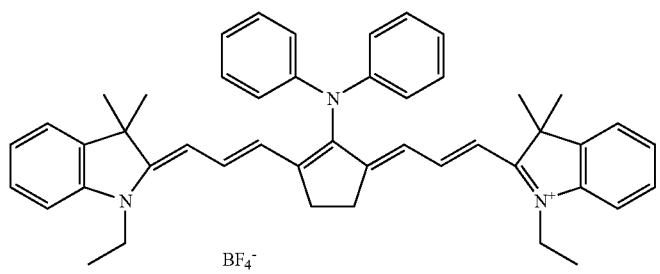
(A-1-38)
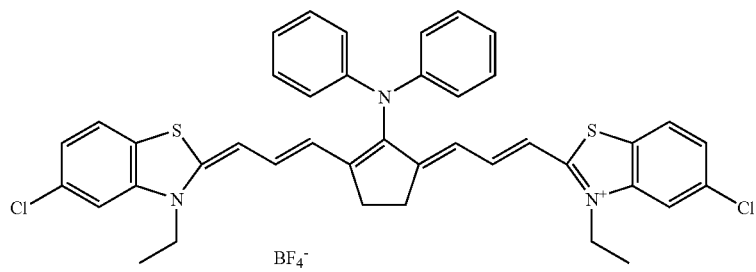
(A-1-39)
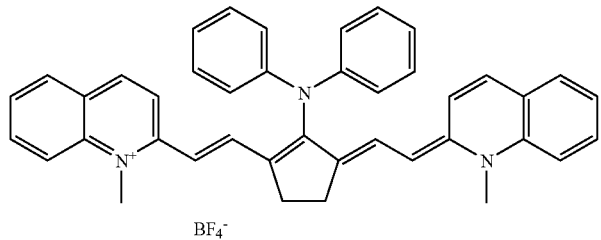
(A-1-40)
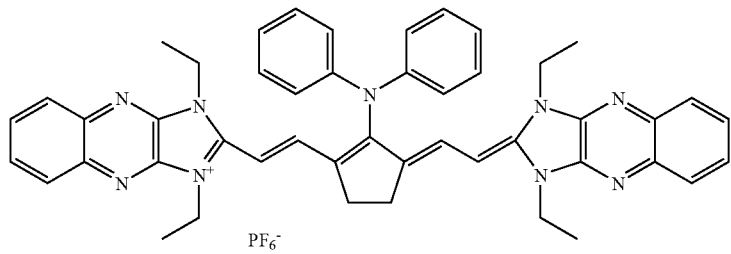

-continued
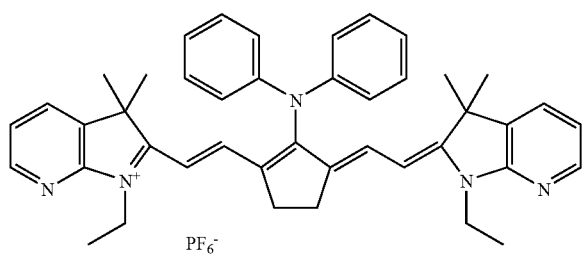
(A-1-41)
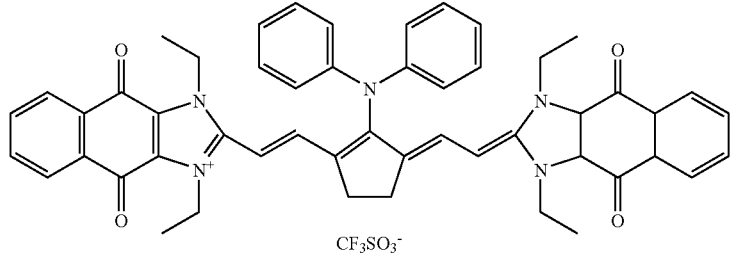
(A-1-42)
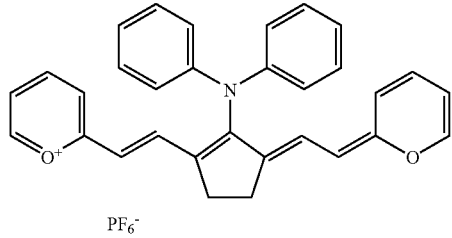
(A-1-43)
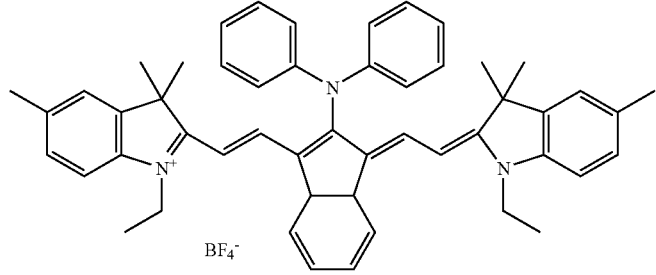
(A-1-44)
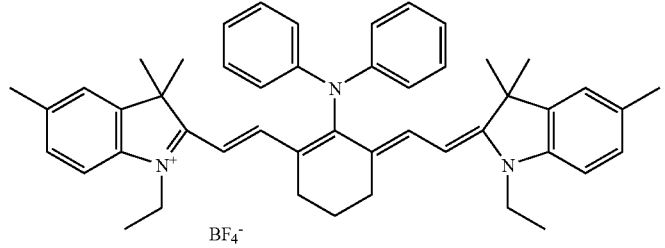
(A-1-45)
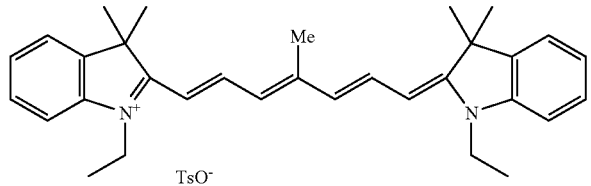
(A-1-46)

-continued
(A-1-47)
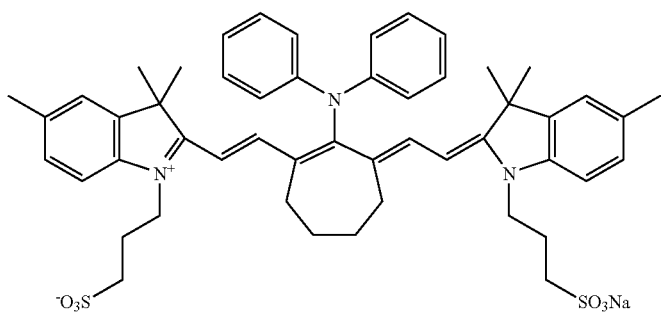
(A-1-48)
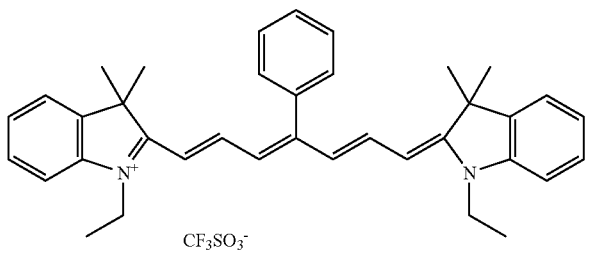
(A-1-49)
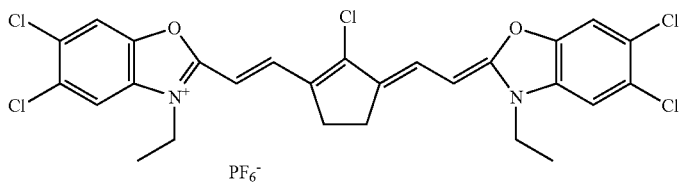
(A-1-50)
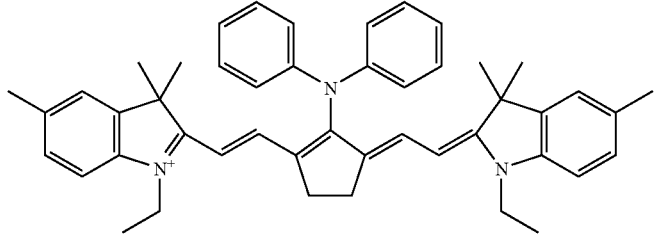 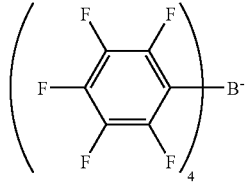
(A-1-51)
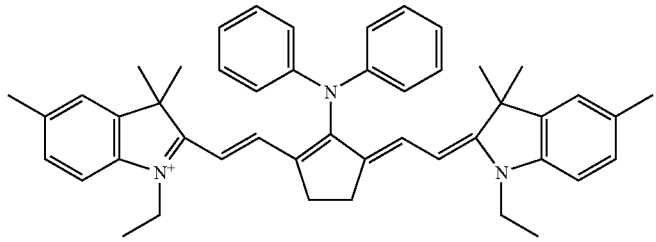 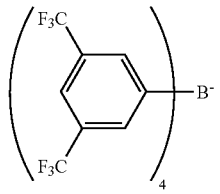
(A-1-52)
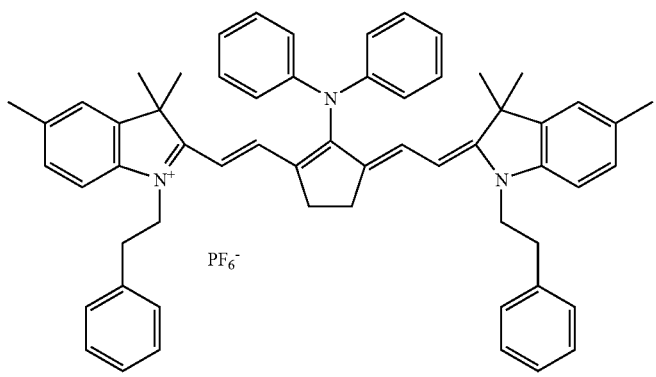

(A-1-53)
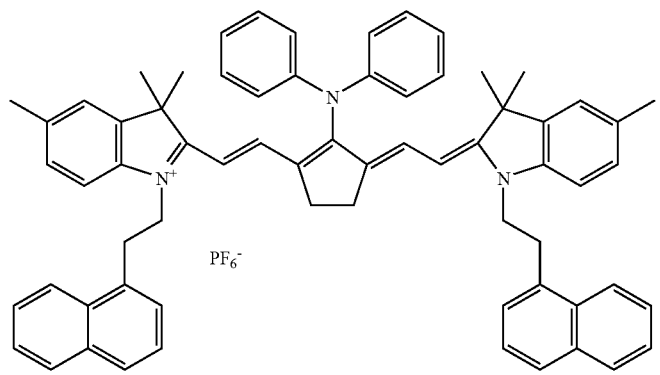
(A-1-54)
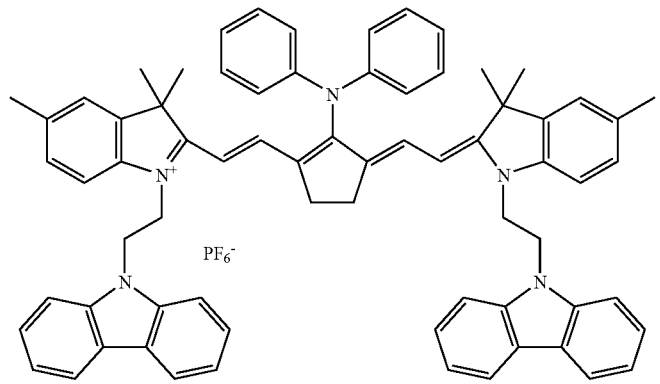
(A-1-55)
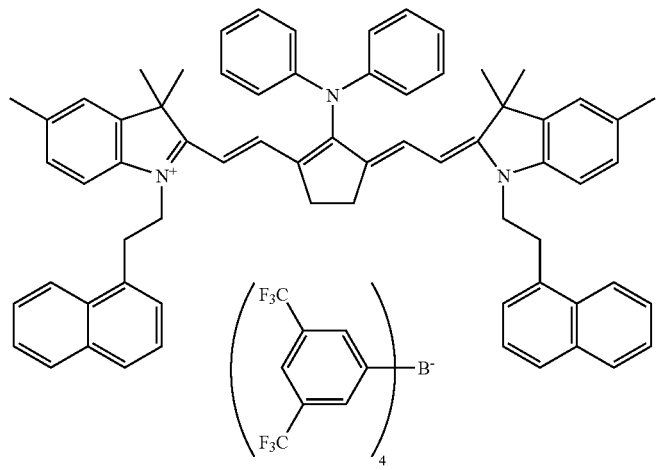
(A-1-56)
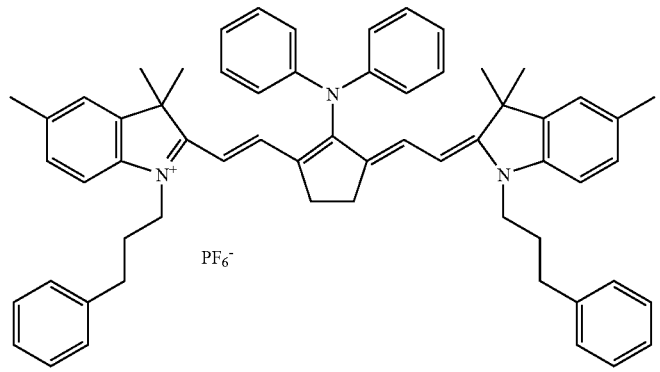

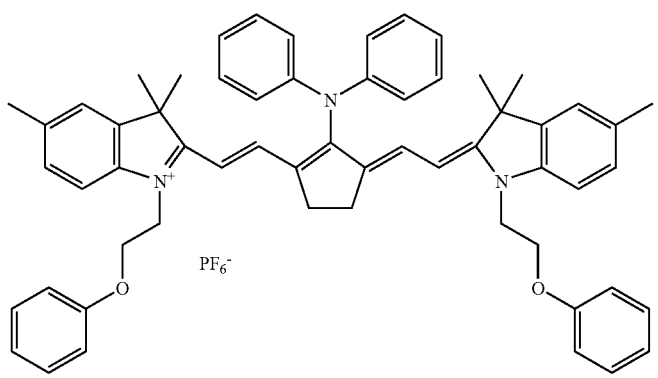

(A-1-57)

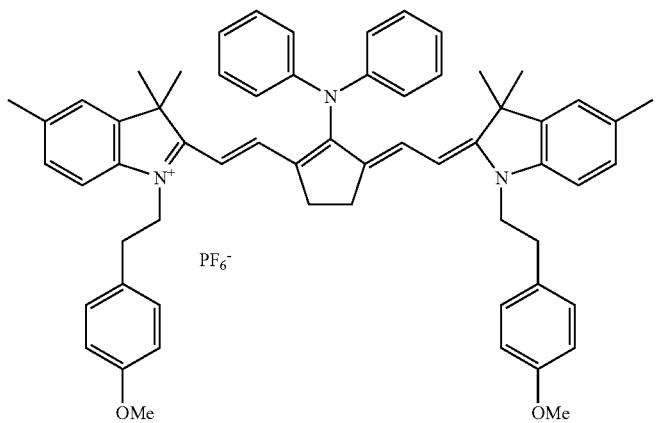

(A-1-58)

The content of the precursor of a cation radical molecule (A-1) is preferably 0.1 to 30 wt %, more preferably 0.5 to 20 wt %, and still more preferably, 1 to 10 wt % based on the total solid in the entire composition constituting the image recording layer in the invention. Within the content range above, superior visibility and uniformity and strength of the film superior are obtained at the same time.

In view of visibility, the amount of the cation radical molecules generated by laser exposure is preferably 3 mol % or more, more preferably 5 mol % or more, still more preferably 10 mol % or more, and further more preferably 20 mol % or more, based on the addition amount of the precursor of the cation radical molecule.

<(B-1) Electron Accepting Compound>

The image recording layer in the invention may include an electron accepting compound. The electron accepting compound in the invention is a compound to which an electron is transferred from the precursor of a cation radical molecule excited by laser radiation. The mechanism of the electron transfer may be either electron transfer from the singlet or triplet excited state of the cation radical molecule precursor of efficient electron transfer, the reduction potential of the electron accepting compound (B-1) is preferably more positive than the oxidation potential of the precursor of a cation radical molecule (A-1) in the excited state.

The electron accepting compound is not particularly limited as long as it receives an electron transferred from the excited cation radical molecule precursor. Examples thereof include quinones such as chloranil and benzoquinone; aromatic compounds containing an electron withdrawing group such as tetracyanoanthracene, 9,10-dicyanoanthracene, and dinitrobenzene; methylviologen, and the radical polymerization initiators described below in detail in the section of [(B) polymerization initiator]. From the viewpoint of visibility, the electron accepting compound is preferably a radical polymerization initiator, more preferably an iodonium salt or a triazine compound, and most preferably an iodonium salt.

<(B) Polymerization Initiator>

The polymerization initiator (radical polymerization initiator) (B), which can be used also as the electron accepting compound (B-1) used in the invention, is a compound that generates a radical by light, heat, or both and initiates and promotes polymerization of a compound having a polymerizable unsaturated group. Examples of polymerization initiators usable in the invention include known thermal polymerization initiators and compounds containing a bond having a small bond dissociation energy, and photopolymerization initiators. The radical generating compound preferably used in the invention is a compound that generates a radical when heat energy is applied and thus initiates and promotes polymerization of the compound having a polymerizable unsaturated group. The thermal radical generating agent in the invention may be appropriately selected from known polymerization initiators, compounds containing a bond having a small bond dissociation energy, and the like. In an embodiment, only one radical generating compound is used. In another embodiment, a combination of two or more radical generating compounds is used.

Examples of the radical generating compound include organic halogenated compounds, carbonyl compounds, organic peroxide compounds, azo-based polymerization initiators, azide compounds, metallocene compounds, hexaarylbiimidazole compounds, organic borate compounds, disulfonic acid compounds, oxime ester compounds, and onium salt compounds.

Specific examples of the organic halogenated compounds include the compounds described in Wakabayashi et al., "Bull Chem. Soc Japan" 42, 2924 (1969), U.S. Pat. No. 3,905,815, JP-B No. 46-4605, JP-A Nos. 48-36281, 55-32070, 60-239736, 61-169835, 61-169837, 62-58241, 62-212401, 63-70243, and 63-298339, and M. P. Hutt, "Journal of Heterocyclic Chemistry", 1 (No. 3), (1970)"; and particularly preferable are oxazole compounds substituted by a trihalomethyl group, and S-triazine compounds.

More preferable are s-triazine derivatives having at least one mono-, di-, or tri-halogen-substituted methyl group bound to the s-triazine ring, and specific examples thereof include 2,4,6-tris(monochloromethyl)-s-triazine, 2,4,6-tris(dichloromethyl)-s-triazine, 2,4,6-tris(trichloromethyl)-s-triazine, 2-methyl-4,6-bis(trichloromethyl)-s-triazine, 2-n-propyl-4,6-bis(trichloromethyl)-s-triazine, 2-($\alpha,\alpha,\beta$-trichloroethyl)-4,6-bis(trichloromethyl)-s-triazine, 2-phenyl-4,6-bis(trichloromethyl)-s-triazine, 2-(p-methoxyphenyl)-4,6-bis(trichloromethyl)-s-triazine, 2-(3,4-epoxyphenyl)-4,6-bis(trichloromethyl)-s-triazine, 2-(p-chlorophenyl)-4,6-bis(trichloromethyl)-s-triazine, 2-[1-(p-methoxyphenyl)-2,4-butadienyl]-4,6-bis(trichloromethyl)-s-triazine, 2-styryl-4,6-bis(trichloromethyl)-s-triazine, 2-(p-methoxystyryl)-4,6-bis(trichloromethyl)-s-triazine, 2-(p-i-propyloxystyryl)-4,6-bis(trichloromethyl)-s-triazine, 2-(p-tolyl)-4,6-bis(trichloromethyl)-s-triazine, 2-(4-methoxynaphthyl)-4,6-bis(trichloromethyl)-s-triazine, 2-phenylthio-4,6-bis(trichloromethyl)-s-triazine, 2-benzylthio-4,6-bis(trichloromethyl)-s-triazine, 2,4,6-tris(dibromomethyl)-s-triazine, 2,4,6-tris(tribromomethyl)-s-triazine, 2-methyl-4,6-bis(tribromomethyl)-s-triazine, and 2-methoxy-4,6-bis(tribromomethyl)-s-triazine.

Examples of the carbonyl compounds include benzophenone derivatives such as benzophenone, Michler's ketone, 2-methylbenzophenone, 3-methylbenzophenone, 4-methylbenzophenone, 2-chlorobenzophenone, 4-bromobenzophenone, and 2-carboxybenzophenone;

acetophenone derivatives such as 2,2-dimethoxy-2-phenylacetophenone, 2,2-diethoxyacetophenone, 1-hydroxycyclohexylphenylketone, $\alpha$-hydroxy-2-methylphenylpropanone, 1-hydroxy-1-methylethyl-(p-isopropylphenyl)ketone, 1-hydroxy-1-(p-dodecylphenyl)ketone, 2-methyl-(4'-(methylthio)phenyl)-2-morpholino-1-propanone, and 1,1,1-trichloromethyl-(p-butylphenyl)ketone;

thioxanthone derivatives such as thioxanthone, 2-ethylthioxanthone, 2-isopropylthioxanthone, 2-chlorothioxanthone, 2,4-dimethylthioxanthone, 2,4-diethylthioxanthone, and 2,4-diisopropylthioxanthone; and benzoate ester derivatives such as ethyl p-dimethylaminobenzoate and ethyl p-diethylaminobenzoate.

Examples of the azo compounds include the azo compounds described in JP-A No. 8-108621.

Examples of the organic peroxide compounds include trimethylcyclohexanone peroxide, acetylacetone peroxide, 1,1-bis(tert-butylperoxy)-3,3,5-trimethylcyclohexane, 1,1-bis(tert-butylperoxy)cyclohexane, 2,2-bis(tert-butylperoxy)butane, tert-butyl hydroperoxide, cumene hydroperoxide, diisopropylbenzene hydroperoxide, 2,5-dimethylhexane-2,5-dihydroperoxide, 1,1,3,3-tetramethylbutyl hydroperoxide, tert-butylcumyl peroxide, dicumyl peroxide, 2,5-dimethyl-2,5-di(tert-butylperoxy)hexane, 2,5-oxanoyl peroxide, persuccinic acid, benzoyl peroxide, 2,4-dichlorobenzoyl peroxide, diisopropyl peroxydicarbonate, di-2-ethylhexyl peroxydicarbonate, di-2-ethoxyethyl peroxydicarbonate, dimethoxyisopropyl peroxycarbonate, di(3-methyl-3-methoxybutyl) peroxydicarbonate, tert-butyl peroxyacetate, tert-butyl peroxypivalate, tert-butyl peroxyneodecanoate, tert-butyl peroxyoctanoate, tert-butyl peroxylaurate, tercil carbonate, 3,3',4,4'-tetra-(t-butyl peroxycarbonyl)benzophenone, 3,3',4,4'-tetra-(t-hexylperoxycarbonyl)benzophenone, 3,3',4,4'-tetra-(p-isopropylcumylperoxycarbonyl)benzophenone, carbonyl-di(t-butylperoxydihydrogen diphthalate), and carbonyl-di(t-hexylperoxydihydrogen diphthalate).

Examples of the metallocene compounds include various titanocene compounds described in JP-A Nos. 59-152396, 61-151197, 63-41484, 2-249, 2-4705, and 5-83588 such as di-cyclopentadienyl-Ti-bis-phenyl, di-cyclopentadienyl-Ti-bis-2,6-difluorophen-1-yl, di-cyclopentadienyl-Ti-bis-2,4-di-fluorophen-1-yl, di-cyclopentadienyl-Ti-bis-2,4,6-trifluorophen-1-yl, di-cyclopentadienyl-Ti-bis-2,3,5,6-tetrafluorophen-1-yl, di-cyclopentadienyl-Ti-bis-2,3,4,5,6-pentafluorophen-1-yl, di-methylcyclopentadienyl-Ti-bis-2,6-difluorophen-1-yl, di-methylcyclopentadienyl-Ti-bis-2,4,6-trifluorophen-1-yl, di-methylcyclopentadienyl-Ti-bis-2,3,5,6-tetrafluorophen-1-yl, and di-methylcyclopentadienyl-Ti-bis-2,3,4,5,6-pentafluorophen-1-yl; and the iron-arene complexes described in JP-A Nos. 1-304453 and 1-152109.

Examples of the hexaarylbiimidazole compounds include various compounds described, for example, in JP-B No. 6-29285, U.S. Pat. Nos. 3,479,185, 4,311,783, and 4,622,286, such as 2,2'-bis(o-chlorophenyl)-4,4',5,5'-tetraphenylbiimidazole, 2,2'-bis(o-bromophenyl)4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4',5,5'-tetraphenylbiimidazole.

Specific examples of the organic borate salt compounds include the organic borate salts described, for example, in JP-A Nos. 62-143044, 62-150242, 9-188685, 9-188686, 9-188710, 2000-131837, and 2002-107916, Japanese Patent 2764769, JP-A No. 2002-116539, and Kunz, Martin, "Rad Tech '98. Proceeding Apr. 19-22, 1998, Chicago"; the organic boron sulfonium complexes or organic boron oxosulfonium complexes described in JP-A Nos. 6-157623, 6-175564, and 6-175561; the organic boron iodonium complexes described in JP-A Nos. 6-175554 and 6-175553; the organic boron phosphonium complexes described in JP-A No. 9-188710; the organic boron transition metal coordination complexes described in JP-A Nos. 6-348011, 7-128785, 7-140589, 7-306527, and 7-292014.

Examples of the disulfonated compounds include the compounds described in JP-A Nos. 61-166544 and 2003-328465.

Examples of the oxime ester compounds include the compounds described in J.C.S. Perkin II (1979) 1653-1660, J.C.S. Perkin 11 (1979) 156-162, Journal of Photopolymer Science and Technology (1995) 202-232, JP-A Nos. 2000-66385 and 2000-80068, and specific examples thereof include the compounds represented by the following structural formulae.

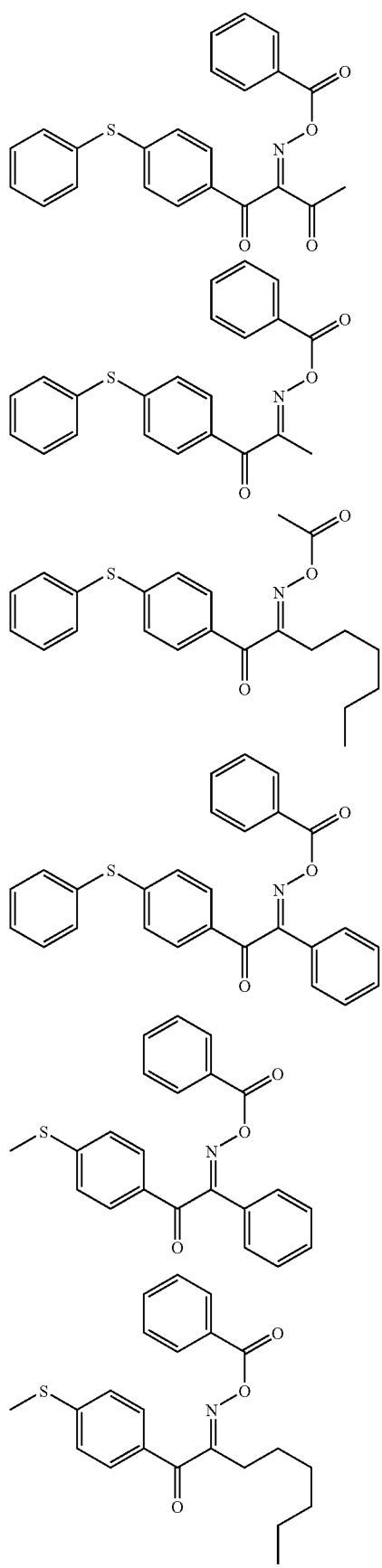
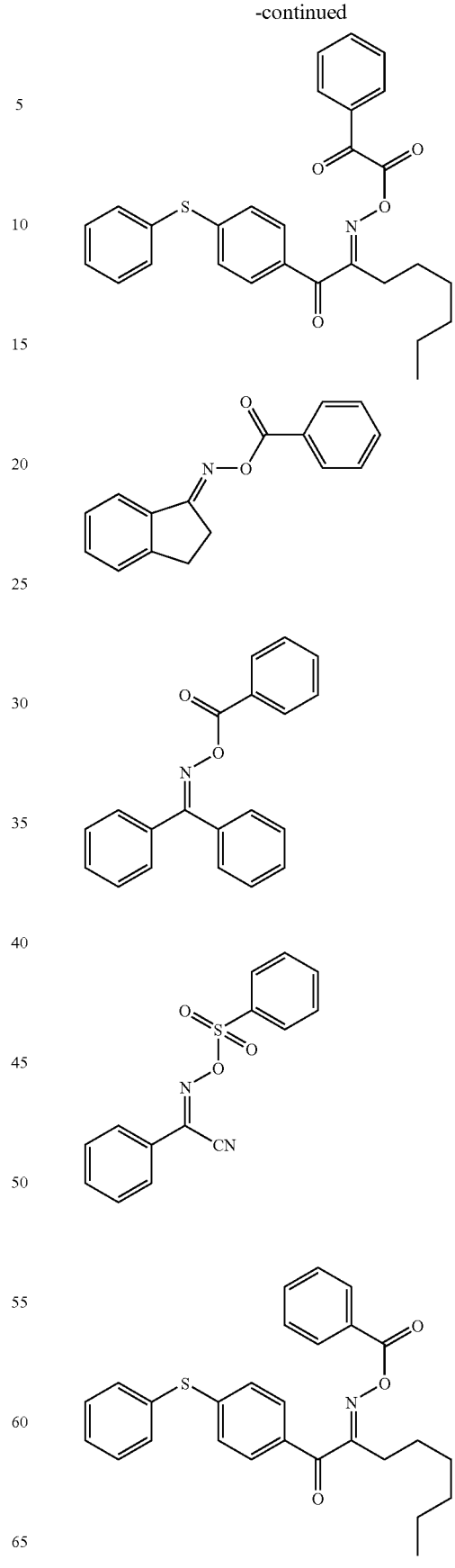

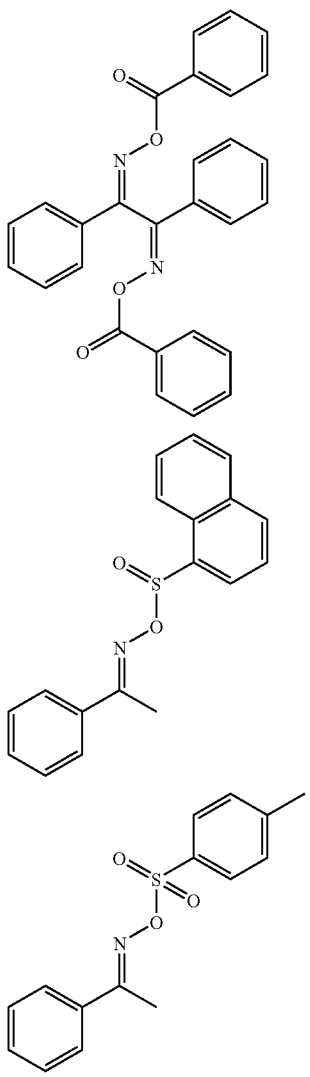

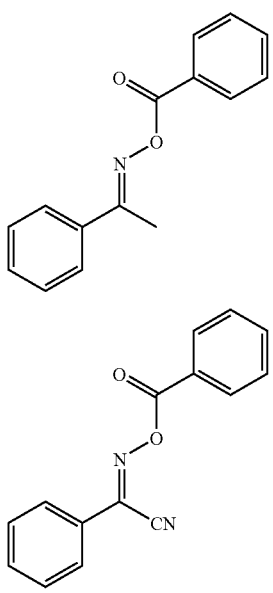

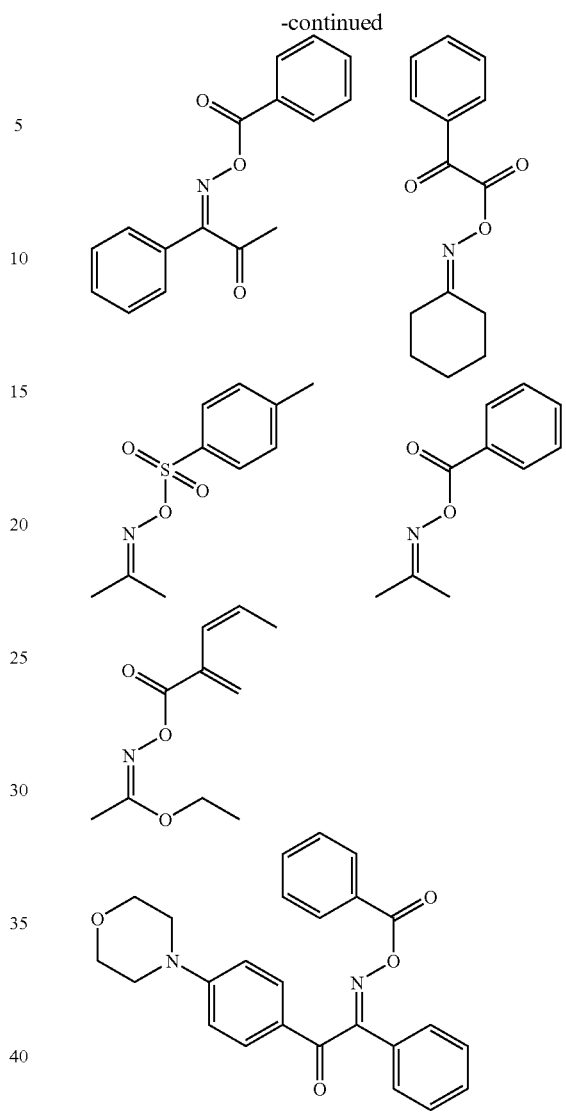

Examples of the onium salt compounds include the diazonium salts described in S. I. Schlesinger, Photogr. Sci. Eng., 18, 387 (1974), T. S. Bal et al., Polymer, 21, 423 (1980); the ammonium salts described in U.S. Pat. No. 4,069,055, JP-A No. 4-365049, and others; the phosphonium salts described in U.S. Pat. Nos. 4,069,055 and 4,069,056; the iodonium salts described in EP Patent No. 104,143, U.S. Pat. Nos. 339,049 and 410,201, JP-A Nos. 2-150848 and 2-296514; the sulfonium salts described EP Patent Nos. 370,693, 390,214, 233, 567, 297,443, and 297,442, U.S. Pat. Nos. 4,933,377, 161, 811, 410,201, 339,049, 4,760,013, 4,734,444, and 2,833,827, and Germany Patent No. 2,904,626, 3,604,580, and 3,604, 581; the selenonium salts described in J. V. Crivello et al., Macromolecules, 10 (6), 1307 (1977), J. V. Crivello et al., J. Polymer Sci., Polymer Chem. Ed., 17, 1047 (1979); the arsonium salts described in C. S. Wen et al., Teh, Proc. Conf Rad. Curing ASIA, p. 478 Tokyo, October (1988); and the like.

The oxime ester compounds, diazonium salts, iodonium salts, and sulfonium salts above are particularly preferable from the points of reactivity and stability. The onium salt functions not as an acid generator but as an ionic radical-polymerization initiator in the invention.

The onium salt used in the invention is preferably selected from those represented by the following Formulae (RI-I) to (RI-III).

 (RI-I)

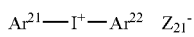 (RI-II)

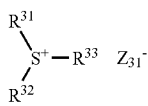 (RI-III)

In Formula (RI-I), $Ar^{11}$ represents an aryl group having 20 or fewer carbon atoms that may have one to six substituents, and preferable examples of the substituents include alkyl groups having 1 to 12 carbon atoms, alkenyl groups having 1 to 12 carbon atoms, alkynyl groups having 1 to 12 carbon atoms, aryl groups having 6 to 12 carbon atoms, alkoxy groups having 1 to 12 carbon atoms, aryloxy groups having 1 to 12 carbon atoms, halogen atoms, alkylamino groups having 1 to 12 carbon atoms, dialkylamino groups having 1 to 12 carbon atoms, alkylamido or arylamido groups having 1 to 12 carbon atoms, a carbonyl group, a carboxyl groups, a cyano group, a sulfonyl group, thioalkyl groups having 1 to 12 carbon atoms, and thioaryl groups having 6 to 12 carbon atoms. $Z_{11}^-$ represents a monovalent anion, and specific examples thereof include halide ions, a perchlorate ion, a hexafluorophosphate ion, a tetrafluoroborate ion, a sulfonate ion, a sulfinate ion, a thiosulfonate ion, and a sulfate ion. Among them, perchlorate, hexafluorophosphate, tetrafluoroborate, sulfonate and sulfinate ions are preferable from the point of stability.

In Formula (RI-III), $Ar^{21}$ and $Ar^{22}$ each independently represent an aryl group having 20 or fewer carbon atoms that may have one to six substituents, and preferable examples of the substituents include alkyl groups having 1 to 12 carbon atoms, alkenyl groups having 1 to 12 carbon atoms, alkynyl groups having 1 to 12 carbon atoms, aryl groups having 6 to 12 carbon atoms, alkoxy groups having 1 to 12 carbon atoms, aryloxy groups having 6 to 12 carbon atoms, halogen atoms, alkylamino groups having 1 to 12 carbon atoms, dialkylamino groups having 1 to 12 carbon atoms, alkylamido or arylamido groups having 1 to 12 carbon atoms, a carbonyl group, a carboxyl group, a cyano group, a sulfonyl group, thioalkyl groups having 1 to 12 carbon atoms, and thioaryl groups having 6 to 12 carbon atoms. $Z_{21}^-$ represents a monovalent anion, specifically a halide, perchlorate, hexafluorophosphate, tetrafluoroborate, sulfonate, sulfinate, thiosulfonate, or sulfate ion; and preferable from the points of stability and reactivity is a perchlorate, hexafluorophosphate, tetrafluoroborate, sulfonate, sulfinate, or carboxylate ion.

In Formula (RI-III), $R^{31}$, $R^{32}$ and $R^{33}$ each independently represent an aryl, alkyl, alkenyl, or alkynyl group having 20 or fewer carbon atoms that may have one to six substituents. Preferable among them from the points of reactivity and stability is an aryl group. Examples of the substituents include alkyl groups having 1 to 12 carbon atoms, alkenyl groups having 1 to 12 carbon atoms, alkynyl groups having 1 to 12 carbon atoms, aryl groups having 6 to 12 carbon atoms, alkoxy groups having 1 to 12 carbon atoms, aryloxy groups having 1 to 12 carbon atoms, halogen atoms, alkylamino groups having 1 to 12 carbon atoms, dialkylamino groups having 1 to 12 carbon atoms, alkylamido or arylamido groups having 1 to 12 carbon atoms, a carbonyl group, a carboxyl group, a cyano group, a sulfonyl group, thioalkyl groups having 1 to 12 carbon atoms, and thioaryl group having 6 to 12 carbon atoms. $Z_{31}^-$ represents a monovalent anion. Specific examples thereof include halide ions, a perchlorate ion, a hexafluorophosphate ion, a tetrafluoroborate ion, a sulfonate ion, a sulfinate ion, a thiosulfonate ion, and a sulfate ion. Among them, perchlorate, hexafluorophosphate, tetrafluoroborate, sulfonate, sulfinate, and carboxylate ions are preferable from the points of stability and reactivity. More preferable examples thereof include the carboxylate ions described in JP-A No. 2001-343742, and particularly preferable examples thereof include the carboxylate ions described in JP-A No. 2002-148790.

Specific examples of onium salt compounds preferably used in the invention are shown below. However, the examples should not be construed as limiting the invention.

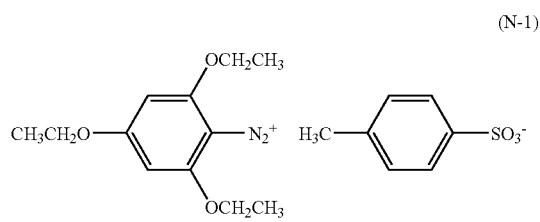

(N-1)

(N-2)

$PF_6^-$

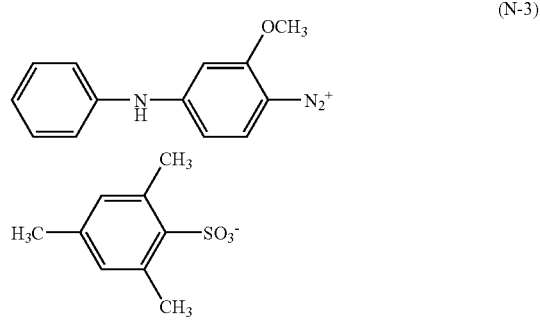

(N-3)

(N-4)

$ClO_4^-$ (N-5)

$PF_6^-$

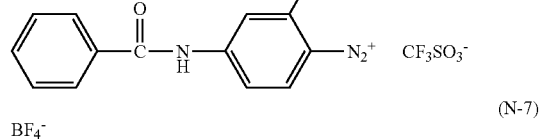

(N-6)

(N-7)

$BF_4^-$

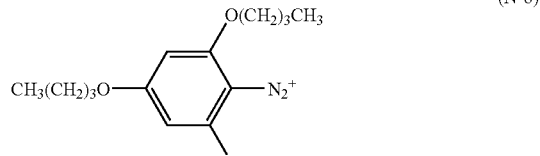

(N-8)

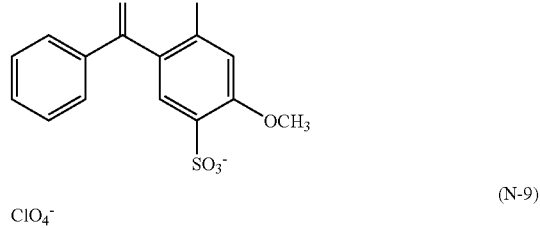

(N-9)

$ClO_4^-$

-continued
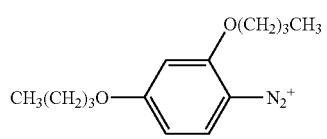 (N-10)
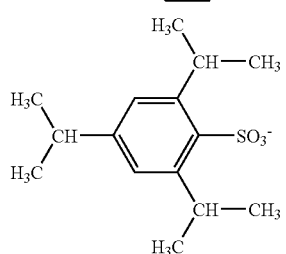
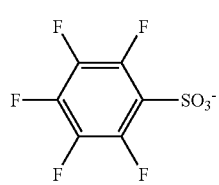
PF$_6^-$ (N-11)
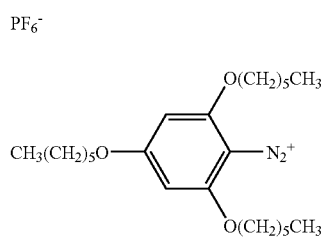 (N-12)
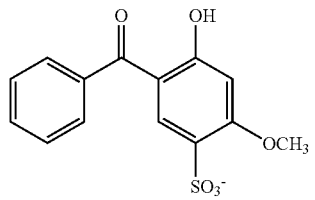 (N-13)
ClO$_4^-$ (N-14)
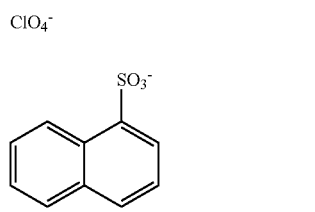 (N-15)
PF$_6^-$ (N-16)
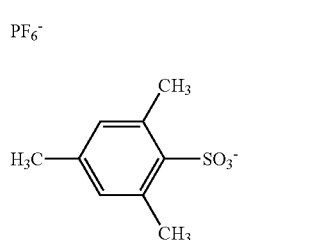 (N-17)
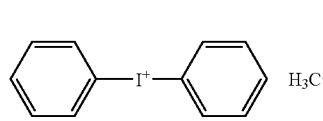 (I-1)
-continued
PF$_6^-$ (I-2)
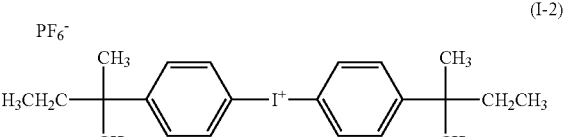
PF$_6^-$ (I-3)
 (I-4)
ClO$_4^-$ (I-5)
 (I-6)
 (I-7)
CF$_3$SO$_3^-$ (I-8)
 (I-9)
 (I-10)
 (I-11)
 (I-12)
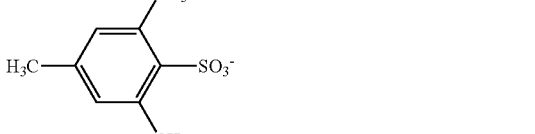 (I-13)
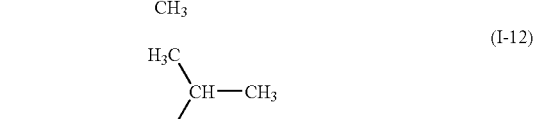
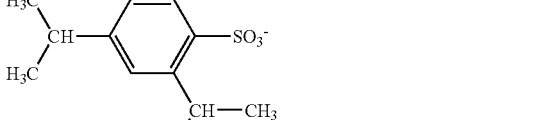

ClO₄⁻ (I-14)
PF₆⁻ (I-15)
C₄F₉SO₃⁻ (I-16)
(I-17)
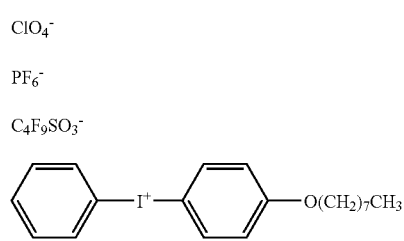
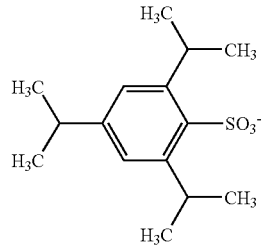
CF₃COO⁻ (I-18)
CF₃SO₃⁻ (I-19)
(I-20)
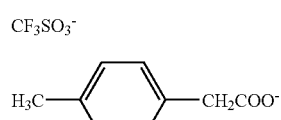
(I-21)
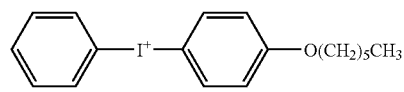
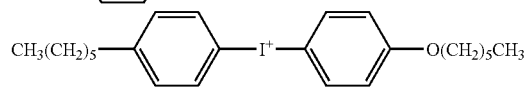
(I-22)
(I-23)
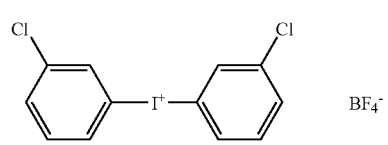
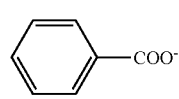
(I-24)
(I-25)
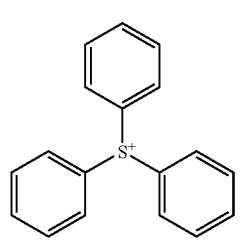
PF₆⁻
(S-1)
ClO₄⁻ (S-3)
(S-4)
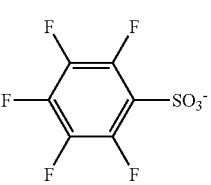
(S-5)
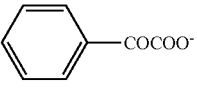
CF₃SO₃⁻ (S-6)
(S-7)
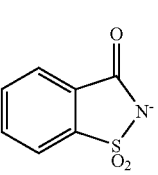
(S-8)
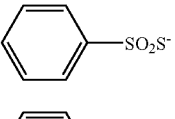
(S-9)
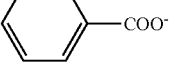
(S-10)
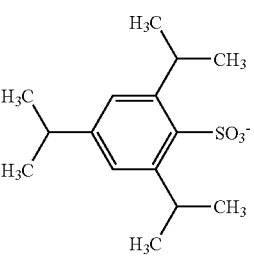
(S-11)
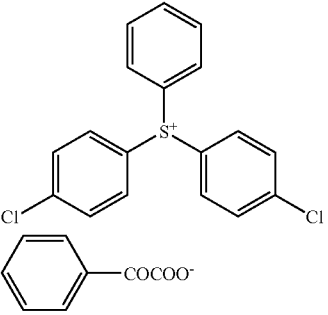
(S-12)
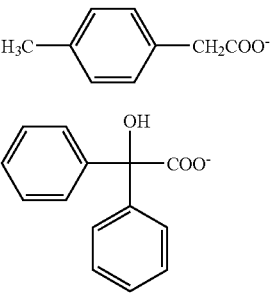
(S-13)
(S-2)

(S-14)

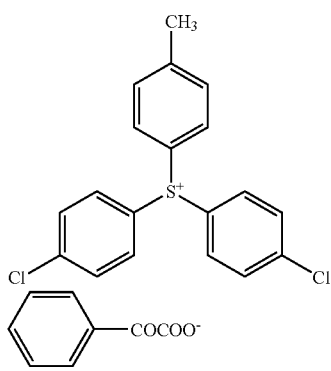

(S-15)

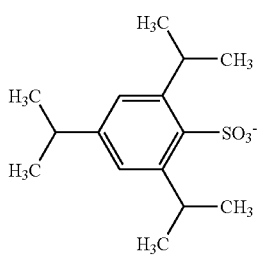

(S-16)

(S-17)

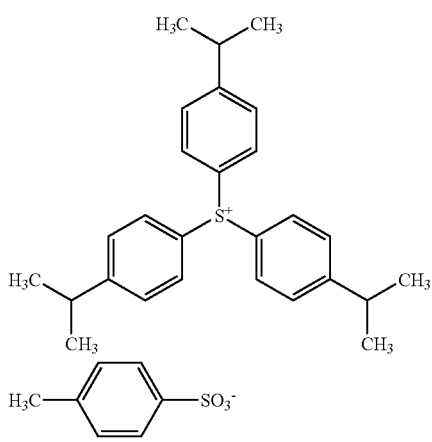

(S-18)

The content of the polymerization initiator (B) or the electron accepting compound (B-1) may be from 0.1 to 50 wt %, preferably from 0.5 to 30 wt %, and particularly preferably from 1 to 20 wt %, with respect to the total solid content in the image recording layer. In the range above, satisfactory sensitivity and satisfactory resistance to staining of the non-image portion during printing are obtained. In an embodiment, only one of such polymerization initiators is used. In another embodiment, a combination of two or more of such polymerization initiators are used. The polymerization initiator may be added to the same layer containing other components or to a layer formed separately from the layer containing other components.

In addition to the combination of the compound (A) having a specific structure and the polymerization initiator (B) or the combination of the cation radical precursor (A-1) and the electron accepting compound (B-1), the recording layer of the planographic printing plate precursor in the first or second embodiment includes a photoabsorbing material (C), a polymerizable compound (D), a binder polymer (E), and a microgel (F) or microcapsule (F). These additional compounds are used in the first and second embodiments in common. These components are described in detail hereinafter. The recording layer is capable of recording by irradiation with infrared rays.

<(C) Photoabsorbing Material>

The photoabsorbing material for use in the invention is not particularly limited as long as it absorbs light at a wavelength of 300 to 1,200 nm and is activated by the light, and any one of commercially available dyes and the compounds described in literatures, for example "Dye Handbook" (ed. Soc. Synthetic Organic Chemistry, 1970), may be used. Specific examples thereof include dyes such as azo dyes, metal complex salt azo dyes, pyrazolone azo dyes, naphthoquinone dyes, anthraquinone dyes, phthalocyanine dyes, carbonium dyes, quinonimine dyes, methine dyes, cyanine dyes, squalilium colorants, pyrylium salts, and metal thiolate complexes.

Preferable examples of the dye include cyanine dyes such as those described in JP-A Nos. 58-125246, 59-84356, and 60-78787; methine dyes such as those described in JP-A Nos. 58-173696, 58-181690, and 58-194595; naphthoquinone dyes such as those described in JP-A Nos. 58-112793, 58-224793, 59-48187, 59-73996, 60-52940, and 60-63744; squalilium colorants such as those described in JP-A No. 58-112792; and cyanine dyes such as those described in British Patent No. 434,875.

Also preferably used are infrared-absorbing sensitizers such as those described in U.S. Pat. No. 5,156,938; substituted arylbenzo(thio)pyrylium salts such as those described in U.S. Pat. No. 3,881,924; trimethine thiapyrylium salts such as those described in JP-A No. 57-142645 (U.S. Pat. No. 4,327,169); pyrylium compounds such as those described in JP-A Nos. 58-181051, 58-220143, 59-41363, 59-84248, 59-84249, 59-146063, and 59-146061; cyanine colorants such as those described in JP-A No. 59-216146; pentamethine thiopyrylium salts and others such as those described in U.S. Pat. No. 4,283,475; and pyrylium compounds such as those described in JP-B Nos. 5-13514 and 5-19702. Other preferable examples of the dye include infrared-absorbing dyes represented by Formulae (I) and (II) described in U.S. Pat. No. 4,756,993.

Yet other preferable examples of the photoabsorbing material used in the invention include the specific indolenine cyanine colorants described in JP-A No. 2002-278057, whose examples are shown below:

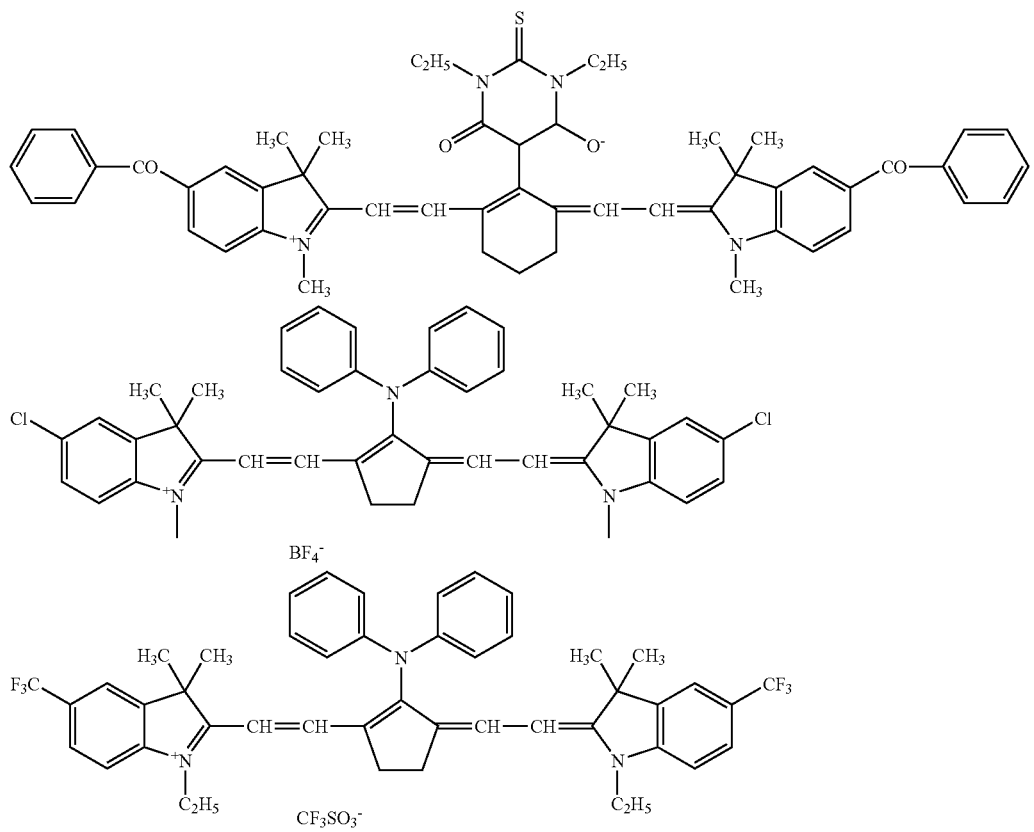

Particularly preferable among the dyes are cyanine dyes, squalilium dyes, pyrylium salts, nickel thiolate complexes, and indolenine cyanine dyes. Cyanine dyes and indolenine cyanine dyes are more preferable, and cyanine dyes represented by the following Formula (i) are particularly preferable.

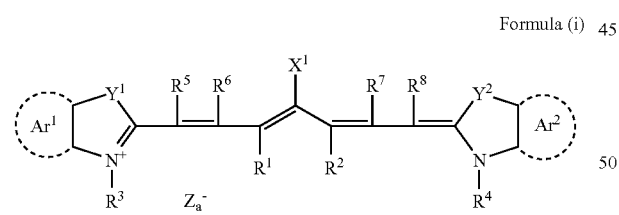

Formula (i)

In Formula (i), $X^1$ represents a hydrogen atom, a halogen atom, —$NPh_2$, $X^2$-$L^1$ or the group shown below. In the Formula, $X^2$ represents an oxygen, nitrogen, or sulfur atom; and $L^1$ represents a hydrocarbon group having 1 to 12 carbon atoms, a heteroatom-containing aromatic ring, or a heteroatom-containing hydrocarbon group having 1 to 12 carbon atoms. The heteroatom represents N, S, O, a halogen atom, or Se. In the group shown below, $X_a^-$ has the same definition as $Z_a^-$ described below; and $R^a$ represents a substituent selected from a hydrogen atom, alkyl groups, aryl groups, substituted and unsubstituted amino groups, and halogen atoms.

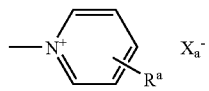

In Formula (i), $R^1$ and $R^2$ each independently represent a hydrocarbon group having 1 to 12 carbon atoms. From the point of the storage stability of the image recording layer coating liquid, $R^1$ and $R^2$ preferably represent a hydrocarbon group having two or more carbon atoms. In a particularly preferable embodiment, $R^1$ and $R^2$ bind to each other to form a five- or six-membered ring.

$Ar^1$ and $Ar^2$ may be the same as or different from each other, and each independently represent an aromatic hydrocarbon group which may have a substituent. Preferable aromatic hydrocarbon groups include benzene and naphthalene rings. Preferable substituents include hydrocarbon groups having 12 or fewer carbon atoms, halogen atoms, and alkoxy groups having 12 or fewer carbon atoms. $Y^1$ and $Y^2$ may be the same as or different from each other, and each independently represent a sulfur atom or a dialkylmethylene group having 12 or fewer carbon atoms. $R^3$ and $R^4$ may be the same as or different from each other, and each independently represent a hydrocarbon group having 20 or fewer carbon atoms that may have a substituent. Preferable substituents thereon include alkoxy groups having 12 or fewer carbon atoms, a carboxyl group, and a sulfo group. $R^5$, $R^6$, $R^7$ and $R^8$ may be the same as or different from each other, and each independently represent a hydrogen atom or a hydrocarbon group having 12 or fewer carbon atoms. Each of $R^5$, $R^6$, $R^7$ and $R^8$ preferably represents a hydrogen atom, from the point of availability of the raw material. $Z_a^-$ represents a counter anion. However, when the cyanine colorant represented by Formula (i) has an anionic substituent in the structure and there is no need for neutralization of the electric charge, $Z_a^-$ is unnecessary. Preferably from the point of the storage stability of the image recording layer coating liquid, $Z_a^-$ represents a halide, perchlorate, tetrafluoroborate, hexafluorophosphate, or sulfonate ion, particularly preferably a perchlorate, hexafluorophosphate, or arylsulfonate ion.

Specific examples of the cyanine colorants represented by Formula (i) preferably used in the invention include those described in JP-A No. 2001-133969, paragraph numbers [0017] to [0019].

Other preferable examples thereof include the above-mentioned specific indolenine cyanine colorants described in JP-A No. 2002-278057.

Examples of pigments usable in the invention include commercially available pigments and the pigments described in Color Index (C.I.) Handbook, "Latest Pigment Handbook" (Japan Society of pigment technologies Ed., 1977), "Latest Pigment Application Technologies" (CMC Publishing, 1986), and "Printing Ink Technology" (CMC Publishing, 1984).

Examples of the pigments include black pigments, yellow pigments, orange pigments, brown pigments, red pigments, purple pigments, blue pigments, green pigments, fluorescent pigments, metal powder pigments, as well as polymer-bound colorants. Specific examples thereof include insoluble azo pigments, azolake pigments, condensation azo pigments, chelate azo pigments, phthalocyanine pigments, anthraquinone-based pigments, perylene pigments, perynone pigments, thioindigo pigments, quinacridone pigments, dioxazine pigments, isoindolinone pigments, quinophtharone pigments, dyed lake pigments, azine pigments, nitroso pigments, nitro pigments, natural pigments, fluorescent pigments, inorganic pigments, and carbon black. Among these pigments, carbon black is preferable.

These pigments may be used either with or without surface treatment. Examples of the surface treatment methods include methods of coating a resin or wax on the surface of pigment; methods of attaching a surfactant thereon; and methods of binding a reactive substance (e.g., a silane coupling agent, epoxy compound, polyisocyanate, or the like) to the surface of the pigment. The surface treatment methods above are described in "Properties and Applications of Metal Soaps" (Saiwai Shobo), "Printing Ink Technologies" (CMC Publishing, 1984) and "Latest Pigment Application Technologies" (CMC Publishing, 1986).

The particle diameter of the pigment is preferably in the range of 0.01 to 10 μm, more preferably of 0.05 to 1 μm, and particularly preferably of 0.1 to 1 μm. Within the range above, satisfactory dispersion quality of the pigment in the image recording layer coating liquid, and excellent uniformity of the image recording layer are achieved.

The method for dispersing the pigment may be any one of the dispersion techniques known in the art and used for production of inks, toners, and the like. Suitable dispersing machines include an ultrasonic dispersing machine, a sand mill, an attriter, a pearl mill, a super mill, a ball mill, an impeller, a disperser, a KD mill, a colloid mill, a dynatron, a three roll mill, and a pressurized kneader. More detailed description on such dispersing machines is found in the "Latest Pigment Application Technologies" (CMC Publishing, 1986).

The photoabsorbing material may be added to the same layer containing other components or to a layer separate from the layer containing other components. The photoabsorbing material may be added during production of a negative-type planographic printing plate precursor such that the absorbance of the image recording layer at the maximum absorption wavelength in the wavelength range of 300 to 1,200 nm, as determined by a reflection measurement method, falls in the range of 0.3 to 1.2, preferably in the range of 0.4 to 1.1. Within the range above, the polymerization reaction progresses uniformly in the depth direction of the image recording layer, so that the image portion has favorable film strength and favorable adhesiveness to the support.

The absorbance of the image recording layer can be adjusted by the amount of the infrared absorbent added to the image recording layer and the thickness of the image recording layer. The absorbance can be determined by an ordinary method. The measurement method may be a method including formin, on a reflective support such as of aluminum, a recording layer having a post-drying coating amount that is adequately selected within a suitable range for a planographic printing plate and measuring the reflection density thereof with an optical densitometer, a method of measuring the reflection density with a spectrophotometer using an integrating sphere, or the like.

The amount of the photoabsorbing material to be added to the image recording layer is preferably 0.1 to 30 wt %, more preferably 0.5 to 20 wt %, and still more preferably 1 to 10 wt %, with respect to the total solid. Superior photosensitivity and film uniformity and strength can be achieved at the same time within the above content range.

<(D) Polymerizable Compound>

The image recording layer in the invention preferably contains a polymerizable compound (D) so as to perform efficient curing reaction. The polymerizable compound usable in the invention may be selected from addition polymerizable compounds having at least one ethylenic unsaturated double bond and at least one, preferably two or more, terminal ethylenic unsaturated bond. Such compounds are known to those skilled in the art, and any one of them may be used in the invention without particular restriction. These compounds may be in a chemical form such as a monomer, a prepolymer (dimer, trimer or oligomer), or a mixture or copolymer thereof.

Examples of the monomers and the copolymers thereof include unsaturated carboxylic acids (such as acrylic acid, methacrylic acid, itaconic acid, crotonic acid, isocrotonic acid, and maleic acid) and esters and amides thereof; and preferable examples thereof include esters of an unsaturated carboxylic acid and an aliphatic polyhydric alcohol compound, and amides of an unsaturated carboxylic acid and an aliphatic polyvalent amine compound. In addition, addition reaction products of an unsaturated carboxylic ester or amide having a nucleophilic substituent such as hydroxyl, amino, or mercapto group with a monofunctional or multifunctional isocyanate or epoxy compound, and dehydration condensation products thereof with a monofunctional or polyfunctional carboxylic acid, and the like are also preferable. Addition reaction products of an unsaturated carboxylic ester or amide having an electrophilic substituent such as an isocyanate or epoxy group with a monofunctional or polyfunctional alcohol, amine, or thiol, and substitution reaction products of an unsaturated carboxylic ester or amide having a leaving group such as a halogen or tosyloxy group with a monofunctional or polyfunctional alcohol, amine, or thiol are also preferable. Other examples include compounds in which the unsaturated carboxylic acid is replaced with an unsaturated phosphonic acid, styrene, vinyl ether, or the like.

Specific examples of the esters (as a monomer) of an aliphatic polyhydric alcohol compound and an unsaturated carboxylic acid include acrylic esters such as ethylene glycol diacrylate, triethylene glycol diacrylate, 1,3-butanediol diacrylate, tetramethylene glycol diacrylate, propylene glycol diacrylate, neopentylglycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, polyester acrylate oligomers, and isocyanuric acid EO-modified triacrylates;

methacrylic esters such as tetramethylene glycol dimethacrylate, triethylene glycol dimethacrylate, neopentylglycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane, and bis-[p-(methacryloxyethoxy)phenyl]dimethylmethane;

itaconate esters such as ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate; crotonate esters such as ethylene glycol dicrotonate, tetramethylene glycol dicrotonate, pentaerythritol dicrotonate, sorbitol tetradicrotonate, and the like; isocrotonate esters such as ethylene glycol diisocrotonate, pentaerythritol diisocrotonate, and sorbitol tetraisocrotonate; maleate esters such as ethylene glycol dimaleate, triethylene glycol dimaleate, pentaerythritol dimaleate, and sorbitol tetramaleate; and other esters such as the aliphatic alcohol esters described in JP-B No. 51-47334 and JP-A No. 57-196231; the esters having an aromatic skeleton described in JP-A Nos. 59-5240, 59-5241, and 2-226149, and the amino group-containing esters described in JP-A No. 1-165613. In addition, in an embodiment, a mixture of two or more of the ester monomers described above is used.

Specific examples of the amide monomers of an aliphatic polyvalent amine compound and an unsaturated carboxylic acid include methylene bisacrylamide, methylene bismethacrylamide, 1,6-hexamethylene bisacrylamide, 1,6-hexamethylene bismethacrylamide, diethylenetriamine trisacrylamide, xylylene bisacrylamide, and xylylene bismethacrylamide. Other preferable examples of the amide monomers include amides having a cyclohexylene structure described in JP-B No. 54-21726.

Urethane-based addition polymerizable compounds obtained by addition reaction of an isocyanate and a hydroxyl group are also preferable. Specific examples thereof include vinyl urethane compounds having two or more polymerizable vinyl groups in a molecule thereof, such as those described in JP-B No. 48-41708, which are prepared by adding a vinyl monomer having a hydroxyl group represented by the following Formula (A) to a polyisocyanate compound having two or more isocyanate group in a molecule.

CH$_2$=C(R$^4$)COOCH$_2$CH(R$^5$)OH   (A)

(wherein, R$^4$ and R$^5$ each independnetly represent H or CH$_3$.)

Also preferable are urethane acrylates described in JP-A No. 51-37193 and JP-B Nos. 2-32293 and 2-16765; and urethane compounds having an ethylene oxide skeleton described in JP-B Nos. 58-49860, 56-17654, 62-39417, and 62-39418. It is also possible to obtain a photopolymerizable composition significantly superior in photoresponsive speed by using the addition polymerizable compound having an amino or sulfide structure in the molecule described in JP-A Nos. 63-277653, 63-260909, or 1-105238.

Other preferable examples thereof include polyfunctional acrylates and methacrylates such as polyester acrylates, and epoxyacrylates obtained in reaction of an epoxy resin with acrylic or methacrylic acid, such as those described in JP-A No. 48-64183, and JP-B Nos. 49-43191 and 52-30490. Yet other examples thereof include specific unsaturated compounds described in JP-B Nos. 46-43946, 1-40337, and 1-40336, and vinylphosphonic acid compounds described in JP-A No. 2-25493. In addition, the structures containing a perfluoroalkyl group described in JP-A No. 61-22048 are used favorably in some cases. Further, photosetting monomers and oligomers described in Journal of Adhesion Soc. Jpn. Vol. 20, No. 7, p. 300 to 308 (1984) are also usable.

Details of the use of the addition polymerizable compounds—what structure is used, whether they are used singly or in combination, and the addition amount—can be arbitrarily determined in accordance with the performance and design of the final planographic printing plate precursor. For example, they are selected from the following viewpoints.

In respect of photoresponse speed, their structure preferably has a high unsaturated group content per one molecule, and in many cases, they are preferably bifunctional or higher-functional. To increase the strength of an image portion i.e. the cured layer, they are preferably trifunctional or higher-functional. It is also effective to use a method of regulating both photosensitivity and strength by combined use of addition polymerizable compounds (e.g. acrylic esters, methacrylic esters, styrene-containing compounds, and vinyl ether-containing compounds) having different functionalities and different polymerizable groups.

The method of selecting and using the addition polymerizable compound is an important factor for compatibility and dispersibility with other components (e.g. a binder polymer, an initiator, a colorant etc.) in the recording layer, and the compatibility may be improved by using e.g. a low-purity compound or a combination of two or more addition polymerizable compounds. In some cases, a specific structure is selected in order to improve the adhessiveness to the support or the after-mentioned protective layer.

The content of the polymerizable compound is preferably from 5 to 80 wt %, more preferably from 25 to 75 wt %, with respect to the total amount of nonvolatile components in the image recording layer. Only one polymerizable compound may be used, or a combination of two or more polymerizable compounds may be used. In addition, an appropriate structure, composition, and addition amount of the addition polymerizable compound may be selected arbitrarily in consideration of the degree of polymerization inhibition by oxygen, resolution, fogging, change in refractive index, and surface adhesiveness. In some cases, a layer structure/coating method such as undercoating or overcoating may be adopted.

<(E) Binder Polymer>

Any one of known binder polymers may be used, without particular restriction, as the binder polymer used in the invention. The binder is preferably a linear organic polymer having a film forming property. Examples of the binder polymer include acrylic resins, polyvinylacetal resins, polyurethane resins, polyurea resins, polyimide resins, polyamide resins, epoxy resins, methacrylic resins, polystyrene resins, novolak phenol resins, polyester resins, synthetic rubbers, and natural rubbers.

The binder polymer preferably has crosslinking property in view of improvement in the film strength of the image portion. The crosslinking property can be imparted to the binder polymer by introducing a crosslinking functional group, such as an ethylenic unsaturated bond, into the main chain or a side chain of the polymer. The crosslinking functional group may be introduced by including a copolymerization component having the crosslinking functional group.

Examples of polymers having ethylenic unsaturated bonds in the main chain of the molecule include poly-1,4-butadiene and poly-1,4-isoprene.

Examples of polymers having ethylenic unsaturated bonds on side chains of the molecule include polymers of an ester or amide of acrylic or methacrylic acid in which the ester or amide residue (R in —COOR or —CONHR) has an ethylenic unsaturated bond.

Examples of the residue (R) having an ethylenic unsaturated bond include $-(CH_2)_n\ CR^1=CR^2R^3$, $-(CH_2O)_nCH_2CR^1=CR^2R^3$, $-(CH_2CH_2O)_nCH_2CR^1=CR^2R^3$, $-(CH_2)_nNH-CO-O-CH_2CR^1=CR^2R^3$, $-(CH_2)_n-O-CO-CR^1=CR^2R^3$ and $-(CH_2CH_2O)_2-X$ (wherein, $R^1$ to $R^3$ each independently represent a hydrogen or halogen atom or an alkyl, aryl, alkoxy or aryloxy group having 1 to 20 carbon atoms; $R^1$ and $R^2$, or $R^1$ and $R^3$ may bond to each other to form a ring; n denotes an integer from 1 to 10; and X represents a dicyclopentadienyl residue).

Specific examples of the ester residue include $-CH_2CH=CH_2$ (described in JP-B No. 7-21633), $-CH_2CH_2O-CH_2CH=CH_2$, $-CH_2C(CH_3)=CH_2$, $-CH_2CH=CH-C_6H_5$, $-CH_2CH_2OCOCH=CH-C_6H_5$, $-CH_2CH_2-NHCOO-CH_2CH=CH_2$ and $-CH_2CH_2O-X$ (wherein, X represents a dicyclopentadienyl residue).

Specific examples of the amide residue include, $-CH_2CH=CH_2$, $-CH_2CH_2-Y$ (wherein, Y represents a cyclohexene residue), and $-CH_2CH_2-OCO-CH=CH_2$.

The crosslinking binder polymer cures when the polymer molecules are crosslinked, for example, by addition of free radicals (polymerization initiating radicals or propagating radicals occurring during the polymerization of the polymerizable compound) to its crosslinking functional groups, which directly causes the addition polymerization of polymer molecules or indirectly causes the addition polymerization via a polymerization chain of the polymerizable compounds. As an alternative, the binder polymer can be cured by formation of crosslinks between polymer molecules caused by generation of polymer radicals through abstraction of an atom in the polymer (for example, a hydrogen atom on the carbon atom adjacent to a functional crosslinking group) by a free radical and mutual binding of the generated polymer radicals.

The content of the crosslinking group in the binder polymer (content of radically polymerizable unsaturated double bond, as determined by iodine titration) is preferably from 0.1 to 10.0 mmol, more preferably from 1.0 to 7.0 mmol, most preferably from 2.0 to 5.5 mmol, per 1 g of the binder polymer. Favorable sensitivity and satisfactory storage stability can be obtained in the range above.

The binder polymer preferably has higher solubility or dispersibility in ink and/or damping water in view of improvement in on-press developability.

The binder polymer is preferably oleophilic from the viewpoint of improving the solubility or dispersibility in ink. On the other hand, the binder polymer is preferably hydrophilic from the viewpoint of improving the solubility or dispersibility in damping water. Therefore, in the invention, it is effective to use a combination of an oleophilic binder polymer and a hydrophilic binder polymer.

Examples of hydrophilic binder polymers include polymers having hydrophilic groups such as a hydroxy group, a carboxyl group, a carboxylate group, a hydroxyethyl group, a polyoxyethyl group, a hydroxypropyl group, a polyoxypropyl group, an amino group, an aminoethyl group, an aminopropyl group, an ammonium group, an amido group, a carboxymethyl group, a sulfonic acid group, or a phosphoric acid group.

Specific examples thereof include gum arabic, casein, gelatin, starch derivatives, carboxymethylcellulose and sodium salt thereof, cellulose acetate, sodium alginate, vinyl acetate-maleic acid copolymers, styrene-maleic acid copolymers, polyacrylic acids and salts thereof, polymethacrylic acids and salts thereof, homopolymers and copolymers of hydroxyethyl methacrylate, homopolymers and copolymers of hydroxyethyl acrylate, homopolymers and copolymers of hydroxypropyl methacrylate, homopolymers and copolymers of hydroxypropyl acrylate, homopolymers and copolymers of hydroxybutyl methacrylate, homopolymers and copolymers of hydroxybutyl acrylate, polyethylene glycols, hydroxypropylene polymers, polyvinylalcohols, hydrolyzed polyvinyl acetates having a hydrolysis degree of 60 mol % or more, preferably 80 mol % or more, polyvinylformal, polyvinylbutyral, polyvinylpyrrolidone, homopolymers and copolymers of acrylamide, homopolymers and copolymers of methacrylamide, homopolymers and copolymers of N-methylol acrylamide, polyvinylpyrrolidone, alcohol-soluble nylons, and polyethers of 2,2-bis-(4-hydroxyphenyl)-propane and epichlorohydrin.

The binder polymer preferably has a weight-average molecular weight of 5,000 or more, more preferably, 10,000 to 300,000, and a number-average molecular weight of 1,000 or more, more preferably 2,000 to 250,000. The polydispersity (weight-average molecular weight/number-average molecular weight) is preferably 1.1 to 10.

The binder polymer may be a random or block polymer, but is preferably a random polymer. In an embodiment, only one binder polymer is used. In another embodiment, a combination of two or more binder polymers is used.

The binder polymer can be prepared by any one of known methods. Examples of the solvent used in the preparation include tetrahydrofuran, ethylene dichloride, cyclohexanone, methylethylketone, acetone, methanol, ethanol, ethylene glycol monomethylether, ethylene glycol monoethylether, 2-methoxyethyl acetate, diethylene glycol dimethylether, 1-methoxy-2-propanol, 1-methoxy-2-propyl acetate, N,N-dimethylformamide, N,N-dimethylacetamide, toluene, ethyl acetate, methyl lactate, ethyl lactate, dimethylsulfoxide, and water. In an embodiment, only one solvent is used in the preparation. In another embodiment, a mixture of two or more solvents is used in the preparation.

Examples of the radical polymerization initiator for use in the preparation of the binder polymer include compounds known as initiators, such as azo initiators and peroxide initiators.

The content of the binder polymer may be from 0 to 90 wt %, preferably 0 to 80 wt %, and more preferably 0 to 70 wt %, with respect to the total solid content in the image recording layer. A favorable image intensity and image forming property can be obtained in the range above.

The ratio of polymerizable compound to binder polymer is preferably from 0.5/1 to 4/1.

<(F) Microcapsule and Microgel>

In the invention, the method for including the above-described components of the image recording layer and other components described below in the image recording layer may be selected from various methods. In an embodiment, these components are dissolved in a suitable solvent, and then coated to give a molecular-dispersion image recording layer, as described in JP-A No. 2002-287334. In another embodiment, all or some of the components are encapsulated, and the microcapsules are incorporated in the image recording layer to give a microcapsule-containing image recording layer, as described in JP-A Nos. 2001-277740 and 2001-277742. Components may be contained outside the microcapsules in the microcapsule-containing image recording layer. In a preferable embodiment of the microcapsule-containing image recording layer, hydrophobic components are encapsulated, while hydrophilic components are contained outside the microcapsules. In yet another embodiment, the image recording layer contains crosslinked resin particles, i.e., microgel. The microgel may contain some of the components in the interior of and/or on the surface of the resin particles. In particular, it is preferable from the viewpoints of image forming sensitivity and printing durability that the microgel is a reactive microgel having a polymerizable compound on its surface.

The image recording layer is preferably a microcapsule-containing image recording layer or a microgel image recording layer from the viewpoint of obtaining improved on-press developability.

A known method may be used for encapsulating the image recording layer components or forming a microgel containing the image recording layer components.

Examples of the method for producing the microcapsules include, but are not limited to, the methods of using coacervation described in U.S. Pat. Nos. 2,800,457 and 28,000,458; the interfacial polymerization methods described in U.S. Pat. No. 3,287,154, JP-B Nos. 38-19574, 42-446, and others; the polymer precipitation methods described in U.S. Pat. Nos. 3,418,250 and 3,660,304; the method using an isocyanate polyol wall-forming material described in U.S. Pat. No. 3,796,669; the method of using an isocyanate wall-forming material described in U.S. Pat. No. 3,914,511; the methods of using a urea-formaldehyde or urea-formaldehyde-resorcinol wall-forming material described in U.S. Pat. Nos. 4,001,140, 4,087,376, and 4,089,802; the method of using a wall-forming material such as a melamine-formaldehyde resin or hydroxypropylcellulose described in U.S. Pat. No. 4,025,455; the in-situ methods involving monomer polymerization described in JP-B No. 36-9163 and JP-A No. 51-9079; the spray drying methods described in U.S. Pat. No. 3,111,407 and British Patent No. 930422; the electrolytic dispersion cooling methods described in British Patent Nos. 952807 and 965074.

A microcapsular wall preferred in the invention has three-dimensional crosslinks and swells in solvent. In consideration of this, the microcapsular wall material is preferably polyurea, polyurethane, polyester, polycarbonate, polyamide, or a mixture thereof, and is particularly preferably polyurea or polyurethane. The microcapsular wall may also contain a compound having a crosslinking functional group such as an ethylenic unsaturated bond introducible to a binder polymer.

Examples of the method for preparing the microgel include, but are not limited to, the methods involving particle formation by interfacial polymerization described in JP-B Nos. 38-19574 and 42-446, and the method involving particle formation by nonaqueous dispersion polymerization described in JP-A No. 5-61214.

Any one of known microcapsular production methods such as those described above may be used in the method involving interfacial polymerization.

In a preferable embodiment, the microgel is prepared through particle formation by interfacial polymerization and has a three-dimensional crosslinks. From such a viewpoint, the raw material to be used is preferably polyurea, polyurethane, polyester, polycarbonate, polyamide, or a mixture thereof, more preferably polyurea or polyurethane.

The average diameter of the microcapsule or microgel particle is preferably from 0.01 to 3.0 µm, more preferably from 0.05 to 2.0 µm, and particularly preferably from 0.10 to 1.0 µm. Favorable resolution and storage stability can be obtained in the range above.

In addition to the essential components ((A) or (A-1), (B) or (B-1), and (C) to (F) described above), the image recording layer according to the invention may additionally contain various compounds as long as the effects of the invention is not impaired. Hereinafter, such various additives will be described.

<Surfactant>

The image recording layer in the invention preferably contains a surfactant for the purpose of improving on-press developability at initiation of printing and coated surface state. The surfactant may be a nonionic, anionic, cationic, amphoteric, or fluorochemical surfactant. In an embodiment, only one surfactant is used. In another embodiment, a combination of two or more surfactants is used.

The nonionic surfactant used in the invention is not particularly limited, and any one of known nonionic surfactants may be used. Examples thereof include polyoxyethylene alkylethers, polyoxyethylene alkylphenylethers, polyoxyethylene polystyrylphenylethers, polyoxyethylene polyoxypropylene alkylethers, glycerols partially esterified with a fatty acid, sorbitans partially esterified with a fatty acid, pentaerythritols partially esterified with a fatty acid, propylene glycol monofatty acid esters, sucroses partially esterified with a fatty acid, polyoxyethylene sorbitans partially esterified with a fatty acid, polyoxyethylene sorbitols partially esterified with a fatty acid, polyethylene glycol fatty acid esters, polyglycerins partially esterified with a fatty acid, polyoxyethylene-modified castor oils, polyoxyethylene glycerols partially esterified with a fatty acid, fatty acid diethanol amides, N,N-bis-2-hydroxyalkylamines, polyoxyethylene alkylamines, triethanolamine fatty acid esters, trialkylamine oxides, polyethylene glycol, and copolymers of polyethylene glycol and polypropylene glycol.

The anionic surfactant used in the invention is not particularly limited, and any one of known anionic surfactants may be used. Examples thereof include fatty acid salts, abietic acid salts, hydroxyalkanesulfonic acid salts, alkanesulfonic acid salts, dialkyl sulfoscuccinate salts, straight-chain alkylbenzenesulfonic acid salts, branched-chain alkylbenzenesulfonic acid salts, alkylnaphthalenesulfonic acid salts, alkylphenoxypolyoxyethylene propylsulfonic acid salts, polyoxyethylene alkylsulfophenylether salts, N-methyl-N-oleyltaurine sodium salt, N-alkyl-sulfoscuccinic monoamide disodium salts, petroleum sulfonic salt, sulfated beef tallow oil, sulfate ester salts of a fatty acid alkyl ester, alkyl sulfate ester salts, polyoxyethylene alkylether sulfate ester salts, fatty acid monoglyceride sulfate ester salts, polyoxyethylene alkylphenylether sulfate ester salts, polyoxyethylene styrylphenylether sulfate ester salts, alkylphosphoric ester salts, polyoxyethylene alkylether phosphoric ester salts, polyoxyethylene alkylphenylether phosphoric ester salts, partially saponified products of styrene/maleic anhydride copolymers, partially saponified products of olefin/maleic anhydride copolymers, and naphthalenesulfonic salt-formalin condensates.

The cationic surfactant used in the invention is not particularly limited, and any one of known cationic surfactants may be used. Examples thereof include alkylamine salts, quaternary ammonium salts, polyoxyethylene alkylamine salts, and polyethylene polyamine derivatives.

The amphoteric surfactant used in the invention is not particularly limited, and any one of known amphoteric surfactants may be used. Examples thereof include carboxybetaines, aminocarboxylates, sulfobetaines, aminosulfate esters, and imidazolines.

In the above list of the surfactants, polyoxyethylene may be substituted with "polyoxyalkylene" such as polyoxymethylene, polyoxypropylene, or polyoxybutylene, and the surfactants obtained by such substitution are also usable in the invention.

Still more preferable surfactants are fluorochemical surfactants having a perfluoroalkyl group in the molecule. Examples of the fluorochemical surfactants include anionic surfactants such as perfluoroalkyl carboxylate salts, perfluoroalkyl sulfonate salts, perfluoroalkyl phosphate esters; amphoteric surfactants such as perfluoroalkylbetaines; cationic surfactants such as perfluoroalkyltrimethylammonium salts; and nonionic surfactants such as perfluoroalkylamine oxides, perfluoroalkylethyleneoxide adducts, oligomers containing a perfluoroalkyl group and a hydrophilic group, oligomers containing a perfluoroalkyl group and an oleophilic group, oligomers containing a perfluoroalkyl group, a hydrophilic group and an oleophilic group, and urethanes containing a perfluoroalkyl group and an oleophilic group. Also preferable are the fluorochemical surfactants described in JP-A Nos. 62-170950, 62-226143 and 60-168144.

In an embodiment, only one surfactant is used. In another embodiment, a combination of two or more surfactants is used. The content of surfactant is preferably from 0.001 to 10 wt %, more preferably from 0.01 to 7 wt % with respect to the total solid content in the image recording layer.

<Colorant>

Various other compounds may be added as necessary additionally in the invention. For example, a dye showing large absorption in the visible light region may be used as an image colorant. Specific examples thereof include Oil Yellow #101, Oil Yellow #103, Oil Pink #312, Oil Green BG, Oil Blue BOS, Oil Blue #603, Oil Black BY, Oil Black BS, and Oil Black T-505 (manufactured by Orient Chemical Industries, Ltd.), Victoria Pure Blue, Crystal Violet (CI42555), Methyl Violet (CI42535), Ethyl Violet, Rhodamine B (CI145170B), Malachite Green (CI42000), Methylene Blue (CI52015), and the dyes described in JP-A No. 62-293247. In addition, pigments such as phthalocyanine pigments, azo pigments, carbon black, and titanium oxide can also be used favorably.

It is preferable to add a colorant since the colorant makes it easier to distinguish image and non-image portions after image formation. The addition amount may be from 0.01 to 10 wt % with respect to the total solid content in the image recording material.

<Printing-Out Agent>

A compound that changes its color in the presence of an acid or radical may be added to the image recording layer in the invention so that a printed-out image is formed. Preferable examples of the compound include various colorants such as diphenylmethane, triphenylmethane, thiazine, oxazine, xanthene, anthraquinone, iminoquinone, azo, and azomethine colorants.

Specific examples thereof include dyes such as brilliant green, ethyl violet, methyl green, crystal violet, basic Fuchsine, methyl violet 2B, quinaldine red, rose bengal, metanil yellow, thymol sulfophthalein, xylenol blue, methyl orange, paramethyl red, Congo red, benzopurpurin 4B, α-naphthyl red, Nile blue 2B, Nile blue A, methyl violet, malachite green, Parafuchsine, Victoria Pure Blue BOH [manufactured by Hodogaya Chemical Co., Ltd.], Oil Blue #603 [manufactured by Orient Chemical Industries, Ltd.], Oil Pink #312 [manufactured by Orient Chemical Industries, Ltd.], Oil Red 5B [manufactured by Orient Chemical Industries, Ltd.], Oil Scarlet #308 [manufactured by Orient Chemical Industries, Ltd.], Oil Red OG [manufactured by Orient Chemical Industries, Ltd.], Oil Red RR [manufactured by Orient Chemical Industries, Ltd.], Oil Green #502 [manufactured by Orient Chemical Industries, Ltd.], Spilon Red BEH Special [manufactured by Hodogawa Chemical Co., Ltd.], m-cresol purple, cresol red, rhodamine B, rhodamine 6G, sulforhodamine B, Auramine, 4-p-diethylaminophenyliminonaphthoquinone, 2-carboxyanilino-4-p-diethylaminophenyliminonaphthoquinone, 2-carboxystearylamino-4-p-N,N-bis(hydroxyethyl)amino-phenyliminonaphthoquinone, 1-phenyl-3-methyl-4-p-diethylaminophenylimino-5-pyrazolone, and 1-β-naphthyl-4-p-diethylaminophenylimino-5-pyrazolone; and leuco dyes such as p,p',p"-hexamethyltriaminotriphenylmethane (leuco crystal violet), and Pergascript Blue SRB (manufactured by Ciba-Geigy Corp.).

In addition, leuco dyes, raw materials for heat-sensitive paper and pressure-sensitive paper, are also favorable. Specific examples thereof include crystal violet lactone, malachite green lactone, benzoylleucomethylene blue, 2-(N-phenyl-N-methylamino)-6-(N-p-toluyl-N-ethyl)amino-fluorane, 2-anilino-3-methyl-6-(N-ethyl-p-toluidino) fluorane, 3,6-dimethoxyfluorane, 3-(N,N-diethylamino)-5-methyl-7-(N,N-dibenzylamino)-fluorane, 3-(N-cyclohexyl-N-methylamino)-6-methyl-7-anilinofluorane, 3-(N,N-diethylamino)-6-methyl-7-anilinofluorane, 3-(N,N-diethylamino)-6-methyl-7-quinolidinofluorane, 3-(N,N-diethylamino)-6-methyl-7-chlorofluorane, 3-(N,N-diethylamino)-6-methoxy-7-aminofluorane, 3-(N,N-diethylamino)-7-(4-chloroanilino)fluorane, 3-(N,N-diethylamino)-7-chlorofluorane, 3-(N,N-diethylamino)-7-benzylaminofluorane, 3-(N,N-diethylamino)-7,8-benzofluorane, 3-(N,N-dibutylamino)-6-methyl-7-anilinofluorane, 3-(N,N-dibutylamino)-6-methyl-7-quinolidinofluorane, 3-pyperidino-6-methyl-7-anilinofluorane, 3-pyrrolidino-6-methyl-7-anilinofluorane, 3,3-bis(1-ethyl-2-methylindol-3-yl)phthalide, 3,3-bis(1-n-butyl-2-methylindol-3-yl)phthalide, 3,3-bis(p-dimethylaminophenyl)-6-dimethylaminophthalide, 3-(4-diethylamino-2-ethoxyphenyl)-3-(1-ethyl-2-methylindol-3-yl)-4-phthalide, and 3-(4-diethylaminophenyl)-3-(1-ethyl-2-methylindol-3-yl)phthalide.

The addition amount of the dye that changes its color in the presence of an acid or radical is preferably from 0.01 to 10 wt % with respect to the solid content in the image recording layer.

<Polymerization Inhibitor>

A trace amount of heat-polymerization inhibitor is preferably added to the image recording layer according to the invention during production or storage of the image recording layer, in order to prevent undesirable thermal polymerization of the radical polymerizable compound (C).

Preferable examples of the heat-polymerization inhibitor include hydroquinone, p-methoxyphenol, di-t-butyl-p-cresol, pyrogallol, t-butylcatechol, benzoquinone, 4,4'-thiobis(3-methyl-6-t-butylphenol), 2,2'-methylene-bis(4-methyl-6-t-butylphenol), and N-nitroso-N-phenyl hydroxylamine aluminum salt.

The amount of the heat-polymerization inhibitor to be added is preferably about 0.01 wt % to about 5 wt % with respect to the total solid content in the image recording layer.

<Higher Fatty Acid Derivative and the Like>

To prevent the polymerization inhibition by oxygen, a higher fatty acid derivative such as behenic acid or behenic amide may be added to the image recording layer according to the invention so that the higher fatty acid derivative localizes on the surface of the image recording layer in the drying step after application. The amount of the higher fatty acid derivative to be added is preferably about 0.1 wt % to about 10 wt % with respect to the total solid content in the image recording layer.

<Plasticizer>

The image recording layer according to the invention may contain a plasticizer for the purpose of improving on-press developability.

Preferable examples of the plasticizer include phthalic esters such as dimethyl phthalate, diethyl phthalate, dibutyl phthalate, diisobutyl phthalate, dioctyl phthalate, octyl capryl phthalate, dicyclohexyl phthalate, ditridecyl phthalate, butylbenzyl phthalate, diisodecyl phthalate, and diallyl phthalate; glycol esters such as dimethylglycol phthalate, ethylphthalylethyl glycolate, methylphthalylethyl glycolate, butylphthalylbutyl glycolate, and triethylene glycol dicaprylic ester; phosphate esters such as tricresyl phosphate and triphenyl phosphate; aliphatic dibasic acid esters such as diisobutyl adipate, dioctyl adipate, dimethyl sebacate, dibutyl sebacate, dioctyl azelate, and dibutyl maleate; polyglycidyl methacrylate, triethyl citrate, glycerol triacetyl ester, and butyl laurate.

The content of plasticizer is preferably about 30 wt % or less with respect to the total solid content in the image recording layer.

<Inorganic Fine Particle>

The image recording layer according to the invention may contain inorganic fine particles for the purpose of improving the cured film strength of the image portion and the on-press developability of the non-image portion.

Preferable examples of the inorganic fine particles include silica, alumina, magnesium oxide, titanium oxide, magnesium carbonate, calcium alginate, and mixtures thereof. The presence of the particles is effective in reinforcement of the layer and improvement in interfacial adhesiveness caused by roughness of the surface even if the particles do not have photothermal converting characteristics.

The inorganic fine particles preferably have an average diameter of 5 nm to 10 μm, more preferably 0.5 to 3 μm. Within the range above, the particles can be dispersed in the image recording layer stably, the strength of the image recording layer is ensured, and a highly hydrophilic non-image portion resistant to staining during printing can be formed.

The inorganic fine particles described above, for example colloidal silica dispersions, are easily available commercially.

The content of the inorganic fine particles is preferably 20 wt % or less, more preferably 10 wt % or less, with respect to the total solid content in the image recording layer.

<Low-Molecular Weight Hydrophilic Compound>

The image recording layer according to the invention may contain a hydrophilic low-molecular weight compound for the purpose of improving on-press developability. The hydrophilic low-molecular weight compound may be a water-soluble organic compound, and examples thereof include glycols such as ethylene glycol, diethylene glycol, triethylene glycol, propylene glycol, dipropylene glycol, and tripropylene glycol, and ether or ester derivatives thereof; polyhydroxy compounds such as glycerol and pentaerythritol; organic amines such as triethanolamine, diethanolamine and monoethanolamine, and salts thereof; organic sulfonic acids such as toluenesulfonic acid and benzenesulfonic acid, and salts thereof; organic phosphonic acids such as phenylphosphonic acid, and salts thereof; and organic carboxylic acids such as tartaric acid, oxalic acid, citric acid, malic acid, lactic acid, gluconic acid, and amino acids, and salts thereof.

[Formation of Image Recording Layer]

The image recording layer according to the invention may be formed by dispersing or dissolving the necessary components in a solvent to form a coating liquid, and applying the coating liquid. Examples of the solvent for use include, but are not limited to, ethylene dichloride, cyclohexanone, methylethylketone, methanol, ethanol, propanol, ethylene glycol monomethylether, 1-methoxy-2-propanol, 2-methoxyethyl acetate, 1-methoxy-2-propyl acetate, dimethoxyethane, methyl lactate, ethyl lactate, N,N-dimethylacetamide, N,N-dimethylformamide, tetramethylurea, N-methylpyrrolidone, dimethylsulfoxide, sulfolane, γ-butylolactone, toluene, and water. In an embodiment, only one solvent is used. In another embodiment, a mixture of two or more solvents is used. The solid content of the coating liquid is preferably from 1 to 50 wt %.

The image recording layer according to the invention may be formed by providing multiple coating liquids each prepared by dispering or dissolving the same or different component in the same or different solvent, and applying the coating liquids through repeated coating and drying operations.

The amount (in terms of solid content) of the image recording layer on the support after coating and drying may vary depending on the application, but is preferably from 0.3 to 3.0 $g/m^2$ in general. Within the range above, favorable sensitivity and favorable film property of the image recording layer can be obtained.

Various methods may be used for coating, examples of which include bar coater coating, spin coating, spray coating, curtain coating, dip coating, air knife coating, blade coating, and roll coating.

(Support)

The support used in the image forming material according to the invention is not particularly limited, and may be a dimensionally stable plate-shaped material. Examples thereof include paper, paper laminated with a plastic material (e.g., polyethylene, polypropylene, or polystyrene), metal plates (e.g., of aluminum, zinc, or copper), plastic films (e.g., cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinylacetal), paper or plastic films laminated with a metal selected from the above metals, and paper or plastic films on which a metal selected from the above metals is deposited. The support may be selected from the above supports according to the purpose. When the image forming material is used in a planographic printing plate precursor, the support of the planographic printing plate precursor may be selected from the above-described supports. Preferable examples of the support for the planograhpic printing plate precursor include polyester films and aluminum plates. Among them, aluminum plates, which are superior in dimensional stability and relatively cheap, are more preferable.

(Planographic Printing Plate Precursor)

Exemplary embodiments and structures will be described which are especially preferaeble when the image recording material according to the invention is used in a planographic printing plate precursor.

(Support for Planographic Printing Plate Precursor)

When the support for a planographic printing plate is an aluminum plate, the aluminum plate may be a pure aluminum plate, an alloy plate containing aluminum as the main component and trace amounts of hetero-elements, or a thin film of aluminum or an aluminum alloy laminated with plastic. Examples of the hetero-element contained in the aluminum alloy include silicon, iron, manganese, copper, magnesium, chromium, zinc, bismuth, nickel, and titanium. The content of the hetero-elements in the alloy is preferably 10 wt % or less. Although pure aluminum plates are preferable in the invention, aluminum plates containing trace amounts of hetero-elements are also usable because it is difficult to prepare completely pure aluminum due to the problems in refining process. The composition of the aluminum plate is not particularly limited, and a known material may be used appropriately.

The thickness of the support is preferably from 0.1 to 0.6 mm, more preferably from 0.15 to 0.4 mm, and still more preferably from 0.2 to 0.3 mm.

The aluminum plate is preferably subjected to a surface treatment such as a surface roughening treatment or an anodizing treatment before use. The hydrophilicity of the support and the adhesion between the image recording layer and the support are improved by the surface treatment. Before the surface roughening treatment, the aluminum plate may be, as necessary, subjected to a degreasing treatment, for example, with a surfactant, organic solvent, aqueous alkaline solution, or the like so as to remove the rolling oil on the surface.

Various methods may be used for surface roughening of the aluminum plate, and examples thereof include a mechanical surface roughening treatment, an electrochemical surface roughening treatment (surface roughening by dissolving the surface electrochemically), and a chemical surface roughening treatment (surface roughening by selectively dissolving the surface chemically).

The method for the mechanical surface roughening may be selected from methods known in the art such as ball polishing, brush polishing, blast polishing, and buff polishing.

The electrochemical surface roughening may be performed, for example, by applying an alternate or direct current to the support in an electrolyte solution containing an acid such as hydrochloric acid or nitric acid. A method of using a mixed acid is also usable, such as the method described in JP-A No. 54-63902.

The aluminum plate after surface roughening treatment may be optionally etched with alkali, using an aqueous solution of potassium hydroxide, sodium hydroxide, or the like. After neutralization, the aluminum plate may be subjected, as necessary, to an anodizing process so as to improve the abrasion resistance.

The electrolyte to be used for the anodization of the aluminum plate may be selected from various electrolytes that are capable of forming a porous oxide film. In general, the electrolyte may be selected from sulfuric acid, hydrochloric acid, oxalic acid, chromic acid, or mixed acids thereof. The concentration of the electrolyte is determined adequately according to the kind of the electrolyte.

The condition of the anodization may be changed according to the electrolyte to be used, and thus cannot be specified uniquely. In general, the electrolyte concentration may be from 1 to 80 wt %; the liquid temperature may be from 5 to 70° C., the electric current density may be from 5 to 60 $A/dm^2$; the voltage may be from 1 to 100 V; and the electrolysis time may be from 10 seconds to 5 minutes. The amount of the anodic oxide film to be formed is preferably from 1.0 to 5.0 $g/m^2$ and more preferably from 1.5 to 4.0 $g/m^2$. In this range, it is possible to obtain a planographic printing plate with superior printing durability and scratch resistance of the non-image portion.

After the anodization, a hydrophilicity imparting treatment is conducted on the surface of the aluminum plate as necessary. The hydrophilicity imparting treatment may be an alkali metal silicate method, such as the methods described in U.S. Pat. Nos. 2,714,066, 3,181,461, 3,280,734 and 3,902,734. In the method, the support may be immersed in, for example, an aqueous solution of sodium silicate, or may be electrolyzed. Other examples of the hydrophilicity imparting treatment include the method of treating the support with potassium fluorozirconate described in JP-B No. 36-22063, and the methods of treating the support with polyvinylphosphonic acid described in U.S. Pat. Nos. 3,276,868, 4,153,461 and 4,689,272.

The support preferably has an centerline average roughness of 0.10 to 1.2 μm. In the range above, excellent adhesiveness to the image recording layer, favorable printing durability, and superior staining resistance can be obtained.

The color density of the support is preferably from 0.15 to 0.65 in terms of reflection intensity. In the range above, excellent image formation can be achieved due to prevention of halation during image exposure, and plate checkability after development is also excellent.

(Back Coat Layer)

A back coat layer may be provided on the back surface of the support as necessary after surface treatment of the support or after formation of an undercoat layer.

Preferable examples the material for the back coat include the organic polymer compounds described in JP-A No. 5-45885 and the coating layers of a metal oxide generated by hydrolysis and polycondensation of an organic or inorganic metal compound described in JP-A No. 6-35174. Among them, alkoxy silicon compounds such as $Si(OCH_3)_4$, $Si(OC_2H_5)_4$, $Si(OC_3H_7)_4$, and $Si(OC_4H_9)_4$ are preferable in the point of its low cost and easy availability.

(Undercoat Layer)

An undercoat layer may be provided as necessary between the image recording layer and the support in the planographic printing plate precursor according to the invention, which may be used in the planographic printing method according to the invention. The undercoat layer, which functions as a heat-insulating layer, prohibits the heat generated by exposure to infrared laser radiation from diffusing into the support, and thus allows efficient use of the heat. Therefore, there is an advantage in that the sensitivity can be improved. On the other hand, in unexposed portions, the undercoat layer facilitates separation of the image recording layer from the support, leading to improved on-press developability.

Specifically, preferable examples of the material for the undercoat layer include silane-coupling agents having an addition-polymerizable ethylenic double-bond reactive group such as those described in JP-A No. 10-282679, and phosphorus compounds having an ethylenic double-bond reactive group such as those described in JP-A No. 2-304441.

More preferable undercoat layer may be made, for example, of a polymer resin including a copolymer of an adsorptive group-containing monomer, a hydrophilic group-containing monomer, and a crosslinking group-containing monomer.

The polymeric undercoat includes a group that can be adsorbed on the hydrophilic support surface. The presence or absence of adsorptive property onto the surface of the can be determined, for example, by the following method.

A test compound is dissolved in a good solvent to form a coating liquid, and the coating liquid is applied on a support and dried to give a coating amount of 30 mg/m² after drying. Then, the support coate with the test compound is washed sufficiently with a good solvent, and the amount of the test compound remaining on the support (the test compound that was not washed away) is determined, from which the amount of the test compound adsorbed on the support is calculated. The residual amount may be determined directly from the measurement of the amount of the remaining compound, or alternatively, indirectly from quantitative measurement of the amount of the test compound dissolved in the washing solution. The quantitative determination of the compound may be performed, for example, by fluorescent X-ray analysis, reflection spectroscopic absorbance measurement, liquid chromatography measurement, or the like. The term "compound that can be adsorbed on the support" refers to a compound that remains in an amount of at least 1 mg/m² after the washing described above.

The adsorptive group to the hydrophilic support surface is a functional group that can form a chemical bond (e.g., an ionic bond, a hydrogen bond, a coordination bond, or a bond based on intermolecular force) with a substance (e.g., metal or metal oxide) or a functional group (e.g., a hydroxyl group) present on the hydrophilic support surface. The adsorptive group is preferably an acidic or cationic group.

The acidic group preferably has an acid dissociation constant (pKa) of 7 or less. Examples of the acidic group include a phenolic hydroxyl group, a carboxyl group, —$SO_3H$, —$OSO_3H$, —$PO_3H_2$, —$OPO_3H_2$, —$CONHSO_2$—, —$SO_2NHSO_2$— and —$COCH_2COCH_3$. Phosphate groups (—$OPO_3H_2$ and —$PO_3H_2$) are particularly preferable. The acidic group may alternatively be a metal salt.

The cationic group is preferably an onium group. Examples of the onium group include ammonium, phosphonium, arsonium, stibonium, oxonium, sulfonium, selenonium, stannonium, and iodonium groups. Ammonium, phosphonium and sulfonium groups are preferable; ammonium and phosphonium groups are more preferable; and an ammonium group is most preferable.

Particularly preferable examples of adsorptive group-containing monomers include the compounds represented by the following Formula (III) or (IV).

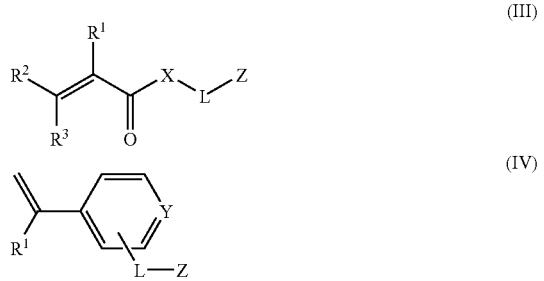

In Formula (III), $R^1$, $R^2$ and $R^3$ each independently represent a hydrogen or halogen atom or an alkyl group having 1 to 6 carbon atoms. It is preferable that $R^1$, $R^2$ and $R^3$ each independently represent a hydrogen atom or an alkyl group having 1 to 6 carbon atoms, more preferably a hydrogen atom or an alkyl group having 1 to 3 carbon atoms, and most preferably a hydrogen atom or a methyl group. $R^2$ and $R^3$ are each particularly preferably a hydrogen atom.

In Formula (III), X represents an oxygen atom (—O—) or an imino group (—NH—). X is more preferably an oxygen atom.

In Formulae (III) and (IV), L represents a divalent connecting group. L is preferably a divalent aliphatic group (an alkylene, substituted alkylene, alkenylene, substituted alkenylene, alkynylene, or substituted alkynylene group), a divalent aromatic group (an arylene or substituted arylene group), a divalent heterocyclic group, or a combination of one or more of the forementioned divalent connecting groups with an oxygen atom (—O—), a sulfur atom (—S—), an imino group (—NH—), a substituted imino group (—NR—, wherein R represents an aliphatic group, an aromatic group or a heterocyclic group) or a carbonyl group (—CO—).

The aliphatic group may have a cyclic or branched structure. The number of the carbon atoms in the aliphatic group is preferably from 1 to 20, more preferably from 1 to 15, and most preferably from 1 to 10. The aliphatic group is more preferably a saturated aliphatic group than an unsaturated aliphatic group. The aliphatic group may have one or more substituents. Examples of the substituents include halogen atoms, a hydroxyl group, aromatic groups, and heterocyclic groups.

The number of the carbon atoms of the aromatic group is preferably from 6 to 20, more preferably from 6 to 15, and most preferably from 6 to 10. The aromatic group may have one or more substituents. Examples of the substituents include halogen atoms, a hydroxyl group, aliphatic groups, aromatic groups, and heterocyclic groups.

The heterocyclic group preferably has a five- or six-membered heterocyclic ring. The heterocyclic ring may be fused with another heterocyclic ring, an aliphatic ring or an aromatic ring. The heterocyclic group may have one or more substituents. Examples of the substituents include halogen atoms and hydroxyl, oxo (=O), thioxo (=S), imino (=NH), substituted imino (=N—R, wherein R represents an aliphatic, aromatic or heterocyclic group), aliphatic, aromatic and heterocyclic groups.

L is preferably a divalent connecting group containing multiple polyoxyalkylene structures. The polyoxyalkylene structure is more preferably a polyoxyethylene structure. In other words, L preferably contains —$(OCH_2CH_2)_n$— (n denotes an integer from 2 or greater).

In Formulae (III) and (IV), Z represents a functional group that can be adsorbed on the hydrophilic support surface.

In Formula (IV), Y represents a carbon or nitrogen atom. When Y is a nitrogen atom and L binds to Y to form a quaternary pyridinium group, the quaternary pyridinium group is adsorptive itself. Therefore, in monomers having such a structure, Z is not essential.

$R^1$ in Formula (IV) represents a hydrogen or halogen atom or an alkyl group having 1 to 6 carbon atoms, and preferable examples thereof are the same as those of $R^1$ in Formula (III).

The adsorptive functional group is the same as that described above.

Hereinafter, specific examples of the monomers represented by Formula (III) or (IV) will be listed.

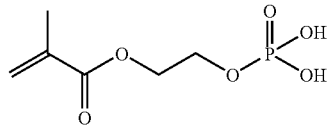

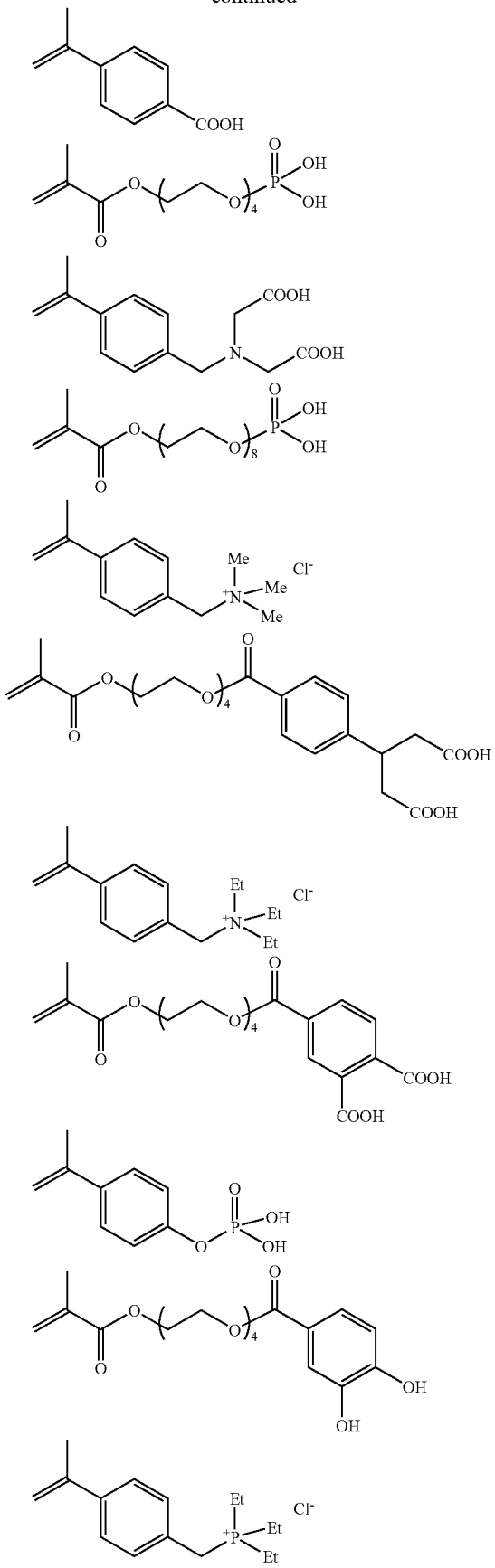
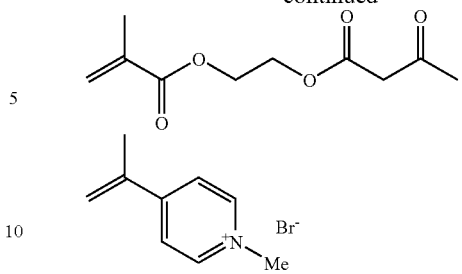

Preferable examples of the hydrophilic groups of the polymer resin for undercoating usable in the invention include hydroxy, carboxyl, carboxylate, hydroxyethyl, polyoxyethyl, hydroxypropyl, polyoxypropyl, amino, aminoethyl, aminopropyl, ammonium, amido, carboxymethyl, sulfonic acid, and phosphoric acid groups. A monomer having such a hydrophilic group and a polymerizable group may be used as a copolymerization component for the aforementioned polymer resin.

The undercoating polymer resin used in the invention preferably has a crosslinking group. The presence of a crosslinking group improves adhesiveness to the image portion. When crosslinking property is imparted to the undercoating polymer resin, crosslinking groups may be introduced by introducing a crosslinking functional group such as ethylenic unsaturated bond into side chains of the polymer, or by forming a salt structure between the polymer resin and a compound having a substituent with the opposite charge to the charge of the polar substituents on the polymer resin and an ethylenic unsaturated bond.

Examples of polymers having an ethylenic unsaturated bond on its side chain include polymers of an acrylic or methacrylic ester or amide wherein the ester or amide residue (R of —COOR or —CONHR) contains an ethylenic unsaturated bond.

Examples of the residues (R) having an ethylenic unsaturated bond include —$(CH_2)_n CR^1$=$CR^2R^3$, —$(CH_2O)_n CH_2 CR^1$=$CR^2R^3$, —$(CH_2CH_2O)_n CH_2 CR^1$=$CR^2R^3$, —$(CH_2)_n$—NH—CO—O—$CH_2 CR^1$=$CR^2R^3$, —$(CH_2)_n$—O—CO—$CR^1$=$CR^2R^3$, and —$(CH_2CH_2O)_2$—X (wherein, $R^1$ to $R^3$ each independently represent a hydrogen or halogen atom or an alkyl, aryl, alkoxy or aryloxy group having 1 to 20 carbon atoms; $R^1$ and $R^2$ or $R^1$ and $R^3$ may bond to each other to form a ring; n denotes an integer from 1 to 10; and X represents a dicyclopentadienyl residue).

Specific examples of the ester residues include, —$CH_2CH$=$CH_2$ (described in JP-B No. 7-21633), —$CH_2CH_2O$—$CH_2CH$=$CH_2$, —$CH_2C(CH_3)$=$CH_2$, —$CH_2CH$=$CH$—$C_6H_5$, —$CH_2CH_2OCOCH$=$CH$—$C_6H_5$, —$CH_2CH_2NHCOO$—$CH_2CH$=$CH_2$, and —$CH_2CH_2O$—X (wherein, X represents a dicyclopentadienyl residue).

Specific examples of the amide residues include, —$CH_2CH$=$CH_2$, —$CH_2CH_2O$—Y (wherein, Y represents a cylcohexene residue), and —$CH_2CH_2OCO$—$CH$=$CH_2$.

The crosslinking group-containing monomer for the undercoating polymer resin is preferably an ester or amide of acrylic or methacrylic acid having such a crosslinking group.

The content of crosslinking groups in the undercoating polymer resin (content of radical polymerizable unsaturated double bonds as determined by iodine titration) is preferably from 0.1 to 10.0 mmol, more preferably from 1.0 to 7.0 mmol, and most preferably from 2.0 to 5.5 mmol, per 1 g of polymer resin. In the range above, favorable sensitivity and staining resistance can be obtained at the same time, and satisfactory storage stability can also be achieved.

The undercoating polymer resin preferably has a weight-average molecular weight of 5,000 or more, more preferably 10,000 to 300,000. The number-average molecular weight of the undercoating polymer resin is preferably 1,000 or more, more preferably from 2,000 to 250,000. The polydispersity (weight-average molecular weight/number-average molecular weight) is preferably from 1.1 to 10.

The undercoating polymer resin may be a random polymer, a block polymer, a graft polymer, or the like, and is preferably a random polymer.

Any known hydrophilic group-containing resin may be used as the undercoating polymer resin in the invention. Specific examples of the resins include gum arabic, casein, gelatin, starch derivatives, carboxymethylcellulose and its sodium salt, cellulose acetate, sodium alginate, vinyl acetate-maleic acid copolymers, styrene-maleic acid copolymers, polyacrylic acids and salts thereof, polymethacrylic acids and salts thereof, homopolymers and copolymers of hydroxyethyl methacrylate, homopolymers and copolymers of hydroxyethyl acrylate, homopolymers and copolymers of hydroxypropyl methacrylate, homopolymers and copolymers of hydroxypropyl acrylate, homopolymers and copolymers of hydroxybutyl methacrylate, homopolymers and copolymers of hydroxybutyl acrylate, polyethylene glycols, hydroxypropylene polymers, polyvinylalcohols, hydrolyzed polyvinyl acetates having a hydrolysis degree of 60 mol % or more, preferably 80 mol % or more, polyvinylformal, polyvinylbutyral, polyvinylpyrrolidone, homopolymers and copolymers of acrylamide, homopolymers and copolymers of methacrylamide, homopolymers and copolymers of N-methylol acrylamide, polyvinylpyrrolidone, alcohol-soluble nylons, and polyethers of 2,2-bis-(4-hydroxyphenyl)-propane and epichlorohydrin.

In an embodiment, only one undercoating polymer resin is used. In another embodiment, a combination of two or more undercoating polymer resins is used.

The amount of the undercoat layer coated (solid content) is preferably from 0.1 to 100 mg/m$^2$, more preferably from 1 to 30 mg/m$^2$.

(Protective Layer)

A protective layer (overcoat layer) may be provided, as necessary, on the image recording layer of the planographic printing plate precursor according to the invention, for the purpose of imparting oxygen-blocking property, preventing scratch or the like on the image recording layer, preventing ablation at the time of high-illumination laser exposure, or the like.

The exposure of the planographic printing plate is conducted normally in the air. The image forming reaction in the image recording layer caused by exposure to radiation may be inhibited by low-molecular weight compounds in the air such as oxygen and basic substances. The protective layer prevents entry of the low-molecular weight compounds such as oxygen and basic substances into the image recording layer, and consequently suppresses the reactions that inhibit image formation conducted in the air. Accordingly, desirable characteristics of the protective layer include low permeation to low-molecular weight compounds such as oxygen, superior transmission of the radiation used for exposure, excellent adhesion to the image recording layer, and easy removability during an on-press development step after exposure. Protective layers having such characteristics are described, for example, in U.S. Pat. No. 3,458,311 and JP-B No. 55-49729.

The raw material for the protective layer can be selected appropriately from water-soluble polymers as well as water-insoluble polymers. Specific examples thereof include water-soluble polymers such as polyvinyl alcohol, modified polyvinyl alcohols, polyvinyl pyrrolidone, polyvinyl imidazole, polyacrylic acid, polyacrylamide, partially saponified product of polyvinyl acetate, ethylene-vinylalcohol copolymers, water-soluble cellulose derivatives, gelatin, starch derivatives, and gum arabic; and polymers such as polyvinylidene chloride, poly(meta)acrylonitrile, polysulfone, polyvinyl chloride, polyethylene, polycarbonate, polystyrene, polyamide, and cellophane. In an embodiment, two or more of such materials are used simultaneously, as necessary.

Raw materials relatively useful among the aforementioned materials above include water-soluble polymer compounds superior in crystallinity. Specifically, preferable examples thereof include polyvinyl alcohol, polyvinyl pyrrolidone, polyvinyl imidazole, water-soluble acrylic resins such as polyacrylic acid, gelatin, and gum arabic. Among them, polyvinyl alcohol, polyvinyl pyrrolidone, and polyvinyl imidazole are preferable in the point that they can be coated using water as the solvent and they can be easily removed with damping water at the time of printing. Among them, polyvinyl alcohol (PVA) gives the most favorable results on basic properties such as oxygen-blocking property and removability at development.

The polyvinyl alcohol for use in the protective layer may be partially substituted by ester, ether, or acetal as long as it still contains unsubstituted vinyl alcohol units substantially in an amount that gives required water solubility. Similarly, the polyvinyl alcohol may contain one or more other copolymerization components in a part. For example, polyvinyl alcohols having various polymerization degrees which randomly have any of various hydrophilic modified units such as an anion-modified unit modified with an anion such as a carboxyl or sulfo group, a cation-modified unit modified with a cation such as an amino or ammonium group, a silanol-modified unit, or a thiol modification unit, and polyvinyl alcohols having various polymerization degrees which have, at a terminal of the polymer chain, any of modified units such as an anion-modified unit, a cation-modified unit, a silanol-modified unit, a thiol modified unit, an alkoxyl modified unit, a sulfide modified unit, an ester modified unit between vinyl alcohol and any of various organic acids, an ester modified unit between the aforementioned anion-modified unit and an alcohol, or an epoxy-modified unit, are preferable.

71 to 100 mol % hydrolysates of these modified polyvinyl alcohols having a polymerization degree in the range of 300 to 2,400 are favorable. Specific examples thereof include PVA-105, PVA-110, PVA-117, PVA-117H, PVA-120, PVA-124, PVA124H, PVA-CS, PVA-CST, PVA-HC, PVA-203, PVA-204, PVA-205, PVA-210, PVA-217, PVA-220, PVA-224, PVA-217EE, PVA-217E, PVA-220E, PVA-224E, PVA-405, PVA-420, PVA-613, and L-8 manufactured by Kuraray Co. Ltd. Examples of the modified polyvinyl alcohols include those having an anion-modified unit such as KL-318, KL-118, KM-618, KM-118, and SK-5102; those having a cation-modified unit such as C-318, C-118, and CM-318; those having a terminal thiol-modified unit such as M-205 and M-115; those having a terminal sulfide-modified unit such as MP-103, MP-203, MP-102, and MP-202; those having an ester-modified unit with a higher fatty acid at the terminal such as HL-12E and HL-1203, those having other reactive silane-modified unit such as R-1130, R-2105, and R-2130, and the like.

The protective layer preferably contains a layered compound. The layered compound is particles in the thin plate shape, and examples thereof include micas including natural and synthetic micas such as those represented by the following Formula:

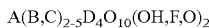

$A(B,C)_{2-5}D_4O_{10}(OH,F,O)_2$

[wherein, A represents K, Na, or Ca; B and C each independently represent Fe (II), Fe (III), Mn, Al, Mg, or V; and D represents Si or Al]; talcs such as that represented by 3MgO-4SiO-H$_2$O, teniolite, montmorillonite, saponite, hectolite, and zirconium phosphate.

Examples of the natural micas include white mica, soda mica, phlogopite, black mica, and scaly mica. Examples of the synthetic micas include non-swelling micas such as fluorine phlogopite $KMg_3(AlSi_3O_{10})F_2$ and K tetrasilicic mica $KMg_{2.5}(Si_4O_{10})F_2$; and swelling micas such as Na tetrasilicic mica $NaMg_{2.5}(Si_4O_{10})F_2$, Na or Liteniolite $(Na,Li)Mg_2Li(Si_4O_{10})F_2$, and montmorillonite-based Na or Li hectolight $(Na,Li)_{1/8}Mg_{2/5}Li_{1/8}(Si_4O_{10})F_2$. Synthetic smectites are also useful.

Among the layered compounds, swelling clay minerals such as mica, montmorillonite, saponite, hectolite, and bentonite are useful, and fluorine-based swelling micas, which are synthetic layered compounds, are particularly useful. Swelling clay minerals such as mica, montmorillonite, saponite, hectolite, and bentonite have a laminate structure having unit crystal lattice layers with a thickness of approximately 10 to 15 Å, and the degree of intra-lattice metal atom substitutions is significantly higher than other clay minerals. As a result, the lattice layer becomes deficient in the amount of positive charges, and thus cations such as $Li^+$, $Na^+$, $Ca^{2+}$, $Mg^{2+}$ or an organic cation (e.g., an amine salt, a quaternary ammonium salt, a phosphonium salt or a sulfonium salt) are adsorbed to the interlayer space to compensate the deficiency. These layered compounds swell in the presence of water. Thus, the compounds are easily cleaved when a shearing force is applied in that state, giving a stable sol in water. Such a tendency is stronger in the case of bentonite and swelling synthetic micas.

As for the shape of the layered compound, the thickness thereof is preferably as small as possible from the viewpoint of diffusion control, and the plane size thereof is preferably larger as far as the smoothness of coated surface or the transmission of the activated radiation is not impaired. In consideration of such viewpoints, the aspect ratio may be 20 or more, preferably 100 or more, and particularly preferably 200 or more. The aspect ratio is a ratio of the thickness of the particle to the length of particle, and may be determined, for example, from the projection of the particle in a micrograph. A layered compound having a greater aspect ratio may create greater effects.

Regarding the particle diameter of the layered compound, the average diameter may be from 1 to 20 µm, preferably from 1 to 10 µm, and particularly preferably from 2 to 5 µm. When the particle diameter is less than 1 µm, inhibition of penetration of oxygen and moisture is insufficient, and is not sufficiently effective. Use of a layered compound having a diameter of more than 20 µm creates a problem in that dispersion stability in the coating liquid is insufficient and coating may not be stable. The average thickness of the particles is preferably 0.1 µm or less, more preferably 0.05 µm or less, and particularly preferably 0.01 µm or less. For example, a swelling synthetic mica, which is a typical example of the layered inorganic compound, has a thickness of 1 to 50 nm and a plane size of approximately 1 to 20 µm.

Presence of the particles of an inorganic layered compound having a larger aspect ratio in the protective layer leads to improvement in the coated film strength and more effective prevention of permeation of oxygen and moisture; as a result, deterioration of the protective layer by deformation or the like is prevented, and storage stability is improved (e.g., the image forming property of the planographic printing plate precursor is not deteriorated by humidity change even when stored under high-humidity condition for a long time.

Regarding the content of inorganic layered compound in the protective layer, the ratio of the amount of inorganic layered compound in the protective layer to the amount of the binder used in the protective layer is preferably from 1/100 to 5/1 by weight. When multiple inorganic layered compounds are used simultaneously, the total content of these inorganic layered compounds is preferably in the aforementioned weight range.

As additional components of the protective layer, glycerol, dipropylene glycol or the like may be added in an amount of several wt % with respect to the (co)polymer for improvement in flexibility. Other examples of additional components that can be contained in the composition for the protective layer include: anionic surfactants (e.g., sodium alkylsulfate or sodium alkylsulfonate); amphoteric surfactants (e.g., alkylamino carboxylate salts, alkylamino dicarboxylate salt); and nonionic surfactants such as polyoxyethylene alkylphenylether. The amount of the surfactant may be from 0.1 to 100 wt % with respect to the amount of the (co)polymer.

In addition, regarding the improvement in adhesion to the image portion, for example, JP-A No. 49-70702 discloses that sufficient adhesisiveness can be obtained when 20 to 60 wt % of an acrylic emulsion, a water-insoluble vinyl pyrrolidone-vinyl acetate copolymer, or the like is mixed with a hydrophilic polymer mainly composed of polyvinyl alcohol and then the mixture is applied on the image recording layer. In the present invention, any one such known techniques may be used.

The protective layer may have additional functions. For example, a colorant (e.g., a water-soluble dye) excellent in transmittance to the infrared rays used for exposure of the recording layer and capable of effectively absorbing light of a wavelength that does not participate in exposure may be added to the protective layer, so that safelight compatibility can thereby be increased without reducing sensitivity.

A general example of the method of dispersing the layered compound used in the protective layer will be described. First, 5 to 10 parts by weight of the swelling layered compound mentioned above as a preferable layered compound is added to 100 parts by weight of water, and left sufficiently to reach a stable state, so that the layered compound swells. Then, the mixture is treated with a dispersing machine, so that the layered compound is dispersed. Examples of the dispersing machine to be used include various mills that mechanically apply direct force for dispersing, high-speed stirring dispersing machines having high shear force, and dispersing machines giving high-intensity ultrasonic energy. Specific examples include a ball mill, a sand grinder mill, a viscomill, a colloid mill, a homogenizer, a dissolver, a Polytron, a homomixer, a homoblender, a Keddy mill, a jet agitator, a capillary emulsifier, a liquid siren, an electromagnetic strain ultrasonic generator, and an emulsifier having a Poleman whistle. A 5 to 10 wt % dispersion of the inorganic layered compound compound dispersed by the method described above is highly viscous or gelled and extremely excellent in storage stability. When this dispersion is used to prepare a coating liquid for forming a protective layer, the coating liquid is prepared preferably by diluting the dispersion with water and sufficiently stirring it, followed by compounding it with a binder solution.

Known additives such as an anionic, nonionic, cationic, or fluorochemical surfactant for improving coatability or a water-soluble plasticizer for improving the physical properties of the resultant coating may be added to this coating liquid for forming a protective layer. The water-soluble plasticizer may be, for example, propionamide, cyclohexane diol, glycerin, or sorbitol. A water-soluble (meth)acrylic polymer can also be added. Known additives for improving adhesiveness to the image recording layer or for improving the stability of the coating liquid over time can also be added to the coating liquid.

A protective layer may be formed by coating liquid for forming a protective layer thus prepared on the image recording layer provided on a support, followed by drying. The coating solvent may be selected appropriately in consideration of the kind of binder to be used. When a water-soluble polymer is used, use of distilled water or purified water is preferable. The method of coating the coating liquid for forming a protective layer is not particularly limited, and any one of known methods such as those described in U.S. Pat. No. 3,458,311 and JP-B No. 55-49729 may be applied. Specifically, the protective layer may be formed by blade coating, air knife coating, gravure coating, roll coating, spray coating, dip coating, bar coating, or the like.

The amount of the protective layer to be applied is preferably in the range of 0.01 to 10 $g/m^2$, more preferably 0.02 to 3 $g/m^2$, and most preferably 0.02 to 1 $g/m^2$, in terms of the coating amount after drying.

[Method of Making a Planographic Printing Plate and Planographic Printing Method]

The method of making a planographic printing plate by exposing the planograhpic printing plate precursor according to the invention, and conduct printing will be described.

Image formation may be conducted by imagewise exposing the planograhpic printing plate precursor according to the invention to laser radiation. During the exposure, cation radical molecules are generated in the exposed region, so that the color and/or brightness of the image recording layer changes. After this process, the exposed region, which is the image-formed region, can be visually confirmed, and the planographic printing plate precursor is excellent in visual recognizability.

Any known light source may be used as the light source for exposing the planographic printing plate precursor according to the invention. The light source emits radiation having a wavelength of preferably 300 to 1,200 nm; specifically, various lasers are preferable as the light source. Among them, a semiconductor laser that emits infrared radiation having a wavelength of 760 to 1,200 nm can be used favorably.

The exposure mechanism may be any one of the internal-surface drum method, external-face drum method, flat bed method, and the like.

Other examples of the exposure radiation usable for exposing the planographic printing plate precursor according to the invention include ultrahigh-, high-, medium- and low-pressure mercury lamps, chemical lamps, carbon arc lamps, xenon lamps, metal halide lamps, various visible or ultraviolet laser lamps, fluorescent lamps, tungsten lamps, and sunlight.

As described above, in the planographic printing method according to the invention, the planographic printing plate precursor according to the invention may be imagewise exposed to infrared laser radiation, and then, without being subjected to any wet development step, may be used for printing with an oil-based ink and an aqueous component being supplied.

Specific examples of the methods include: a method of exposing a planographic printing plate precursor with an infrared laser, mounting the exposed precursor in a printing machine without conducting a development step, and conduct printing; and a method of mounting a planographic printing plate precursor in a printing machine, exposing the precursor to infrared laser radiation on-press, and conduct printing without conducting a development step.

When a planographic printing plate precursor is used for printing with supplied aqueous component and oil-based ink after imagewise exposure to laser radiation without undergoing a development step such as wet development step, the image recording layer in the exposed region cured by exposure forms a region with oleophilic surface that receives the oil-based ink. On the other hand, in the unexposed region, the uncured image recording layer is dissolved or dispersed in the supplied aqueous component and/or the oil-based ink, and thus is removed, so that a hydrophilic surface is exposed in the region.

As a result, the aqueous component adheres to the exposed hydrophilic surface and the oil-based ink adheres to the image recording layer in the exposed region, allowing initiation of printing. Either the aqueous component or the oil-based ink may be supplied to the printing surface first. However it is preferable to supply the oil-based ink first in view of prevention of contamination of the aqueous component with the image recording layer in the unexposed region. Common damping water and printing ink for planographic printing may be used respectively as the aqueous component and the oil-based ink.

In this way, the planographic printing plate precursor is developed on an offset printing machine, and is used for printing of multiple sheets of paper.

EXAMPLES

In the following, the present invention is described in detail by way of Examples. However, the Examples should not be construed as limiting the invention.

Example 1

Preparation of Aluminum Support

An aluminum plate having a thickness of 0.3 mm (material: 1050) was degreased with aqueous 10 wt % sodium aluminate solution for removal of surface rolling oil at 50° C. for 30 seconds, and the aluminum surface was grained with three bundle nylon brushes having a bristle diameter of 0.3 mm by using an aqueous suspension of pumice containing pumice particles with a median diameter of 25 μm (specific density: 1.1 $g/cm^3$), followed by sufficient washing with water. The plate was immersed and etched in an aqueous 25 wt % sodium hydroxide solution at 45° C. for 9 seconds, washed with water, and then, immersed in 20 wt % nitric acid at 60° C. for 20 seconds and washed with water. The amount of etching on the grained surface was approximately 3 $g/m^2$.

The plate was subjected to continuous electrochemical surface roughening treatment with an alternating voltage of 60 Hz. The electrolytic solution used was 1 wt % aqueous nitric acid solution (containing 0.5 wt % of aluminum ion) at a temperature of 50° C. The electrochemical surface roughening treatment was carried out with a carbon electrode as a counter electrode, using a trapezoid rectangular wave alternating current wherein the time TP required for the electric current to change from 0 to the peak value was 0.8 msec and the duty ratio was 1:1. Ferrite was used as an assistant anode.

The current density was 30 A/dm² in terms of the electric current peak value, and 5% of the electric current from the power source was distributed to the assistant anode. During the electrolysis with nitric acid, the quantity of electricity was 175 C/dm² in terms of quantity of electricity at the time the aluminum plate works as the anode. Thereafter, the plate was washed with sprayed water.

Then, the plate was subjected to electrochemical surface roughening in an electrolyte solution of aqueous 0.5 wt % hydrochloric acid solution (containing aluminum ion at 0.5 wt %) at a liquid temperature of 50° C. under the condition of an electrical quantity of 50 C/dm² when the aluminum plate works as the anode, by a method similar to the nitric acid electrolysis described above. Then, the plate was washed with sprayed water. A DC anodic oxide film having a thickness of 2.5 g/m² was formed on the plate by using an electrolyte solution of 15 wt % sulfuric acid (containing 0.5 wt % of aluminum ion) at an electric current density of 15 A/dm², washed with water, and dried. Further, the plate was processed in an aqueous 2.5 wt % sodium silicate solution at 30° C. for 10 seconds. The centerline average roughness (Ra) of the support, as determined by using a needle having a diameter of 2 μm, was 0.51 μm.

The following undercoat solution (1) was further applied thereon to a dry coating amount of 10 mg/m², to give a support for use in the experiments described below.

—Undercoat Solution (1)—

Undercoat compound (1) (weight-average molecular weight: 60,000): 0.017 g

Methanol: 9.00 g

Water: 1.00 g

Undercoat Compound (1)

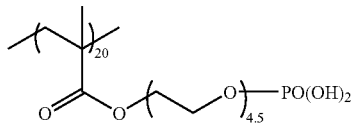

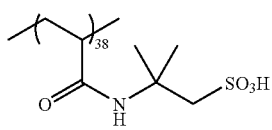

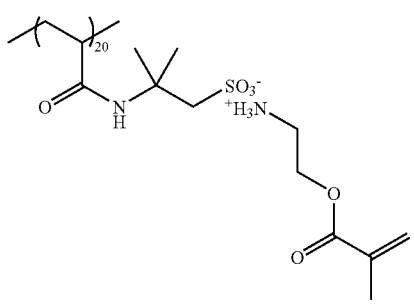

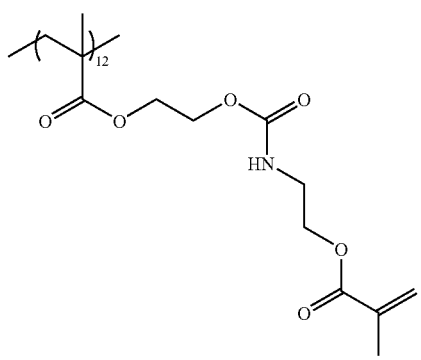

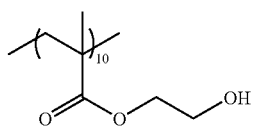

<Formation of Image Recording Layer>

[Preparation of Compound Having a Specific Structure (A-1)]

10.13 g of ethyl tosylate and 8.7 g of 2,3,3,5-tetramethyl-3H-indole were blended at 120° C. for 2 hours and cooled to room temperature. 13.2 g of 2,5-bis[(phenylamino)methylene]cyclopentylidene diphenylaminium tetrafluoroborate, 5.06 g of acetic anhydride, 12.6 g of triethylamine, and 500 ml of 2-propanol were added thereto, and the mixture was stirred at 80° C. additionally for 3 hours. The mixture was allowed to cool to room temperature. The crystal precipitated was collected by filteration, and was washed sufficiently with water, to give 14.9 g of a cyanine colorant (IR-1) (yield: 80%). 10.0 g of the cyanine colorant (IR-1) obtained was dissolved in 100 ml of chloroform, and 6.0 g of manganese dioxide was added. The mixture was stirred at room temperature for 48 hours. Manganese dioxide was filtered off, the crude crystal obtained after distillation of chloroform was resuspended in 50 ml of ethyl acetate, to give 9.5 g of a compound (A-1) (yield: 95%). The preparative scheme is shown below.

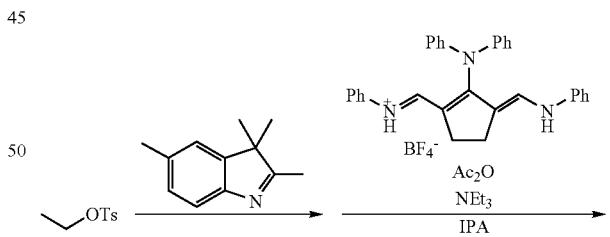

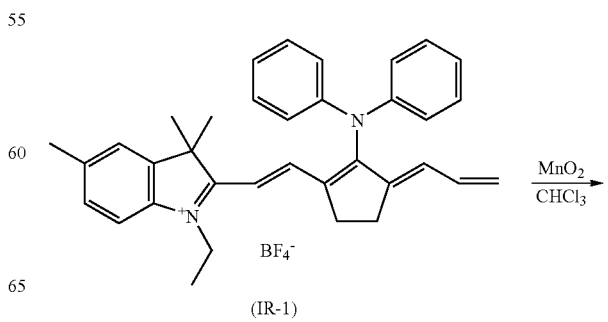

(IR-1)

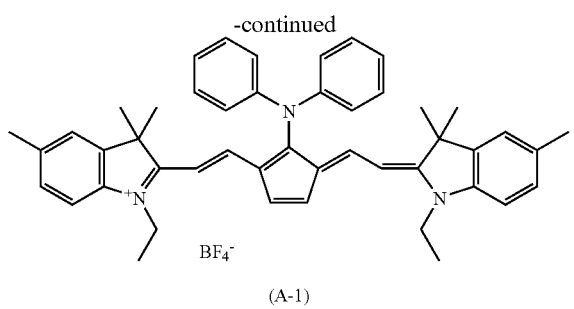

(A-1)

The compound was identified by $^1$H-NMR (solvent: DMSO) and $^{19}$F-NMR (solvent: DMSO).

$^1$H-NMR (400 MHz, DMSO-$d_6$): δ: 7.75 (d, J=14.8 Hz, 2H), 7.76-7.19 (m, 14H), 7.17 (s, 2H), 7.06 (t, J=7.0 Hz, 2H), 6.56 (d, J=14.4 Hz, 2H), 4.22 (q, J=7.2 Hz, 4), 2.33 (s, 6H), 1.26 (t, J=7.2 Hz, 6H), and 1.17 (s, 12H).

$^{19}$F-NMR (100 MHz, DMSO-$d_6$): δ: 148.23 (s)

An image recording layer coating liquid (1) in the following composition was bar-coated on the support prepared above, and was dried in an oven at 100° C. for 60 seconds, to form an image recording layer in a dry coating amount of 1.0 g/m². A protective layer coating liquid in the following composition was bar-coated further on the image recording layer and was dried in an oven at 120° C. for 60 seconds, to give a planographic printing plate precursor having a protective layer in a dry coating amount 0.15 g/m².

The image recording layer coating liquid (1) was prepared by mixing and stirring the following photosensitive solution (1) and the microgel solution (1) immediately before coating.

| Photosensitive solution (1) | |
|---|---|
| Binder polymer (1): | 0.162 g |
| Polymerization initiator (1): | 0.100 g |
| Infrared absorbent (1): | 0.020 g |
| Compound (A-1): | 0.020 g |
| Polymerizable monomer [ARONIX M-215 (manufactured by Toagosei Co., Ltd.)]: | 0.385 g |
| Fluorochemical surfactant (1): | 0.044 g |
| Methylethylketone: | 1.091 g |
| Propylene glycol monomethylether: | 8.609 g |

Binder Polymer (1)

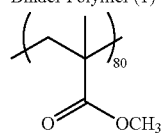

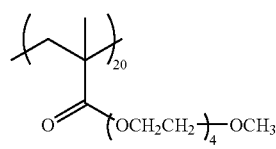

Polymerization Initiator (1)

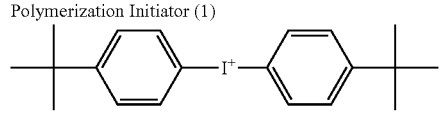

$C_4F_9SO_3^-$

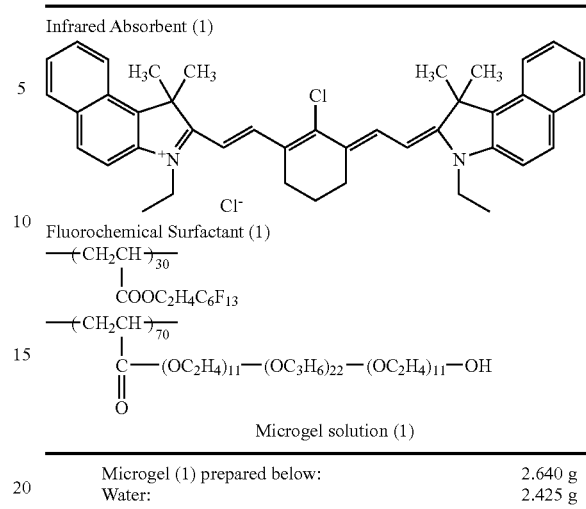

Microgel solution (1)

| Microgel (1) prepared below: | 2.640 g |
|---|---|
| Water: | 2.425 g |

(Preparation of Microgel (1))

10 g of trimethylolpropane/xylene diisocyanate adduct (TAKENATE D-110N, manufactured by Mitsui Takeda Chemicals Co., Ltd.), 3.15 g of pentaerythritol triacrylate (SR444, manufactured by Nippon Kayaku Co., Ltd.) and 0.1 g of PIONIN A-41C (manufactured by Takemoto Oil & Fat Co., Ltd.) were dissolved in 17 g of ethyl acetate, to give an oil phase component. 40 g of an aqueous 4 wt % PVA-205 solution was prepared, to give an aqueous phase component. The organic and aqueous phase components were mixed, and the mixture was emulsified in a homogenizer at 12,000 rpm for 10 minutes. The emulsion obtained was added to 25 g of distilled water, and the mixture was stirred at room temperature for 30 minutes and additionally at 50° C. for 3 hours. The microgel solution thus obtained was diluted with distilled water to a solid content concentration of 15 wt %. The average diameter was 0.2 μm.

| Protective layer-coating liquid | |
|---|---|
| Following inorganic particle dispersion (1): | 1.5 g |
| Polyvinylalcohol PVA105 (manufactured by Kuraray Co., Ltd., saponification value: 98.5 mol %, and polymerization degree: 500): | 0.06 g |
| Polyvinylpyrrolidone K30 (manufactured by Tokyo Kasei Kogyo Co., Ltd., molecular weight Mw: 40,000): | 0.01 g |
| Vinylpyrrolidone/vinyl acetate copolymer LUVITEC VA64W (manufactured by ISP, copolymerization ratio: 6/4): | 0.01 g |
| Nonionic surfactant Emalex 710 (manufactured by Nihon-Emulsion Co., Ltd.): | 0.01 g |
| Ion-exchange water: | 6.0 g |

[Preparation of Inorganic Particle Dispersion (1)]

6.4 g of synthetic mica SOMASIF ME-100 (manufactured by CO-OP Chemical Co., Ltd.) was added to 193.6 g of ion-exchange water, and the mixture was dispersed in a homogenizer to an average diameter (laser scattering method) of 3 μm. The aspect ratio of the dispersed inorganic particle obtained was 100 or more.

Example 2

A planographic printing plate precursor was prepared in the same manner as Example 1, except that the polymerization initiator (1) used in Example 1 was replaced with the following polymerization initiator (2).

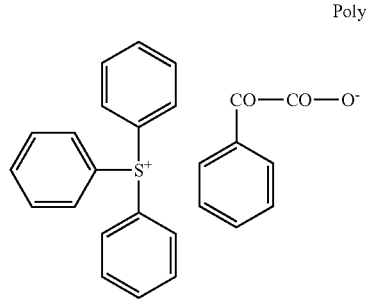

Polymerization Initiator (2)

Example 3

A planographic printing plate precursor was prepared in the same manner as Example 1, except that compound (A-1) in Example 1 was replaced with compound (A-4) prepared by the following method and the polymerization initiator (1) was replaced with the following polymerization initiator (3).

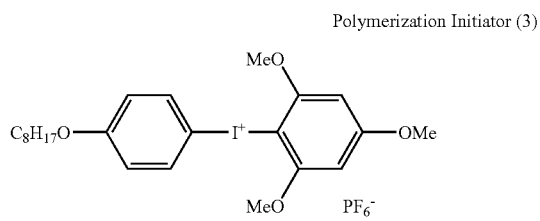

Polymerization Initiator (3)

[Preparation of Compound Having a Specific Structure (A-4)]

37.9 g of 3-methoxypropanol and 53.9 g of p-toluenesulfonyl chloride in 50.2 g of pyridine were stirred for 3 hours while the reaction temperature is kept at 0 to 10° C. The product was extracted with ethyl acetate, to give 91.2 g of 3-methoxypropyl tosylate (yield: 89%). 55 g of the obtained 3-methoxypropyl tosylate and 39.0 g of 2,3,3,5-tetramethyl-3H-indole were blended at 120° C. for 3 hours and was cooled to room temperature. 47.7 g of 2,5-bis[(phenylamino)methylene]cyclopentylidenediphenylaminium tetrafluoroborate, 23.0 g of acetic anhydride, 56.9 g of triethylamine, and 220 ml of 2-propanol were added thereto, and the mixture was further stirred at 80° C. for 3 hours. After reaction, the mixture was allowed to cool to room temperature, and 90 ml of water was added thereto. The crystal precipitated was collected by filteration, and was washed sufficiently with water, to give 60.1 g of a cyanine colorant (IR-2) (yield: 80%). 15.0 g of the colorant (IR-2) obtained was dissolved in 90 ml of acetonitrile. The mixture was added dropwise into an aqueous solution containing 6.6 g of $KPF_6$ in 90 g of water at room temperature over 15 minutes, and the resulting mixture was stirred for 2 hours after the dropwise addition. Then, the crystal precipitated was collected by filteration and dried, to give 15.2 g of a cyanine colorant (IR-3) (yield: 95%). Then, 5.0 g of the cyanine colorant obtained (IR-3) was dissolved in 50 ml of chloroform, 3.0 g of manganese dioxide was added thereto, and the mixture was stirred at room temperature for 48 hours. After removal of manganese dioxide by filtration, the filtrate was distilled for removal of chloroform, and the crude crystal obtained was resuspended in 20 ml of ethyl acetate, to give 4.5 g of (A-4) (yield: 90%).

The compound was identified by $^1$H-NMR (solvent: DMSO) and $^{19}$F-NMR (solvent: DMSO).

$^1$H-NMR (400 MHz, DMSO-$d_6$): δ: 7.75 (d, J=14.8 Hz, 2H), 7.40-7.17 (m, 14H), 7.01 (t, J=7.0 Hz, 2H), 6.98 (s, 2H), 6.56 (d, J=14.8 Hz, 2H), 4.22 (m, 4H), 3.35 (m, 4H), 3.17 (s, 6H), 2.33 (s, 6H), 1.93 (m, 4H), and 1.17 (s, 12H).

$^{19}$F-NMR (100 MHz, DMSO-$d_6$): δ: 69.19 (s, 3F), 71.08 (s, 3F).

Example 4

A planographic printing plate precursor was prepared in the same manner as Example 1, except that compound (A-1) used in Example 1 was replaced with compound (A-13) prepared by the following method.

[Preparation of Compound Having a Specific Structure (A-13)]

Compound (A-13) was prepared in the same molar amount and under the same condition as in the aforementioned preparation of compound (A-1), except that 2,5-bis[(phenylamino)methylene]cyclopentylidenediphenylaminium tetrafluoroborate used in preparation of compound (A-1) was replaced with (2-chloro-3-phenylaminomethylene-cyclopent-1-enyl-methylene)phenylammonium tetrafluoroborate (total yield 71%).

The compound was identified by $^1$H-NMR (solvent: DMSO) and $^{19}$F-NMR (solvent: DMSO).

$^1$H-NMR (400 MHz, DMSO-$d_6$): δ: 8.03 (d, J=14.8 Hz, 2H), 7.54 (s, 2H), 7.48 (d, J=7.0 Hz, 2H), 7.31 (d, J=7.0 Hz, 2H), 7.16 (s, 2H), 6.91 (d, J=14.0 Hz, 2H), 4.38 (q, J=7.2 Hz, 4H), 2.41 (s, 6H), 1.70 (s, 12H), and 1.34 (t, J=7.2 Hz, 6H).

$^{19}$F-NMR (100 MHz, DMSO-$d_6$): δ: 148.20 (s)

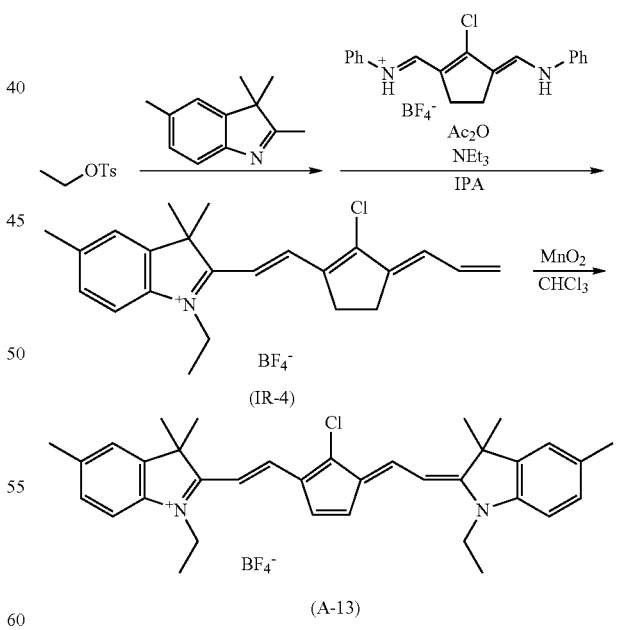

Example 5

A planographic printing plate precursor was prepared in the same manner as in Example 1, except that compound (A-1) was replaced with exemplary compound (A-46).

Example 6

A planographic printing plate precursor was prepared in the same manner as Example 1, except that the image recording layer coating liquid (1) used in Example 1 was replaced with the following image recording layer coating liquid (2).

The image recording layer coating liquid (2) was obtained by mixing and stirring the following photosensitive solution (2) and the microgel solution (1) immediately before coating.

| Photosensitive solution (2) | |
|---|---|
| Binder polymer (1): | 0.162 g |
| Polymerization initiator (1): | 0.100 g |
| Infrared absorbent (2): | 0.020 g |
| Polymerizable monomer, Aronix M-215 (manufactured by Toagosei Co., Ltd.): | 0.385 g |
| Fluorochemical surfactant (1): | 0.044 g |
| Methylethylketone: | 1.091 g |
| Propylene glycol monomethylether: | 8.609 g |

Infrared Absorbent (2)

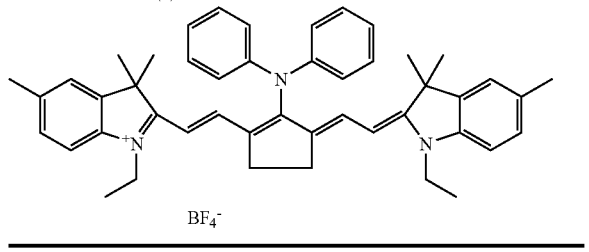

Example 7

A planographic printing plate precursor was prepared in the same manner as Example 6, except that the polymerization initiator (1) used in Example 6 was replaced with the polymerization initiator (2).

Example 8

A planographic printing plate precursor was prepared in the same manner as Example 6, except that the infrared absorbent (2) used in Example 6 was replaced with the infrared absorbent (3) and the polymerization initiator (1) was replaced with the polymerization initiator (3) above.

Infrared Absorbent (3)

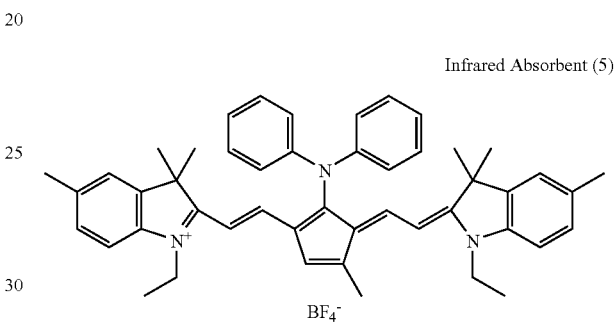

Example 9

A planographic printing plate precursor was prepared in the same manner as Example 6, except that the infrared absorbent (2) used in Example 6 was replaced with the following infrared absorbent (4).

Infrared Absorbent (4)

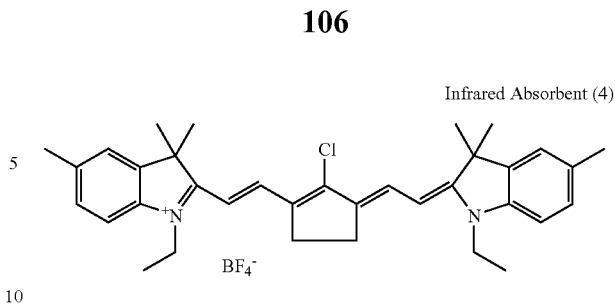

Example 10

A planographic printing plate precursor was prepared in the same manner as Example 6, except that the infrared absorbent (2) used in Example 6 was replaced with the following infrared absorbent (5)

Infrared Absorbent (5)

Comparative Example 1

A planographic printing plate precursor was prepared in the same manner as Example 1, except that the image recording layer coating liquid (1) used in Example 1 was replaced with the following image recording layer coating liquid (3).

The image recording layer coating liquid (3) was prepared by mixing and stirring the following photosensitive solution (3) and the microgel solution (1) immediately before coating.

| Photosensitive solution (3) | |
|---|---|
| Binder polymer (1): | 0.162 g |
| Polymerization initiator (1): | 0.100 g |
| Infrared absorbent (1): | 0.020 g |
| Polymerizable monomer, ARONIX M-215 (manufactured by Toagosei Co., Ltd.): | 0.385 g |
| Fluorochemical surfactant (1): | 0.044 g |
| Methylethylketone: | 1.091 g |
| Propylene glycol monomethylether: | 8.609 g |
| Microgel solution (1) | |
| Microgel (1): | 2.640 g |
| Water: | 2.425 g |

Comparative Example 2

A planographic printing plate precursor was prepared in the same manner as Example 6, except that the infrared absorbent (1) used in Example 6 was replaced with the following infrared absorbent (6).

Infrared Absorbent (6)

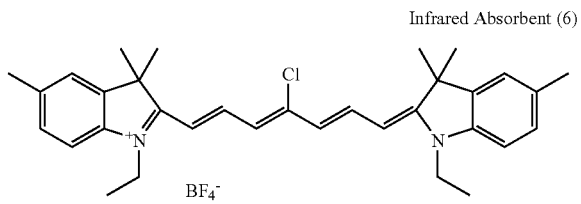

[Exposure and Printing]

Each of the planographic printing plate precursors obtained was exposed in Trendsetter 3244VX manufactured by Creo equipped with a water-cooled 40 W infrared semiconductor laser under the condition of an output of 11.7 W, an external drum rotation spped of 250 rpm, and a resolution of 2,400 dpi. The exposed printing plate precursor obtained was left as it was in a dark place under an atmosphere at 25° C. and a relative humidity of 50% for 30 minutes, and the plate-checking property thereof was evaluated under the following condition.

(Plate-Checking Property)

The easiness in plate-checking was expressed in terms of L value (brightness) of the L*a*b* color coordination, and was represented by the difference ΔL between the L value of the exposed region and the unexposed region. A greater ΔL value indicates better plate-checking property. The measurement was conducted with a spectrophotometer CM2600d manufactured by KONICA-MINOLTA and operation software CM-S100W in the SCE mode (with regular reflected light removed). The SCE mode, in which regular reflected light is removed and only diffused light is measured, allows evaluation of color similar to that by visual observation, and thus, the results agrees well with the results obtained by visual observation by human.

(On-Press Developability)

The exposed plate precursor was set in the cylinder of a printing machine SOR-M manufactured by Heidelberg without conducting a development treatment. Damping water and ink, specifically damping water (EU-3 (etching solution, manufactured by Fuji Photo Film Co., Ltd.)/water/isopropyl alcohol: 1/89/10 (by volume)) and TRANS-G(N) black ink (manufactured by Dainippon Ink and Chemicals, Inc.), were supplied. Then, printing was performed at a printing speed of 6,000 sheets per hour. Then, the number of sheets printed until ink transfer onto the unexposed region (non-image portion) of the image recording layer ceases (on-press developability) was determined. A smaller number of sheets printed indicates better on-press developability.

(Printing Durability)

Further printing on a greater number of sheets caused gradual abrasion of the image recording layer and decrease in ink-receiving capacity, and, as a consequece, the ink density on the printed paper decreased. The printing durability was evaluated by the number of sheets printed until the ink density (reflection density) decreased by 0.1 from the start of the printing. These results are summarized in Table 1.

TABLE 1

|  | Plate-checking property ΔL | On-press developability (sheets) | Printing durability (×1000 sheets) |
|---|---|---|---|
| Example 1 | 4.5 | 40 | 14 |
| Example 2 | 4 | 45 | 15 |
| Example 3 | 4.6 | 35 | 12 |
| Example 4 | 3.9 | 35 | 13 |
| Example 5 | 4.7 | 35 | 13 |
| Example 6 | 4.5 | 35 | 13 |
| Example 7 | 3.9 | 40 | 13 |
| Example 8 | 4.6 | 35 | 13 |
| Example 9 | 3.8 | 35 | 14 |
| Example 10 | 4.9 | 35 | 14 |
| Comparative Example 1 | 1.9 | 35 | 13 |
| Comparative Example 2 | 1.6 | 35 | 13 |

As is apparent from Table 1, the contrast between the exposed region and the unexposed region was excellent and thin lines and character thereon were distinguishable, when the planographic printing plate precursors according to the invention were used for printing. In addition, any one of the planographic printing plate precursors was superior in on-press developability and showed printing durability that is practically sufficient as a printing plate.

Generation of A-1, A-1, A-4, A-13, and A-46 respectively in the planographic printing plates of Examples 6 to 10 by laser exposure was confirmed by HPLC analysis of the MeOH extract of the image recording layer.

The followings are Examples related to the second embodiment of the invention.

[Preparation of Planographic Printing Plate Precursor]

(2) Formation of Image Recording Layer

Examples 11 to 26

An image recording layer coating liquid in the following composition was bar-coated on the same support with an undercoat as that used in Example 1, and was dried in an oven at 100° C. for 60 seconds, to give planographic printing plate precursors (11) to (26) having an image recording layer formed in a dry coating amount of 1.2 g/m².

The image recording layer coating liquid was prepared by mixing and stirring the microcapsule solution (1) with each of the following photosensitive solutions (11) to (26) immediately before coating.

| Photosensitive solutions (11) to (26) | |
|---|---|
| Binder polymer (1): | 0.177 g |
| Cation radical molecule precursor (infrared absorbent: compound shown in Table 2): | X g |
| Electron accepting compound (radical generating agent: compound shown in Table 2): | Y g |
| Polymerizable monomer (ARONIX M-215, manufactured by Toagosei Co., Ltd.): | 0.319 g |
| Phosphonium compound (1): | 0.035 g |
| Fluorochemical surfactant (1): | 0.004 g |
| Anionic surfactant (PIONIN A-24-EA, manufactured by Takemoto Oil & Fat Co., Ltd., 40 wt % aqueous solution): | 0.125 g |
| Methylethylketone: | 2.554 g |
| 1-Methoxy-2-propanol: | 7.023 g |
| Microcapsule solution (1) | |
| Microgel dispersion (A) prepared below: | 1.800 g |
| Water: | 1.678 g |

The structures of the electron accepting compound and other compounds used in the photosensitive solution are shown below. The amounts of X g and Y g in the above are defined in Table 2 below.

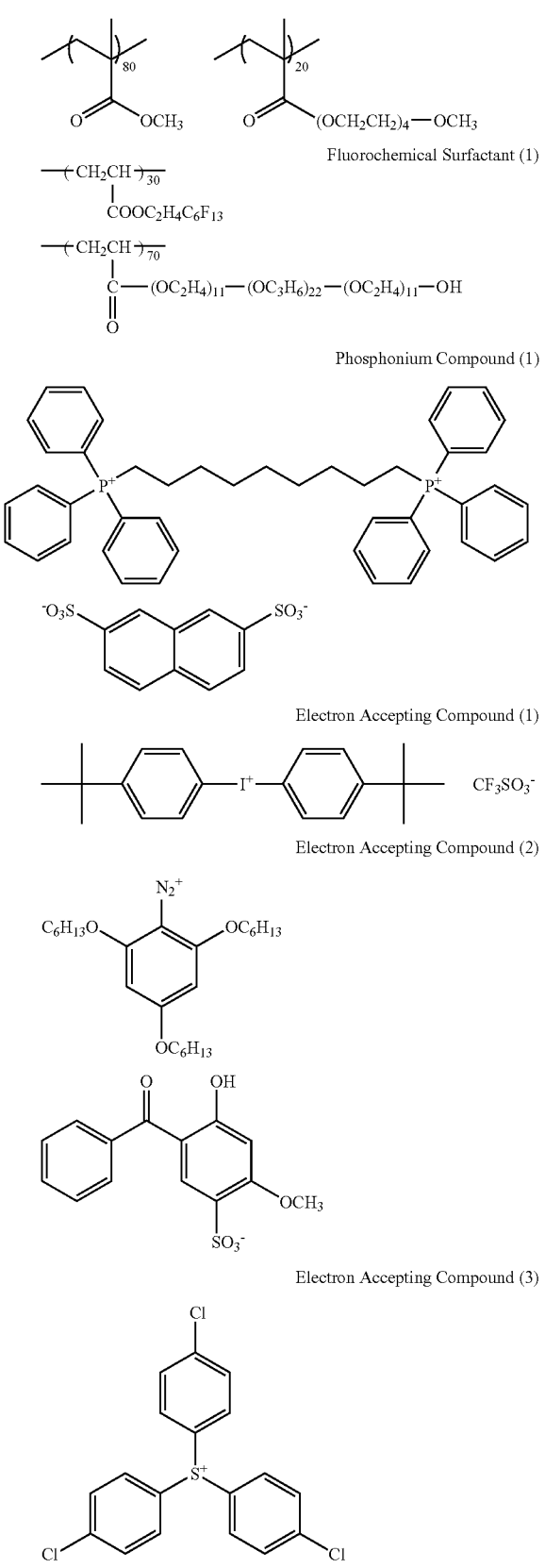
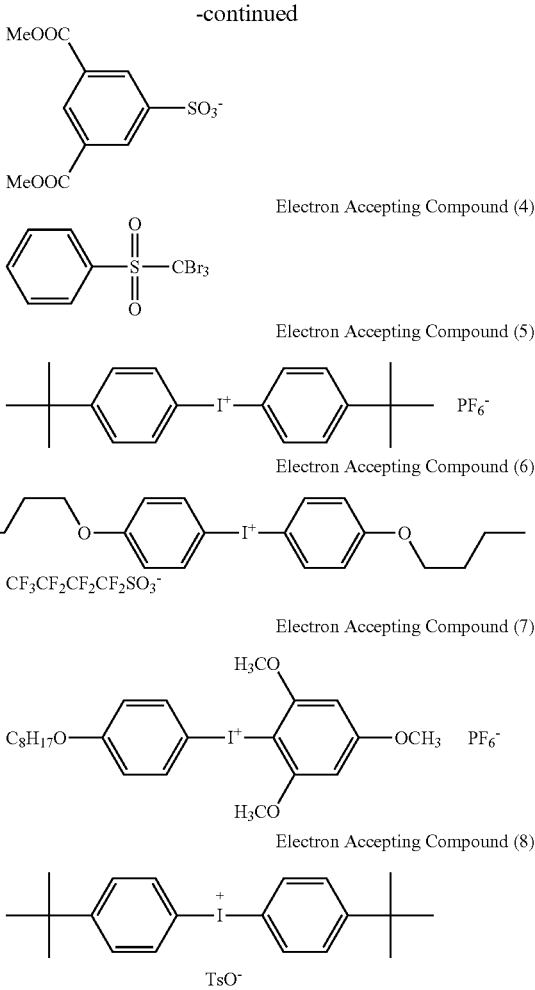

—Preparation of Microgel Dispersion (A)—

10.0 g of trimethylolpropane/xylene diisocyanate adduct (manufactured by Mitsui Takeda Chemicals Co., Ltd., Takenate D-110N, 75 wt % ethyl acetate solution), 6.00 g of a polymerizable monomer ARONIX M-215 (manufactured by Toagosei Co., Ltd.), and 0.12 g of PIONIN A-41C (manufactured by Takemoto Oil & Fat Co., Ltd.) were dissolved in 16.67 g of ethyl acetate, to give an oil phase component. 37.5 g of an aqueous 4 wt % PVA-205 solution was prepared as an aqueous phase component. The organic and aqueous phase components were mixed, and the mixture was emulsified in a homogenizer at 12,000 rpm for 10 minutes. The emulsion obtained was added to 25 g of distilled water, and the mixture was stirred at room temperature for 30 minutes and additionally at 40° C. for 2 hours. The microgel solution thus obtained was diluted with distilled water to a solid content concentration of 21 wt %, to give a microgel dispersion (A). The average diameter was 0.23 μm.

2. Exposure, Printing, and Evaluation

Each of the obtained planographic printing plate precursors (11) to (26) was exposed in Trendsetter 3244VX manufactured by Creo equipped with a water-cooled 40 W infrared semiconductor laser under the condition of an output of 11.7 W, an external drum rotation speed of 250 rpm, and a resolution of 2,400 dpi.

The planographic printing plates (11) to (26) were evaluated with respect to plate-checking property, on-press developability, and printing durability, in the same manner as in Example 1. The results are shown in Table 2 below.

TABLE 2

| | Planographic printing plate precursor | Photosensitive solution | (A) Cation radical molecule precursor | | (B) Electron accepting compound | | Evaluation results | | |
|---|---|---|---|---|---|---|---|---|---|
| | | | Structure | Addition amount (X) g | Structure | Addition amount (Y) g | Plate-checking property ΔL | On-press developability (sheets) | Printing durability (×1000 sheets) |
| Example 11 | (11) | (11) | A-1-1 | 0.0257 | (1) | 0.179 | 4.0 | 50 | 12 |
| Example 12 | (12) | (12) | A-1-5 | 0.0297 | (1) | 0.179 | 3.0 | 60 | 13 |
| Example 13 | (13) | (13) | A-1-13 | 0.0211 | (1) | 0.179 | 3.1 | 50 | 13 |
| Example 14 | (14) | (14) | A-1-20 | 0.0231 | (1) | 0.179 | 2.7 | 60 | 12 |
| Example 15 | (15) | (15) | A-1-27 | 0.0269 | (1) | 0.179 | 3.3 | 60 | 13 |
| Example 16 | (16) | (16) | A-1-23 | 0.0212 | (1) | 0.179 | 2.8 | 60 | 14 |
| Example 17 | (17) | (17) | A-1-46 | 0.0215 | (1) | 0.179 | 2.0 | 60 | 13 |
| Example 18 | (18) | (18) | A-1-1 | 0.0257 | (2) | 0.157 | 3.0 | 70 | 13 |
| Example 19 | (19) | (19) | A-1-1 | 0.0257 | (3) | 0.235 | 3.3 | 50 | 13 |
| Example 20 | (20) | (20) | A-1-1 | 0.0257 | (4) | 0.123 | 3.0 | 50 | 14 |
| Example 21 | (21) | (21) | A-1-1 | 0.0257 | (5) | 0.173 | 5.0 | 60 | 18 |
| Example 22 | (22) | (22) | A-1-1 | 0.0257 | (6) | 0.239 | 4.5 | 50 | 14 |
| Example 23 | (23) | (23) | A-1-1 | 0.0257 | (7) | 0.213 | 5.5 | 45 | 16 |
| Example 24 | (24) | (24) | A-1-51 | 0.0525 | (1) | 0.179 | 6.0 | 50 | 13 |
| Example 25 | (25) | (25) | A-1-51 | 0.0525 | (8) | 0.186 | 3.5 | 50 | 13 |
| Example 26 | (26) | (26) | A-1-53 | 0.0364 | (1) | 0.179 | 5.0 | 55 | 14 |

As is apparent from Table 2, each of the planographic printing plate precursors to which the image recording materials according to the invention were applied exhibited an excellent contrast between the exposed region and the unexposed region after laser exposure, and showed superior visual recognizability. In addition, each of the planographic printing plate precursors was superior in on-press developability and showed printing durability that is practically sufficient as a printing plate.

According to the invention, a color changing compound that enables formation of a print-out image with superior visibility and recognizability when imagewise exposed to laser radiation or imagewise heated is provided. The invention also provides an image forming material, an image forming method and a planographic printing plate precursor using the same. In addition, the invention provides a method of making a plate from the planographic printing plate precursor of the invention in which wet development treatment is unnecessary, and a planographic printing method.

As described above, the invention provides a compound giving a printed-out image with superior visibility that allows easy identification of the exposed and unexposed regions when imagewise irradiated with laser radiation, and an image forming material using the same. When the image forming material according to the invention is applied, a planographic printing plate precursor superior in visibility, in particular an on-press developable or no processing (no development) planographic printing plate precursor, can be obtained. The invention also provides a planographic printing method using such a planographic printing plate precursor capable of on-press development.

All publications, patent applications, and technical standards mentioned in this specification are herein incorporated by reference to the same extent as if each individual publication, patent application, or technical standard was specifically and individually indicated to be incorporated by reference.

What is claimed is:

1. An image forming material, comprising an image recording layer including a compound represented by the following formula (3) or (4) in an amount of 0.1 to 30 wt % with respect to the total solid content in the image recording layer and a polymerizable compound,

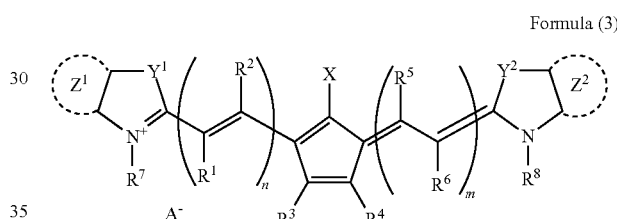

Formula (3)

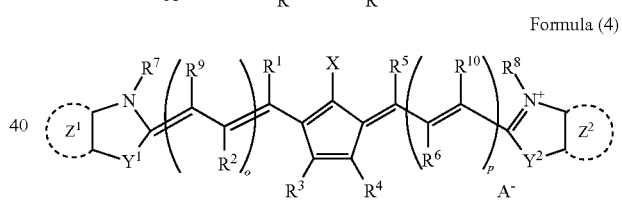

Formula (4)

wherein, in the formulae (3) and (4), $R^1$, $R^2$, $R^5$, $R^6$, $R^9$ and $R^{10}$ each independently represent a hydrogen atom or a hydrocarbon group; $R^3$ and $R^4$ each independently represent a hydrogen atom, a hydrocarbon group, a halogen atom, an alkoxy group, an aryloxy group, an amino group, a carbonyl group, or a silyl group; $R^3$ and $R^4$ may bond to each other to form a ring; X represents —N(Aryl)$_2$; Aryl represents an aryl group; $Y^1$ and $Y^2$ may be the same as or different from each other, and each independently represent a dialkylmethylene group; $R^7$ and $R^8$ each independently represent a hydrocarbon group; $Z^1$ and $Z^2$ each independently represent an aromatic or heteroaromatic ring that may have a substituent; $A^-$ represents a counter ion that is present when neutralization of electric charge is necessary; and each of m, n, o, and p independently denotes an integer of from 0 to 2, wherein when the image forming material is exposed to laser radiation, a hue and/or brightness of an exposed region changes.

2. A method of forming a printed-out image, comprising exposing the image forming material according to claim 1 to laser radiation to change a hue and/or brightness of the exposed region.

3. A planographic printing plate precursor, comprising the image forming material according to claim 1, wherein when the image forming material is exposed to laser radiation, a hue and/or brightness of an exposed region changes.

4. A method of making a planographic printing plate, comprising imagewise exposing the planographic printing plate precursor according to claim 3 to laser radiation, to change a hue and/or brightness of an exposed region.

5. A method of making a planographic printing plate, comprising:
   imagewise exposing the planographic printing plate precursor according to claim 3 to laser radiation, to change a hue and/or brightness of an exposed region; and
   then supplying printing ink and dampening water to remove a portion of the image recording layer not exposed to the laser radiation.

6. An image forming material, comprising an image recording layer including a compound represented by the following formula (3) or (4) in an amount of 0.1 to 30 wt % with respect to the total solid content in the image recording layer and a polymerizable compound,

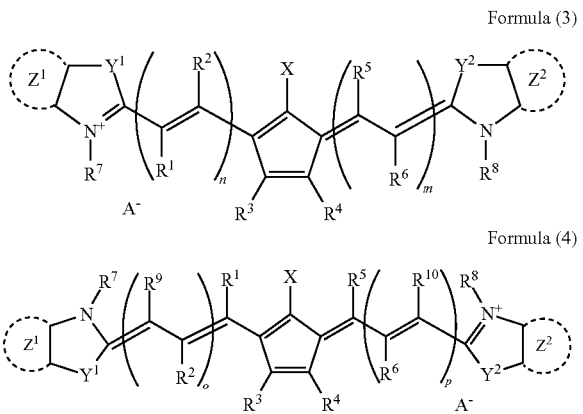

Formula (3)

Formula (4)

wherein, in the formulae (3) and (4), $R^1$, $R^2$, $R^5$, $R^6$, $R^9$ and $R^{10}$ each independently represent a hydrogen atom or a hydrocarbon group; $R^3$ and $R^4$ each independently represent a hydrogen atom, a hydrocarbon group, a halogen atom, an alkoxy group, an aryloxy group, an amino group, a carbonyl group, or a silyl group; $R^3$ and $R^4$ may bond to each other to form a ring; X represents —N(Aryl)$_2$; Aryl represents an aryl group; $Y^1$ and $Y^2$ may be the same as or different from each other, and each independently represent a dialkylmethylene group; $R^7$ and $R^8$ each independently represent a hydrocarbon group; $Z^1$ and $Z^2$ each independently represent an aromatic or heteroaromatic ring that may have a substituent; $A^-$ represents a tetrafluoroborate ion or a hexafluorophosphate ion; and each of m, n, o, and p independently denotes an integer of 0 to 2,
   wherein when the image forming material is exposed to laser radiation, a hue and/or brightness of an exposed region changes.

7. A method of forming a printed-out image, comprising exposing the image forming material according to claim 6 to laser radiation to change a hue and/or brightness of the exposed region.

8. A planographic printing plate precursor, comprising the image forming material according to claim 6, wherein when the image forming material is exposed to laser radiation, a hue and/or brightness of an exposed region changes.

9. A method of making a planographic printing plate, comprising imagewise exposing the planographic printing plate precursor according to claim 8 to laser radiation, to change a hue and/or brightness of an exposed region.

10. A method of making a planographic printing plate, comprising:
   imagewise exposing the planographic printing plate precursor according to claim 8 to laser radiation, to change a hue and/or brightness of an exposed region; and
   then supplying printing ink and dampening water to remove a portion of the image recording layer not exposed to the laser radiation.

* * * * *